(12) United States Patent
Teig et al.

(10) Patent No.: US 6,910,198 B2
(45) Date of Patent: *Jun. 21, 2005

(54) METHOD AND APPARATUS FOR PRE-COMPUTING AND USING PLACEMENT COSTS WITHIN A PARTITIONED REGION FOR MULTIPLE WIRING MODELS

(75) Inventors: Steven Teig, Menlo Park, CA (US); Joseph L. Ganley, Vienna, VA (US)

(73) Assignee: Cadence Design Systems, Inc., San Jose, CA (US)

( * ) Notice: Subject to any disclaimer, the term of this patent is extended or adjusted under 35 U.S.C. 154(b) by 894 days.

This patent is subject to a terminal disclaimer.

(21) Appl. No.: 09/739,580

(22) Filed: Dec. 15, 2000

(65) Prior Publication Data

US 2002/0124231 A1 Sep. 5, 2002

Related U.S. Application Data

(63) Continuation of application No. 09/732,181, filed on Dec. 6, 2000.

(51) Int. Cl.[7] ............................. G06F 17/50; G06F 9/45
(52) U.S. Cl. ................................ 716/7; 716/9; 716/12
(58) Field of Search ............................... 716/1–2, 7–14

(56) References Cited

U.S. PATENT DOCUMENTS

| | | | |
|---|---|---|---|
| 4,593,363 A | 6/1986 | Burstein et al. | |
| 4,615,011 A | 9/1986 | Linsker | |
| 4,855,929 A | 8/1989 | Nakajima | |
| 5,097,422 A | 3/1992 | Corbin, II et al. | |
| 5,224,057 A | * 6/1993 | Igarashi et al. | 716/13 |

(Continued)

FOREIGN PATENT DOCUMENTS

JP      64-15947     1/1989

OTHER PUBLICATIONS

Ahuja, R. et al., Faster Algorithms for the Shortest Path Problem, Journal of the Association for Computing Machinery, vol. 37, No. 2, Apr. 1990, pp. 213–223.

Brady, L. et al., Channel Routing on a 60° Grid, extended abstract, pp. 956–931.

Brambilla, A. et al., Statistical Method for the Analysis of Interconnects Delay in Submicrometer Layouts, IEEE, Aug. 2001, pp. 957–966.

Carothers, K., A Method of Measuring Nets Routability for MCM's General Area Routing Problems, 1999, pp. 186–192.

(Continued)

*Primary Examiner*—Leigh M. Garbowski
(74) *Attorney, Agent, or Firm*—Stattler, Johansen & Adeli LLP

(57) ABSTRACT

One embodiment of the invention is a recursive partitioning method that places circuit elements in an IC layout. This method initially defines a number of partitioning lines that divide an IC region into several sub-regions (also called slots). For a net in the region, the method then identifies the set of sub-regions (i.e., the set of slots) that contain the circuit elements (e.g., the pins of circuit modules) of that net. The set of sub-regions for the net represents the net's configuration with respect to the defined partitioning lines. Next, the placement method identifies attribute or attributes of a connection graph that models the net's configuration with respect to the partitioning lines. The connection graph for each net provides a topology of interconnect lines that connect the slots that contain the net's circuit elements. According to some embodiments of the invention, the connection graph for each net can have edges that are completely or partially diagonal.

18 Claims, 49 Drawing Sheets

U.S. PATENT DOCUMENTS

| | | | |
|---|---|---|---|
| 5,251,147 A | * 10/1993 | Finnerty | 716/6 |
| 5,267,176 A | 11/1993 | Antreich et al. | |
| 5,375,069 A | 12/1994 | Satoh et al. | |
| 5,532,934 A | 7/1996 | Rostoker | |
| 5,533,148 A | * 7/1996 | Sayah et al. | 382/240 |
| 5,566,078 A | 10/1996 | Ding et al. | |
| 5,578,840 A | 11/1996 | Scepanovic et al. | |
| 5,587,922 A | * 12/1996 | Hendrickson et al. | 716/2 |
| 5,587,923 A | 12/1996 | Wang | |
| 5,618,744 A | 4/1997 | Suzuki et al. | |
| 5,633,479 A | 5/1997 | Hirano | |
| 5,634,093 A | 5/1997 | Ashida et al. | |
| 5,636,125 A | 6/1997 | Rostoker et al. | |
| 5,637,920 A | 6/1997 | Loo | |
| 5,640,327 A | 6/1997 | Ting | |
| 5,650,653 A | 7/1997 | Rostoker et al. | |
| 5,663,891 A | 9/1997 | Bamji et al. | |
| 5,742,086 A | 4/1998 | Rostoker et al. | |
| 5,757,089 A | 5/1998 | Ishizuka | |
| 5,757,656 A | 5/1998 | Hershberger et al. | |
| 5,777,360 A | 7/1998 | Rostoker et al. | |
| 5,784,289 A | 7/1998 | Wang | |
| 5,798,936 A | 8/1998 | Cheng | |
| 5,811,863 A | 9/1998 | Rostoker et al. | |
| 5,822,214 A | 10/1998 | Rostoker et al. | |
| 5,838,583 A | 11/1998 | Varadarajan et al. | |
| 5,859,449 A | 1/1999 | Kobayashi et al. | |
| 5,889,677 A | 3/1999 | Yasuda et al. | |
| 5,898,597 A | 4/1999 | Scepanovic et al. | |
| 5,914,887 A | 6/1999 | Scepanovic et al. | |
| 5,926,632 A | * 7/1999 | Kawaguchi | 716/7 |
| 5,973,376 A | 10/1999 | Rostoker et al. | |
| 5,980,093 A | 11/1999 | Jones et al. | |
| 6,035,108 A | 3/2000 | Kikuchi | |
| 6,058,254 A | 5/2000 | Scepanovic et al. | |
| 6,067,409 A | * 5/2000 | Scepanovic et al. | 716/8 |
| 6,068,662 A | 5/2000 | Scepanovic et al. | |
| 6,070,108 A | 5/2000 | Andreev et al. | |
| 6,123,736 A | 9/2000 | Pavisic et al. | |
| 6,128,767 A | 10/2000 | Chapman | |
| 6,134,702 A | 10/2000 | Scepanovic et al. | |
| 6,155,725 A | 12/2000 | Scepanovic et al. | |
| 6,175,950 B1 | 1/2001 | Scepanovic et al. | |
| 6,209,123 B1 | 3/2001 | Maziasz et al. | |
| 6,216,252 B1 | 4/2001 | Dangelo et al. | |
| 6,230,306 B1 | 5/2001 | Raspopovic et al. | |
| 6,247,167 B1 | 6/2001 | Raspopovic et al. | |
| 6,249,902 B1 | 6/2001 | Igusa et al. | |
| 6,253,363 B1 | 6/2001 | Gasanov et al. | |
| 6,260,179 B1 | 7/2001 | Ohsawa et al. | |
| 6,262,487 B1 | 7/2001 | Igarashi et al. | |
| 6,289,495 B1 | 9/2001 | Raspopovic et al. | |
| 6,295,634 B1 | 9/2001 | Matsumoto | |
| 6,301,686 B1 | 10/2001 | Kikuchi et al. | |
| 6,324,674 B2 | 11/2001 | Andreev et al. | |
| 6,324,675 B1 | 11/2001 | Dutta et al. | |
| 6,327,693 B1 | 12/2001 | Cheng et al. | |
| 6,327,694 B1 | 12/2001 | Kanazawa | |
| 6,330,707 B1 | 12/2001 | Shinomiya et al. | |
| 6,378,121 B2 | 4/2002 | Hiraga | |
| 6,385,758 B1 | 5/2002 | Kikuchi et al. | |
| 6,401,234 B1 | 6/2002 | Alpert et al. | |
| 6,405,358 B1 | 6/2002 | Nuber | |
| 6,407,434 B1 | 6/2002 | Rostoker et al. | |
| 6,412,097 B1 | 6/2002 | Kikuchi et al. | |
| 6,412,102 B1 | 6/2002 | Andreev et al. | |
| 6,415,422 B1 | 7/2002 | Mehrotra et al. | |
| 6,436,804 B2 | 8/2002 | Igarashi et al. | |
| 6,442,743 B1 | 8/2002 | Sarrafzadeh et al. | |
| 6,448,591 B1 | 9/2002 | Juengling | |
| 6,463,575 B1 | 10/2002 | Takahashi | |
| 6,473,891 B1 | 10/2002 | Shively | |
| 6,480,991 B1 | 11/2002 | Cho et al. | |
| 6,490,713 B2 | 12/2002 | Matsumoto | |
| 6,519,751 B2 | 2/2003 | Huang et al. | |
| 6,543,043 B1 | 4/2003 | Wang et al. | |
| 6,546,540 B1 | 4/2003 | Igarashi et al. | |
| 6,557,145 B2 | 4/2003 | Boyle et al. | |
| 6,687,893 B2 | * 2/2004 | Teig et al. | 716/14 |
| 2001/0003843 A1 | 6/2001 | Scepanovic et al. | |
| 2001/0009031 A1 | 7/2001 | Nitta et al. | |
| 2002/0182844 A1 | 12/2002 | Igarashi et al. | |
| 2003/0005399 A1 | 1/2003 | Igarashi et al. | |
| 2003/0025205 A1 | 2/2003 | Shively | |

OTHER PUBLICATIONS

Chen, H. et al., Physical Planning of On–Chip Interconnect Architectures, 2002, IEEE, International Conference, pp. 30–35.

Cheng, K. et al., Manhattan or Non Manhattan? A Study of Alternative VLSI Routing Architectures, pp 47–52, 2000.

Cheng, K., Steiner Problem in Octilinear Routing Model, a Thesis Submitted for the Degree of Master of Science, National University Singapore, 1995, pp. 1–122.

Chip Model with Wiring Cost Map, Aug. 1983, IBM Technical Disclosure Bulletin, vol. 26, iss. 3A, pp. 929–933.

Cong, J. et al., Efficient Heuristics for the Minimum Shortest Path Steiner Arborescence Problem with Applications to VLSI Physical Design, Cadence Design Systems and UCLA Compter Science Department, pp. 88–95.

Cong, J. et al., Performance–Driven Multi–Layer General Routing for PCB/MCM Designs, UCLA Computer Science Department, 1998, pp. 356–361.

Enbody, R. et al., Near–Optimal n–Layer Channel Routing, $23^{rd}$ Design Automation Conference, 1986, pp. 708–714.

Fang, S. et al., Constrained Via Minimization with Practical Considerations for Multi–Layer VLSI/PCB Routing Problems, $28^{th}$ ACM/IEEE Design Automation Conference, 1991, pp. 60–65.

Hom, I. et al., Estimation of the Number of Routing Layers and Total Wirelength in a PCB Through Wiring Distribution Analysis, 1996, pp. 1–6.

Hong, X. et al., Performance–Driven Steiner Tree algorithms for Global Routing, $30^{th}$ ACM/IEEE Design Automation Conference, 1993, pp. 177–181.

Hu, J. et al.: "A Timing–Constrained algorithm for Simultaneous Global Routing of Multiple Nets" IEEE/ACM International Conference on Computer Aided Design. ICCAD–2000. IEEE/ACM Digest of Technical Papers (CAT. No.00CH37140), Proceedings of International Conference on Computer Aided Design (ICCAD), San Jose, CA USA, Nov. 5–9, 2000, pp. 99–103.

Kastner R et al.: "Predictable Routing" IEEE/ACM International Conference on Computer Aided Design. ICCAD—2000. IEEE/ACM Digest of Technical Papers (CAT. No. 00CH37140), Proceedings of International Conference on Computer Aided Design (ICCAD), San Jose, CA, USA, Nov. 5–9, 2000. pp. 110–113.

Khoo, K. et al., An Efficient Multilayer MCM Router Based on Four–Via Routing, $30^{th}$ ACM/IEEE Design Automation Conference, 1993, pp. 590–595.

Lillis, J. et al., Table–Lookup Methods for Improved Performance–Driven Routing, 1998, pp. 368–373.

Lipski, W. et al., A Unified Approach to Layout Wirability, Mathimatical Systems Theory, 1987, pp. 189–203.

Lodi, E. et al., A Preliminary Study of a Diagonal Channel–Routing Model, Algorithmica, 1989, pp. 585–597.

Lodi, E. et al., Lecture Notes in Computer Sciences, A 4d Channel Router for a Two Layer Diagonal Model, pp. 464–476, Jul. 1988.

Naclerio, N. et al., Via Minimization for Gridless Layouts, 24th ACM/IEEE Design Automation Conference, 1987, pp. 159–165.

Nam, G. et al, Satisfiability–Based Layout Revisited: Detailed Routing of Complex FPGAs Via Search–Based Boolean SAT, 1999, pp. 167–175.

Oh, J. et al., Constructing Lower and Upper Bounded Delay Routing Trees Using Linear Programming, 33rd Design Automation Conference, 1996.

Partitioning Logic on to Graph Structure, IBM Technical Disclosure Bulletin, Feb. 1990, vol. 32, iss. 9A, pp. 469–475.

Phillips, N., Channel Routing by Constraint Logic, Department of Computer Science Southern Illinois University, ACM, 1992.

Takashima, Y. et al, Routability of FPGAs with Extremal Switch–Block Structures, IEICE Trans. Fundamentals, vol. E81–A, No. 5, May 1998, pp. 850–856.

Thakur, S. et al., Algorithms for a Switch Module Routing Problem, 1994, pp. 265–270.

Theune, D., et al., HERO: Hierarchical EMC–constrained routing, Nov. 1992, IEEE pp. 468–472.

Tseng, H., Timing and Crosstalk Driven Area Routing, pp. 378–381.

Wang, D., Novel Routing Schemes for IC Layout, Part I: Two–Layer Channel Routing, 28th ACM/IEEE Automation Conference, 1991, pp. 49–53.

Wang, M. et al., Modeling and Minimization of Routing Congestion, Jan. 2000, IEEE proceedings of ASP–DAC, Asia and South Pacific, pp. 185–190.

Wood, G. et al., FPGA Routing and Routability Estimation Via Boolean Satisfiability, Department of Electrical and Computer Engineering Carnegie Mellon University, Pittsburgh, PA, pp. 119–125.

Zhang, C.X. et al., Floorplan Design Using a Hierarchical Neutral Learning Algorithm, IEEE, Jun. 1991. pp. 2060–2063.

Zhou, H. et al., An Optimal Algorithm for River Routing with Crosstalk Constraints, 1996.

Zhou, H. et al., Global Routing with Crosstalk Constraints, Department of Computer Sciences, University of Texas, 1998, pp. 374–377.

Zhou, H. et al., Optimal River Routing with Crosstalk Constraints, ACM Transactions on Design Automation of Electronic Systems, vol. 3, No. 3, Jul. 1998, pp. 496–514.

A.H. Farrahi et al., Quality of EDA CAD Tools: Definitions, Metrics and Directions, Quality Electronic Design, 2000, Proceedings of the first International Symposium on Mar. 2000, pp. 395–405.

C. Chiang, et al., Wirability of Knock–Knee Layouts with 45° Wires, IEEE Transactions on Circuits and Systems, vol. 38, Issue 6, pp. 613–624, Jun. 1991.

J. Su et al., Post Route Optimization for Improved Yield Using Rubber–Band Wiring Model, 1997 International Conference on Computer–Aided Design, pp 700–706, Nov. 1997.

J. Vicente, RSR: A New Rectilinear Steiner Minimum Tree Approximation for FPGA Placement and Global Routing, Proceedings of the 24th Euro Micro Conference, pp 192–195, Aug. 1998.

K. Powers et al., The 60° Grid: Routing Channels in Width d/square root 3, VLSI, 1991, Proceedings., First Great Lakes Symposium on Kalamazoo, MI, USA, pp 214–291, Mar. 1991.

M. Alexander et al., Performance–Oriented Placement and Routing for field–programmable gate arrays, Proceedings of the European Design Automation Conference, pp. 80–85, 1995.

M. Alexander et al., Placement and Routing for Performance–Oriented FPGA Layout, VLSI Design, vol. 7, No. 1, 1998.

M. Igarashi et al., A Diagonal–Interconnect Architecture and Its Application to RISC Core Design, 2002 IEEE Solid–Sate Circuits Conference, pp 210–460, Feb. 2002.

P. Dood, et al. A Two–Dimensional Topological Compactor with Octagonal Geometry, 28th ACM/IEEE Design Automation Conference, pp 727–731, Jul. 1991.

P. Parikh, et al., Congestion Driven Quadratic Placement, Proceedings of Design Automation Conference, 1998, pp. 275–278.

R. Putatunda et al., Vital: Fully Automatic Placement Strategies for Very Large Semicustom Designs, Proceedings of the International Conference on Computer Design: VLSI in Computers and Processors, pp 434–439 Oct. 1988.

S. Dutt, et al., Probability–Based Approaches to VLSI Circuit Partitioning, IEEE Trans. on Computer–Aided Design of IC's and Systems, vol. 19, No. 5, May 2000, pp 534–549.

Y. Sekiyama et al., Timing–Oriented Routers for PCB Layout Design of High–Performance Computers, International Conference on Computer Aided Design, pp 332–335, Nov. 1991.

U.S. Appl. No. 09/737,210, Dec. 13, 2000, Teig et al.
U.S. Appl. No. 09/737,210, Dec. 13, 2000, Teig et al.
U.S. Appl. No. 09/737,220, Dec. 13, 2000, Teig et al.
U.S. Appl. No. 09/737,245, Dec. 13, 2000, Teig et al.
U.S. Appl. No. 09/739,460, Dec. 15, 2000, Teig et al.
U.S. Appl. No. 09/739,589, Dec. 15, 2000, Teig et al.
U.S. Appl. No. 09/742,171, Dec. 19, 2000, Teig et al.
U.S. Appl. No. 09/745,067, Dec. 19, 2000, Teig et al.
U.S. Appl. No. 09/745,067, Dec. 19, 2000, Teig et al.
U.S. Appl. No. 10/329,241, Dec. 23, 2002, Teig et al.
U.S. Appl. No. 10/329,241, Dec. 23, 2002, Teig et al.
U.S. Appl. No. 10/040,915, Jan. 5, 2002, Teig et al.
U.S. Appl. No. 10/040,948, Jan. 5, 2002, Teig et al.
U.S. Appl. No. 10/040,954, Jan. 5, 2002, Teig et al.
U.S. Appl. No. 10/040,953, Jan. 5, 2002, Teig et al.
U.S. Appl. No. 10/040,963, Jan. 5, 2002, Teig et al.
U.S. Appl. No. 10/041,942, Jan. 7, 2002, Teig et al.
U.S. Appl. No. 10/041,957, Jan. 7, 2002, Teig et al.
U.S. Appl. No. 10/046,864, Jan. 13, 2002, Teig et al.
U.S. Appl. No. 10/047,982, Jan. 14, 2002, Teig et al.
U.S. Appl. No. 10/047,978, Jan. 13, 2002, Teig et al.

* cited by examiner

Data Structure = $[\sum_{net} F(netconfig, path1), \sum_{net} F(netconfig, path2), \sum_{net} F(netconfig, path3), \bullet\bullet\bullet \sum_{net} F(netconfig, path42)]$

METHOD AND APPARATUS FOR PRE-COMPUTING AND USING PLACEMENT COSTS WITHIN A PARTITIONED REGION FOR MULTIPLE WIRING MODELS

CLAIM OF BENEFIT TO PRIOR APPLICATIONS

This application is a continuation application of U.S. patent application entitled "Recursive Partitioning Placement Method and Apparatus," filed on Dec. 6, 2000, and having the Ser. No. 09/732,181.

FIELD OF THE INVENTION

The invention is directed towards method and apparatus for pre-computing and using placement costs within a partitioned region for multiple wiring models.

BACKGROUND OF THE INVENTION

An integrated circuit ("IC") is a semiconductor device that includes many electronic components (e.g., transistors, resistors, diodes, etc.). These components are often interconnected to form multiple circuit components (e.g., gates, cells, memory units, arithmetic units, controllers, decoders, etc.) on the IC. The electronic and circuit components of IC's are jointly referred to below as "components."

An IC also includes multiple layers of metal and/or polysilicon wiring (collectively referred to below as "metal layers") that interconnect its electronic and circuit components. For instance, many IC's are currently fabricated with five metal layers. In theory, the wiring on the metal layers can be all-angle wiring (i.e., the wiring can be in any arbitrary direction). Such all-angle wiring is commonly referred to as Euclidean wiring. In practice, however, each metal layer typically has a preferred wiring direction, and the preferred direction alternates between successive metal layers. Many IC's use the Manhattan wiring model, which specifies alternating layers of preferred-direction horizontal and vertical wiring. In this wiring model, the majority of the wires can only make 90° turns. However, occasional diagonal jogs are sometimes allowed on the preferred horizontal and vertical layers.

Design engineers design IC's by transforming circuit description of the IC's into geometric descriptions, called layouts. To create layouts, design engineers typically use electronic design automation ("EDA") applications. These applications provide sets of computer-based tools for creating, editing, and analyzing IC design layouts.

EDA applications create layouts by using geometric shapes that represent different materials and devices on IC's. For instance, EDA tools commonly use rectangular lines to represent the wire segments that interconnect the IC components. These tools also represent electronic and circuit IC components as geometric objects with varying shapes and sizes. For the sake of simplifying the discussion, these geometric objects are shown as rectangular blocks in this document.

Also, in this document, the phrase "circuit module" refers to the geometric representation of an electronic or circuit IC component by an EDA application. EDA applications typically illustrate circuit modules with pins on their sides. These pins connect to the interconnect lines.

A net is typically defined as a collection of pins that need to be electrically connected. A list of all or some of the nets in a layout is referred to as a net list. In other words, a net list specifies a group of nets, which, in turn, specify the interconnections between a set of pins.

FIG. 1 illustrates an example of an IC layout 100. This layout includes five circuit modules 105, 110, 115, 120, and 125 with pins 130–160. Four interconnect lines 165–180 connect these modules through their pins. In addition, three nets specify the interconnection between the pins. Specifically, pins 135, 145, and 160 define a three-pin net, while pins 130 and 155, and pins 140 and 150 respectively define two two-pin nets. As shown in FIG. 1, a circuit module (such as 105) can have multiple pins on multiple nets.

The IC design process entails various operations. Some of the physical-design operations that EDA applications commonly perform to obtain the IC layouts are: (1) circuit partitioning, which partitions a circuit if the circuit is too large for a single chip; (2) floor planning, which finds the alignment and relative orientation of the circuit modules; (3) placement, which determines more precisely the positions of the circuit modules; (4) routing, which completes the interconnects between the circuit modules; (5) compaction, which compresses the layout to decrease the total IC area; and (6) verification, which checks the layout to ensure that it meets design and functional requirements.

Placement is a key operation in the physical design cycle. It is the process of arranging the circuit modules on a layout, in order to achieve certain objectives, such as reducing layout area, wirelength, wire congestion, etc. A poor placement configuration not only can consume a large area, but it also can make routing difficult and result in poor performance.

Numerous EDA placers have been proposed to date. Certain placers are constrained-optimization placers, which (1) use cost-calculating functions to generate placement scores (i.e., placement costs) that quantify the quality of placement configurations, and (2) use optimization algorithms to modify iteratively the placement configurations to improve the placement scores generated by the cost-calculating functions.

A constrained-optimization placer typically receives (1) a list of circuit modules, (2) an initial placement configuration for these modules, and (3) a net list that specifies the interconnections between the modules. The initial placement configuration can be random (i.e., all the modules can be positioned randomly). Alternatively, the initial configuration can be partially or completely specified by a previous physical-design operation, such as the floor planning.

A constrained-optimization placer then uses a cost-calculating function to measure the quality of the initial placement configuration. The cost function generates a metric score that is indicative of the placement quality. Different cost-calculating functions measure different placement metrics. For instance, as further described below, some functions measure wirelength (e.g., measure each net's minimum spanning tree, Steiner tree, or bounding-box perimeter, etc.), while others measure congestion (e.g., measure number of nets intersected by cut lines).

After calculating the metric cost of the initial placement configuration, a constrained-optimization placer uses an optimization algorithm to modify iteratively the placement configuration to improve the placement score generated by its cost-calculating function. Different optimization techniques modify the placement configuration differently. For instance, at each iteration, some techniques move one circuit module, others swap two modules, and yet others move a number of related modules. Also, at each iteration, some optimization techniques (e.g., KLFM and tabu search algorithms) search for the best move, while others (e.g., simulated annealing and local optimization) select random moves. In addition, some techniques (e.g., simulated annealing) accept moves that make the metric score worse, whereas others (e.g., local optimization) do not.

Five types of constrained-optimization placement techniques are described below.

A. Min-Cut Bipartitioning.

Some placers use min-cut bipartitioning. This technique uses horizontal and vertical cut lines to partition the IC layout recursively into successive pairs of regions. At each level of the recursion, this technique then moves the circuit modules between the regions at that level, in order to reduce the number of nets intersected by the cut line for that level. By minimizing the net-cut cost at each level of the recursion, these techniques reduce the wire congestion across the cut lines.

FIGS. 2 and 3 illustrate one example of min-cut bipartitioning. FIG. 2 illustrates an IC layout 200 that is partitioned initially in two regions 210 and 215 by a vertical cut line 205. After defining this initial cut line, the min-cut bipartitioning method calculates the number of nets that are intersected by this cut line. This number is indicative of the wire congestion about this cut line. An optimization algorithm (such as KLFM) is then used to modify the initial placement iteratively (i.e., to move the circuit modules iteratively), in order to minimize the net-cut cost across the initial cut line 205.

Once the congestion across the initial cut line is minimized, the min-cut bipartitioning method is applied recursively to the two regions created by the initial cut line, and then it is applied to the resulting regions created by the succeeding cut lines, and so on. FIG. 3 illustrates the IC layout 200 after it has been recursively partitioned by seven cut lines 205 and 220–245.

B. Semi-Perimeter Method.

The semi-perimeter method is another cost-calculating function used by some constrained-optimization techniques. This method quickly generates an estimate of the wirelength cost of a placement. For each net, this method typically (1) finds the smallest bounding-box rectangle that encloses all the net's pins, and (2) computes half the perimeter of this bounding rectangle.

FIG. 4 illustrates a bounding box 400 for a net that contains pins 135, 145, and 160 of FIG. 1. The computed semi-perimeter value of this box 400 equals the sum of its width 405 and height 410. This computed semi-perimeter value provides a lower bound estimate on the amount of wire required to route a net.

The semi-perimeter method sums the semi-perimeter values of all the bounding rectangles of all the nets to obtain an estimated wirelength cost for a placement configuration. An optimization technique can then be used to modify iteratively the placement configuration to reduce this wirelength cost estimate, and thereby obtain an acceptable placement configuration.

C. Minimum Spanning Tree.

To estimate the wirelength cost of placement configurations, some constrained-optimization placement techniques compute and add the length of the rectilinear minimum spanning tree ("RMST") for each net. A net's RMST is typically defined as a tree that connects (i.e., spans) the net's pins through the shortest Manhattan wiring route that only branches at the pin locations.

More specifically, the RMST for an N-pin net includes (1) N nodes (also called points or vertices) corresponding to the N pins, and (2) N-1 edges that connect its N nodes. In addition, the edges of the RMST are either horizontal or vertical, and these edges start and end at one of the N nodes of the tree. FIG. 5 illustrates a RMST 505 for the net that contains pins 135, 145, and 160 of FIG. 1.

The sum of the length of the RMST for each net provides an estimate of the wirelength cost of a placement. An optimization algorithm can then be used to modify iteratively the placement configuration to minimize this wirelength cost.

D. Steiner Tree.

Rectilinear Steiner trees are another type of tree structure that constrained-optimization placement techniques generate to estimate the wirelength cost of placement configurations. Rectilinear Steiner trees are similar to RMST's except that Steiner trees do not restrict branching to only pin locations. In rectilinear Steiner trees, a horizontal or vertical edge can branch from a point on an edge that connects two other net pins.

To construct a Steiner tree for an N-pin net, additional points, called Steiner points, are typically added to the net. If R Steiner points are added to the net, the rectilinear Steiner tree for the N-pin net is the RMST on the N+R points. FIG. 6 illustrates a Steiner tree 605 for the net that contains pins 135, 145, and 160 of FIG. 1. In this example, the Steiner point that has been added is point 610.

Heuristic techniques are often used to select the R Steiner points and construct the Steiner tree, since these problems cannot be solved in polynomial time. A heuristic technique is a clever algorithm that only searches inside a subspace of the total search space for a good rather than the best solution that satisfies all design constraints.

Hence, to get an estimate of the wirelength cost of a placement, some constrained-optimization placement techniques use heuristic approximations to identify rectilinear Steiner trees for the nets. The sum of the length of the heuristic Steiner trees for all the nets provides an estimate of the wirelength cost of a placement. An optimization algorithm can then be used to modify iteratively the placement configuration to minimize this wirelength cost.

E. Recursive Grid Partitioning.

Recursive grid partitioning is another technique for calculating the wirelength cost of placement configurations. A recursive-grid-partitioning placer typically uses sets of crossing horizontal and vertical lines to divide an IC layout recursively into several sub-regions. At each recursion level, the placer then uses an optimization algorithm to move the circuit modules between the sub-regions defined at that recursion level, in order to reduce the wirelength cost. After minimizing the wirelength cost at a particular recursion level, the placer recursively partitions that level's sub-regions that meet certain criteria, in order to optimize further the wirelength cost within those partitioned sub-regions.

FIGS. 7 and 8 illustrate two examples of this technique. In FIG. 7, an IC layout 700 is recursively divided into quadrisections (i.e., into four regions). Under this approach, minimum spanning trees are typically used to estimate the wirelength cost for connecting modules in different quadrisections.

FIG. 8 illustrates recursively dividing an IC layout 800 into nine regions. This style of partitioning is sometimes referred to as "sharp" partitioning. For this type of partitioning, Steiner trees are typically used to estimate the wirelength cost for connecting modules in different regions.

The above-described placement techniques do not consider diagonal wiring in calculating their placement-configuration cost. Hence, when diagonal routes are selected for the interconnect lines, these techniques result in poor placement configurations, which inefficiently consume the layout area, utilize too much wire, and/or have poor wire congestions. Consequently, there is a need in the art for placers that consider diagonal wiring in calculating their placement-configuration costs.

SUMMARY OF THE INVENTION

Some embodiments of the invention use a recursive partitioning method to place circuit elements in an IC layout. This method starts each time it receives the coordinates for a region of the IC layout. The received region can be the entire IC layout, or a portion of this layout. In some embodiments, this method also receives a net list that specifies all the net's that have circuit elements (e.g., have pins or circuit modules) in the received IC region. In other embodiments, the method receives a list of all the circuit elements (e.g., a list of all pins or circuit modules) in the received IC region, and from this list the method identifies the nets that have circuit elements in the received IC region.

This method initially defines a number of partitioning lines that divide the received IC region into several sub-regions (also called slots). In some embodiments, the partitioning lines are intersecting cut lines that define a partitioning grid. In some of these embodiments, the intersecting partitioning lines are N horizontal and M vertical lines that divide the received IC region into (N+1)(M+1) sub-regions, where N and M can equal any integer.

After defining the partitioning lines, the placement method identifies, for each received or identified net, the set of sub-regions (i.e., the set of slots) that contain the circuit elements (e.g., the pins or circuit modules) of that net. The set of sub-regions for each net represents the net's configuration with respect to the defined partitioning lines.

Next, for each received or identified net, the placement method identifies attribute or attributes of a connection graph that models the net's configuration with respect to the partitioning lines. The connection graph for each net provides a topology of interconnect lines that connect the slots that contain the net's circuit elements. According to some embodiments of the invention, the connection graph for each net can have edges that are completely or partially diagonal.

Different embodiments identify different attributes of a net's connection graph. The attributes can include the length of the connection graph, the number of bends in the connection graph, the probability of the connection graph intersecting the partitioning lines, etc. Also, some embodiments might just identify one attribute (e.g., length) of each net's connection graph, while other embodiments might identify several attributes (e.g., length and number of bends) of each net's connection graph.

In some embodiments, the placement method identifies the attribute or attributes of each net's connection graph by constructing this connection graph in real-time and quantifying its attribute or attributes during or after the construction of the graph. However, other embodiments identify the attributes of the connection graphs in a different manner. Before the placement method starts, these embodiments (1) construct the connection graphs for each possible net configuration with respect to the partitioning lines, and (2) pre-tabulate the attributes of the connection graphs in memory. Some embodiments might pre-tabulate the multiple attributes of the connection graphs. Also, some embodiments might pre-tabulate attributes of connection graphs that are based on different wiring models. During placement, these pre-tabulating embodiments then retrieve, for each identified net configuration, the attribute or attributes of the connection graph associated with the identified net configuration from memory.

The placement method calculates the cost of the placement layout within the received region from the identified connection-graph attributes. For instance, when the identified attribute is the length of the graphs, some embodiments calculate the cost of a placement configuration within the received IC region, by combining (e.g., summing, multiplying, etc.) the length of the graphs, associated with the net configurations, within the received region. Alternatively, when the identified attributes are the length and bend-count of the graphs, some embodiments calculate the placement cost by generating a weighted sum of the length and bend-count.

Next, the placement method uses an optimization algorithm that iteratively modifies the placement configuration in the received IC regions, in order to improve the placement cost. Different embodiments of the invention use different optimization techniques, such as annealing, local optimization, KLFM, tabu search, etc.

After each iterative modification during optimization, the placement configuration is re-calculated by repeating the cost-calculating operations described above for all the nets or for just the nets on which the moved circuit element or elements reside. After optimizing the placement configuration within a received region, the placement method recursively performs the above-described partitioning and optimization operations on each sub-region defined that meets one or more criteria. For instance, some embodiments recursively perform the partitioning and optimization operations on each sub-region that contains more than a specified number of circuit elements.

BRIEF DESCRIPTION OF THE DRAWINGS

The novel features of the invention are set forth in the appended claims. However, for purpose of explanation, several embodiments of the invention are set forth in the following figures.

FIG. 28 illustrates edge-intersect counts for the trees illustrated in FIGS. 13–15.

FIG. 29 illustrates edge-intersect probabilities for the trees illustrated in FIGS. 13–15.

DETAILED DESCRIPTION OF THE INVENTION

The invention is directed towards recursive partitioning placement method and apparatus. In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Several embodiments of the invention's recursive partitioning technique are described below. However, before discussing these embodiments, several diagonal wiring architectures that can be used in conjunction with these embodiments are described in Section I.

I. Diagonal Wiring Architecture

Some embodiments of the invention calculate the cost of placement configurations for IC layouts that have diagonal interconnect lines (i.e., diagonal wiring). In some of these embodiments, the IC layouts not only have diagonal interconnect lines, but also have horizontal and vertical interconnect lines.

As used in this document, an interconnect line is "diagonal" if it forms an angle other than zero or ninety degrees with respect to the layout boundary. On the other hand, an interconnect line is "horizontal" or "vertical" if it forms an angle of 0° or 90° with respect to one of the sides of the layout.

Figure 9:
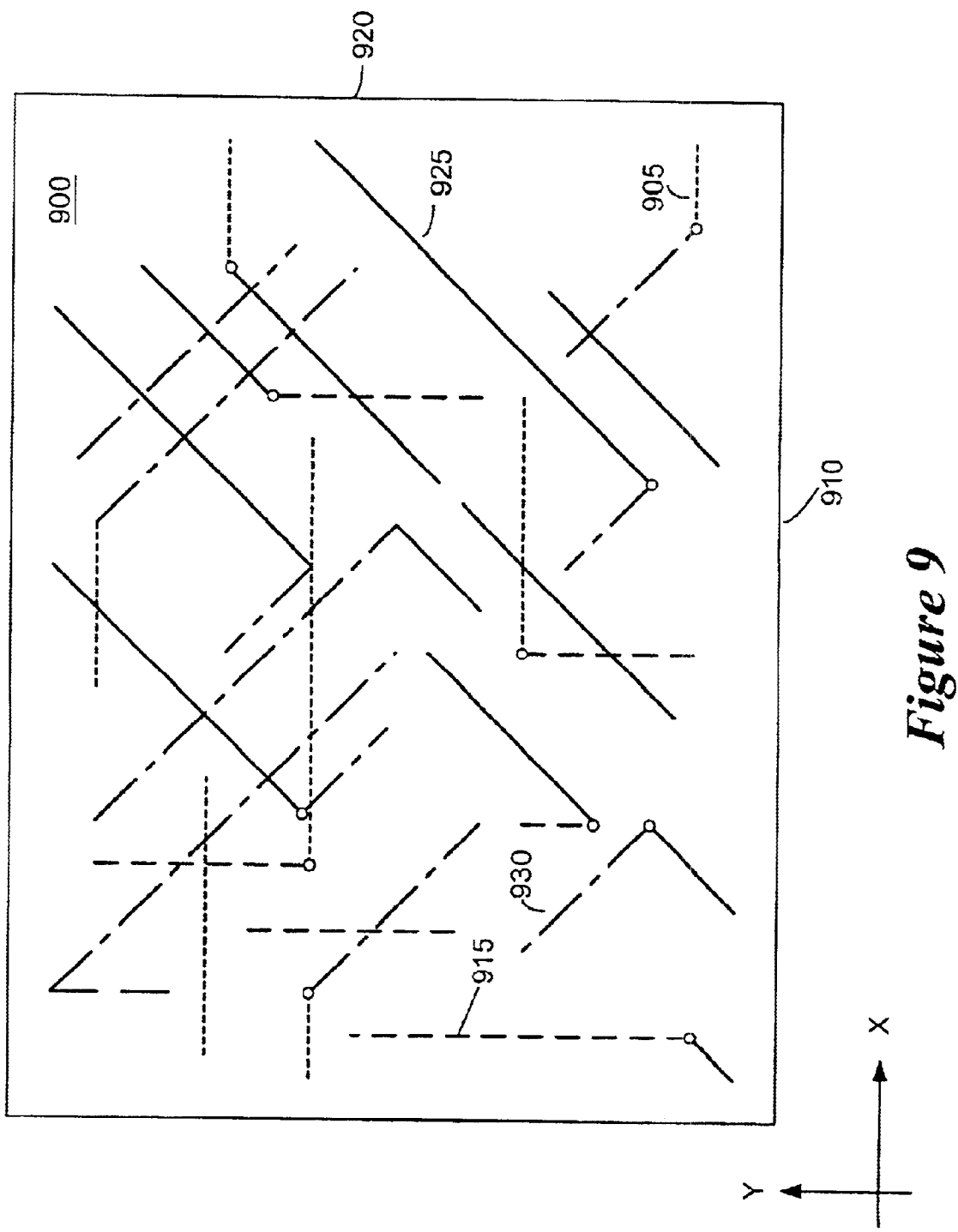
FIG. 9 illustrates the wiring architecture of an IC layout that not only uses diagonal lines, but also uses horizontal and vertical lines.

FIG. 9 illustrates the wiring architecture (i.e., the interconnect-line architecture) of an IC layout 900 that utilizes horizontal, vertical, and 45° diagonal interconnect lines. In this document, this architecture is referred to as the octagonal wiring model, in order to convey that an interconnect line can traverse in eight separate directions from any given point.

The horizontal lines 905 are the lines that are parallel (i.e., are at 0°) to the x-axis, which is defined to be parallel to the width 910 of the layout. The vertical lines 915 are parallel to the y-axis, which is defined to be parallel to the height 920 of the layout. In other words, the vertical interconnect lines 915 are perpendicular (i.e., are at 90°) to the width of the IC layout. In this architecture, one set 925 of diagonal lines are at +45° with respect to the width of the IC layout, while another set 930 are at −45° with respect to the width of the IC layout.

Figure 10:
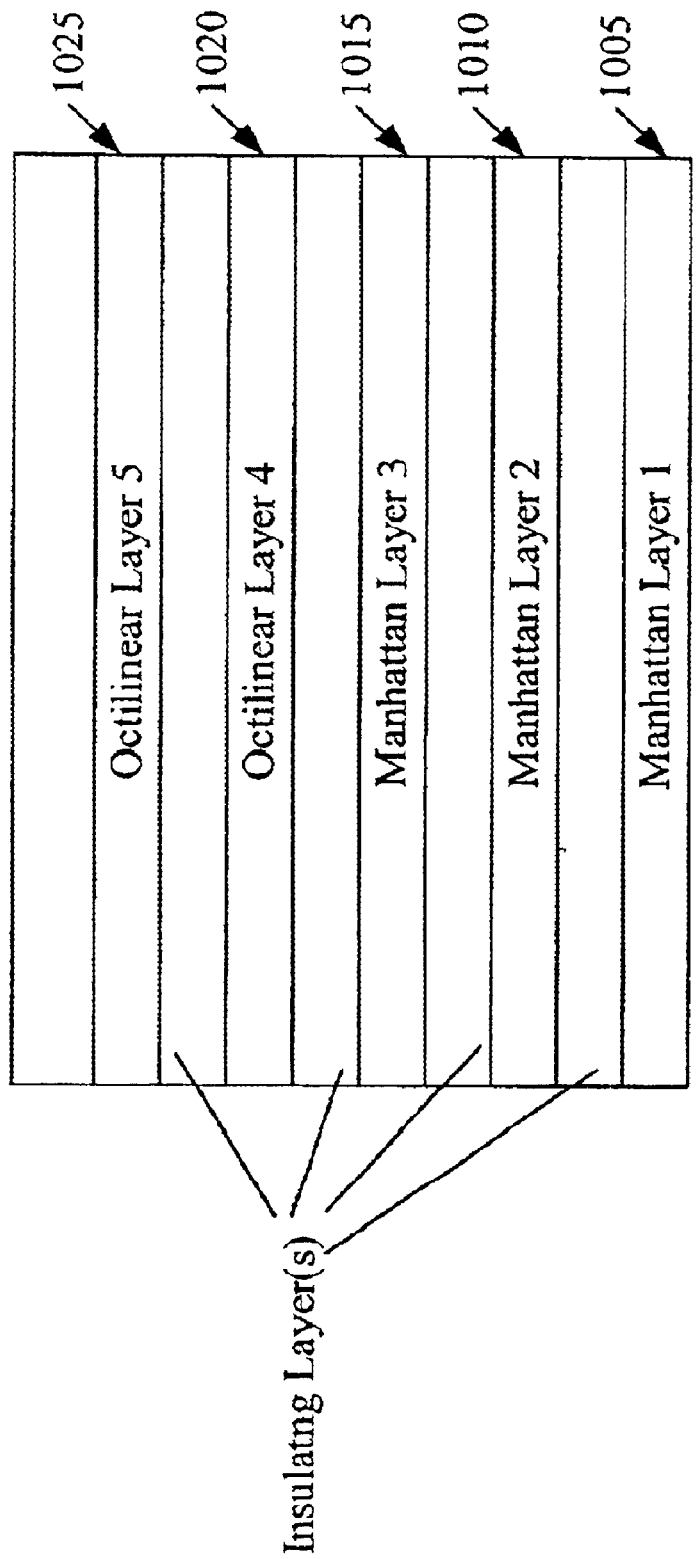
FIG. 10 illustrates one manner of implementing the wiring architecture illustrated in FIG. 9.

FIG. 10 illustrates one manner of implementing the wiring architecture illustrated in FIG. 9 on an IC. Specifically, FIG. 10 illustrates five metal layers for an IC. The first three layers 1005–1015 are Manhattan layers. In other words, the preferred direction for the wiring in these layers is either the horizontal direction or the vertical direction. The preferred wiring direction in the first three layers typically alternates so that no two consecutive layers have the same direction wiring. However, in some cases, the wiring in consecutive layers is in the same direction.

The next two layers 1020 and 1025 are diagonal layers. The preferred direction for the wiring in the diagonal layers is ±45°. Also, as in the first three layers, the wiring directions in the fourth and fifth layer are typically orthogonal (i.e., one layer is +45° and the other is −45°), although they do not have to be.

Even though some embodiments of the invention are described below to work with IC layouts that utilize the above-described octagonal wiring model, one of ordinary skill will understand that the invention can be used with any wiring model. For instance, the invention can be used with wiring architectures that are strictly diagonal (i.e., that do not have horizontal and vertical preferred direction wiring).

Also, some embodiments are used with non −45° diagonal wiring. For example, some embodiments are used with IC layouts that have horizontal, vertical, and ±120° diagonal interconnect lines. In this document, such a wiring architecture is referred to as the hexagonal wiring model, in order to convey that an interconnect line can traverse in six separate directions from any given point.

II. Conceptual Flow

Figure 11:
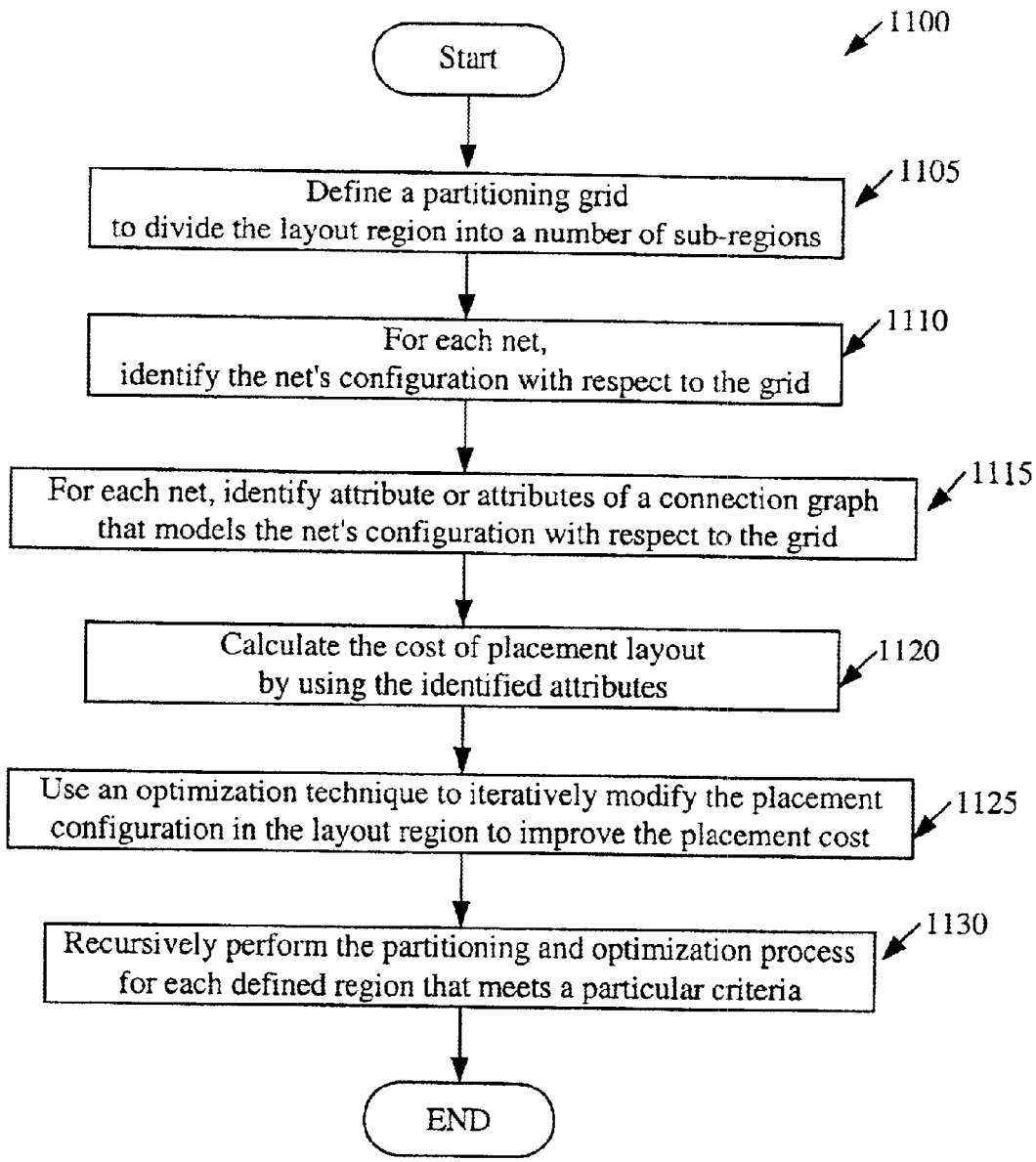
FIG. 11 presents a process that conceptually illustrates the operational flow of a placer that utilizes the recursive grid partitioning technique of some embodiments of the invention.

FIG. 11 conceptually illustrates the operational flow of a placement-process 1100 of some embodiments of the invention. This process starts each time it receives the coordinates for a region of the IC layout. The received region can be the entire IC layout, or a portion of this layout.

In some embodiments, this process also receives a net list that specifies all the net's that have circuit elements in the received IC region. In other embodiments, the process receives a list of all the circuit elements in the received IC region, and from this list identifies the nets that have circuit elements in the received IC region.

Each received or identified net has several circuit elements associated with it (i.e., each net is defined to include several circuit elements). In some embodiments, the circuit elements associated with the nets are the pins of the circuit modules in the IC layout. However, in the embodiments described below, the circuit elements are the circuit modules. Some of these embodiments treat the circuit modules as the net circuit elements and obviate the need to distinguish between the different pin locations, by assuming that the pins of each module are all located at uniform locations (e.g., located at the origin of the modules).

Also, in some embodiment, the locations of the circuit elements in the received IC region define a placement configuration within this region. In some embodiments, the initial circuit-element positions before the process 1100 starts are random. Alternatively, some embodiments use a previous physical-design operation, such as the floor planning, to partially or completely specify the initial positions of these elements. Still other embodiments use another placer to specify the initial positions of the circuit elements in the received IC region, and then use process 1100 to optimize the placement configuration for a wiring architecture that uses diagonal wiring.

As shown in FIG. 11, the process 1100 initially defines (at 1105) partitioning lines that divide the received IC region into several sub-regions (also called slots). In the embodiments described below, the partitioning lines are intersecting lines that define a partitioning grid. In some of these embodiments, the intersecting partitioning lines are N horizontal and M vertical lines that divide the received IC region into (N+1)(M+1) sub-regions, where N and M can equal any integer. For instance, these horizontal and vertical lines divide the received IC region into (1) four sections when N and M equal 1, (2) nine sections when N and M equal 2, (3) sixteen sections when N and M equal 3, or (4) twenty sections when either N or M equals 4 and the other equals 5.

Figure 12:
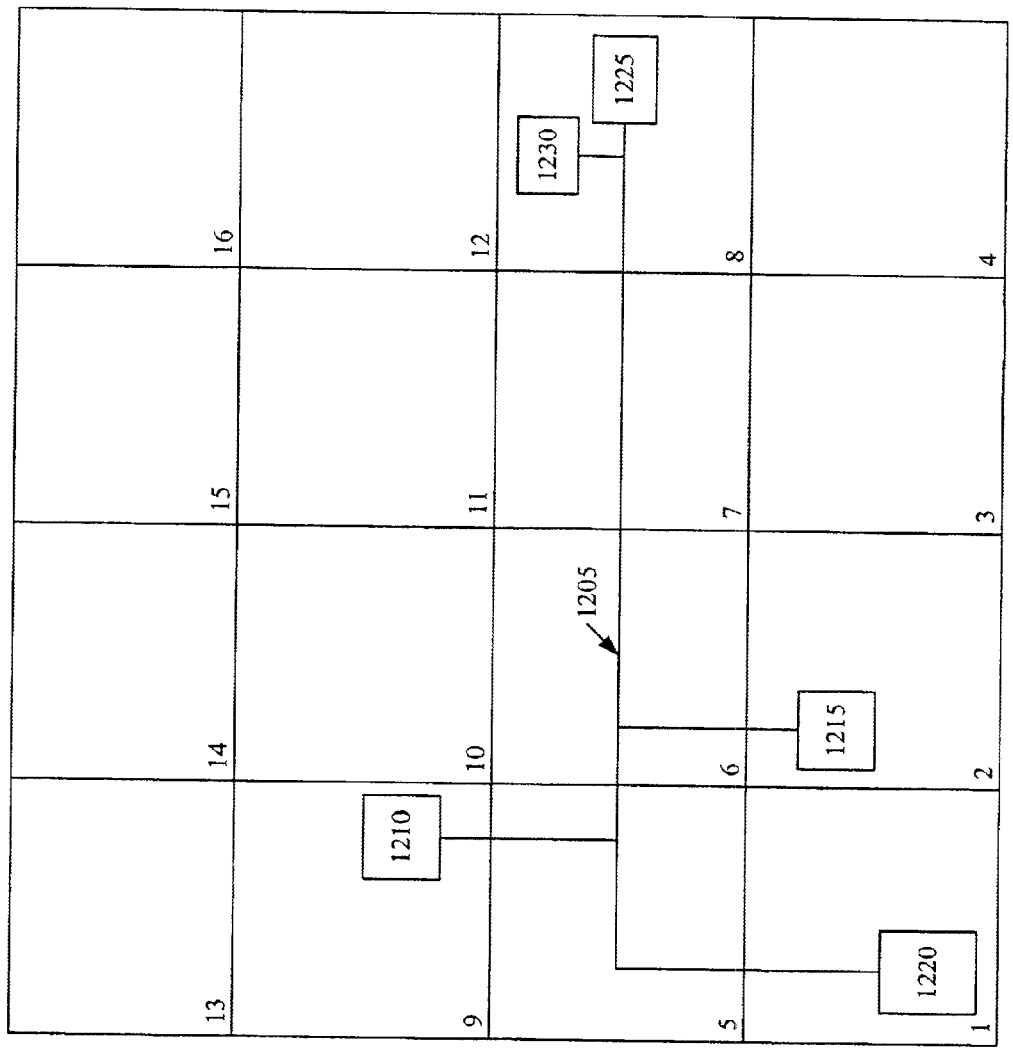
FIG. 12 illustrates an IC layout that has been divided into sixteen sub-regions by sets of three horizontal and vertical partitioning lines.

FIG. 12 illustrates an IC layout 1200 that has been divided into sixteen sub-regions by sets of three horizontal and vertical partitioning lines. This figure also shows a net 1205 that includes five circuit modules 1210, 1215, 1220, 1225, and 1230, which fall into four of the sixteen sub-regions. These four sub-regions are slots 1, 2, 8, and 9.

After defining the partitioning grid at 1105, the process identifies (at 1110), for each received or identified net, the set of sub-regions (i.e., the set of slots) that contain the circuit modules of that net. The identified set of sub-regions for each net represents the net's configuration with respect to the defined grid.

For each received or identified net, the process next identifies (at 1115) attribute or attributes of a connection graph that models the net's configuration with respect to the grid. Specifically, for each net, the connection graph provides a topology of interconnect lines that connect the slots that contain the net's circuit modules.

To model each net's configuration with respect to the grid, each slot that contains one or more of the net's circuit modules is treated as a node (also called a vertex or point) of the connection graph. The nodes of the graph are then connected by edges (also called lines). According to some embodiments of the invention, the connection graph can have edges that are completely or partially diagonal.

At 1115, different embodiments identify different attributes of a net's connection graph. The attributes can include the length of the connection graph, the number of bends in the connection graph, the probability of the connection graph intersecting the partitioning lines, etc. Also, at 1115, some embodiments might just identify one attribute (e.g., length) of each net's connection graph, while other embodiments might identify several attributes (e.g., length and number of bends) of each net's connection graph.

Figure 13:
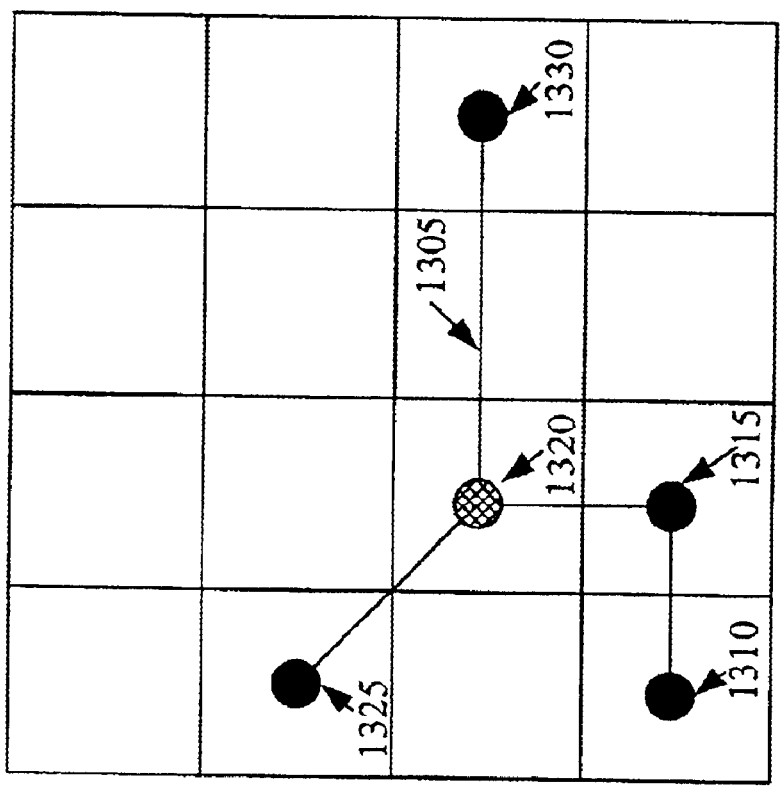
FIG. 13–15 illustrate three optimal Steiner trees for a net illustrated in FIG. 12.
Figure 15:
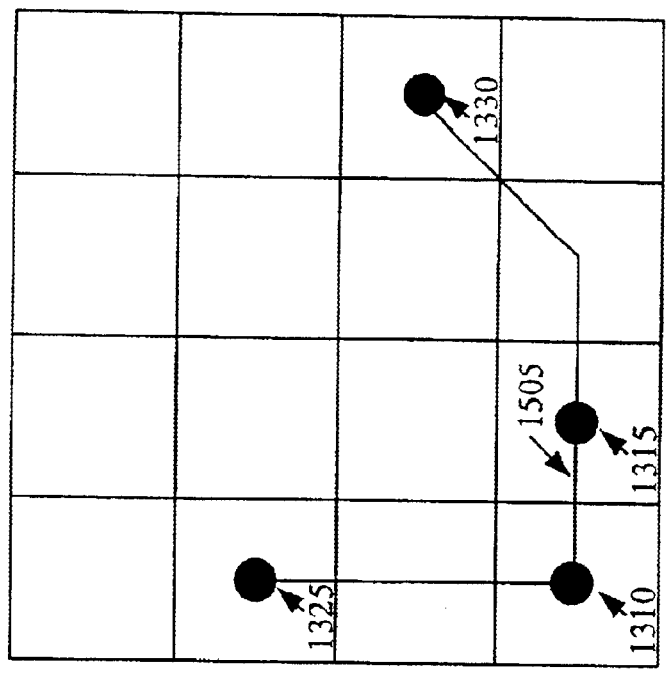
Figure 14:
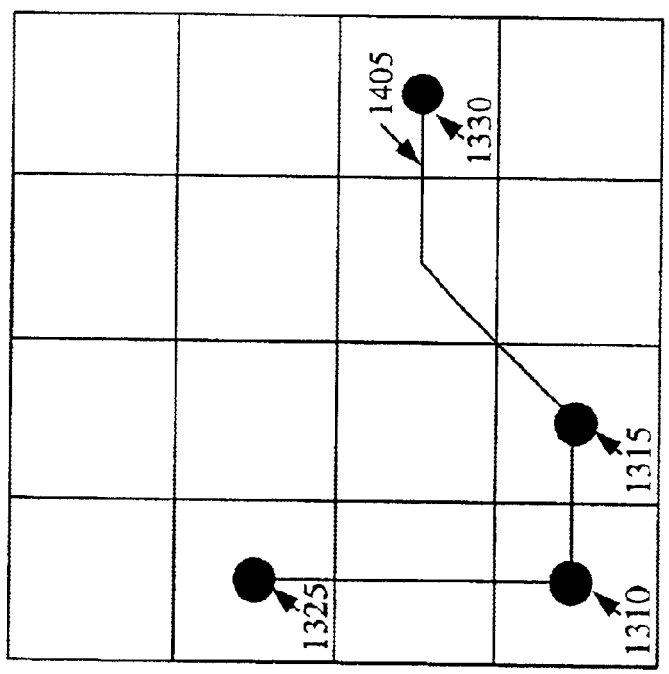

For each net, some embodiments use a Steiner tree as the connection graph that connects the slots containing the net's circuit modules. FIG. 13-15 illustrate three optimal Steiner trees 1305, 1405, and 1505 for the net 1205 in FIG. 12. These Steiner trees all have the same length. One of these trees (1305) has a Steiner node (1320). In addition, each of these trees has at least one edge that is partially diagonal. In these examples, the diagonal edges are at 45° degrees with respect to the layout boundary. When the octagonal wiring model is used, the length of these Steiner trees is an approximation of the interconnect-line length necessary for net 1205 at the current partitioning grid level.

In some embodiments, the process identifies (at 1115) the attribute or attributes of each net's connection graph by constructing this connection graph in real-time and quantifying its attribute or attributes during or after the construction of the graph. However, the embodiments described below identify the attributes of the connection graphs in a different manner. Before the process 1100 starts, these embodiments (1) construct the connection graphs for each possible net configuration with respect to the partitioning grid, and (2) pre-tabulate the attributes of the connection graphs in memory. During placement, these pre-tabulating embodiments then retrieve (at 1115) the attribute or attributes of the connection graph of each identified net configuration from memory.

Some embodiments might pre-tabulate multiple attributes of the connection graphs (such as length, number of bends, probabilities for intersecting partitioning lines, etc.). Also, some embodiments might pre-tabulate attributes of connection graphs that are based on different wiring models. Section III below explains several processes for pre-tabulating different attributes of Steiner trees for different wiring architectures.

At 1120, the process 1100 uses the attributes identified at 1115 to calculate the cost of the placement layout within the received region. For instance, when the process identifies the probabilities of the partitioning lines being cut, some embodiments compute a congestion cost estimate based on these probabilities. Alternatively, when the identified attribute is the length of the graphs, some embodiments calculate the cost of a placement configuration within the received IC region, by combining (e.g., summing, multiplying, etc.) the length of the graphs associated with the net configurations within the received region.

Some embodiments calculate the placement cost based on more than one type of attribute for each connection graph. For instance, some embodiments calculate the placement cost of the graphs by combining (e.g., generating a weighted sum of) the length and bend-count of the graphs. Other embodiments might combine these two attributes of a net's connection graph by using as the net's cost the length of the shortest connection graph that has less than a maximum bend count; if all the connection graphs have more than the maximum bend count, some of these embodiments use as the net's cost the length of the shortest connection graph that has less than an incremented maximum bend count.

Next, at 1125, the process uses an optimization algorithm that iteratively modifies the placement configuration in the received IC regions, in order to improve the placement cost. Different embodiments of the invention use different optimization techniques, such as annealing, local optimization, KLFM, tabu search, etc. Also, different optimization techniques modify the placement configuration differently. For instance, at each iteration, some techniques move one circuit module, others swap two modules, and yet others move several related modules, between the sub-regions defined at 1105. Also, at each iteration, some optimization techniques (e.g., KLFM and tabu search algorithms) search for the best move, while others (e.g., simulated annealing and local optimization) select random moves. In addition, some techniques (e.g., simulated annealing) accept moves that make the metric score worse, whereas others (e.g., local optimization) do not.

After each iterative modification during optimization, the placement configuration is re-calculated by repeating the cost-calculating operations 1110–1120 for all the nets or for just the nets on which the moved circuit module or modules reside. After optimizing the placement configuration at 1125, the process 1100 recursively performs the partitioning and optimization operations 1105–1125 on each sub-region defined at 1105 that meets one or more criteria. For instance, some embodiments recursively perform the partitioning and optimization operations on each sub-region that contains more than a specified number of circuit modules.

Some embodiments use different shaped partitioning grids for different levels in the recursion process. Other embodiments use same shaped partitioning grids for all the recursion levels. At each recursion level, these embodiments simply adjust the coordinates of the partitioning grid to match the coordinates of the IC region at that recursion level. Using the same shaped partitioning grids for all the recursion levels has several advantages. For instance, it allows the pre-tabulating embodiments to store only net configuration attributes for one partitioning grid; these attributes can be re-used at all the recursion levels because they can be used to define the relative costs of the net configurations at any one level.

III. Pre-Tabulating Attributes of Steiner Trees

FIGS. 16–33 illustrate one manner of pre-tabulating attributes of Steiner trees that model possible net configurations with respect to a partitioning grid.

A. Pre-Tabulating Length and/or Bend Count

1. Calculating the Length of an Interconnect Line Connecting Two Nodes of a Connection Graph, and Detecting a Bend in this Line.

Figure 16:
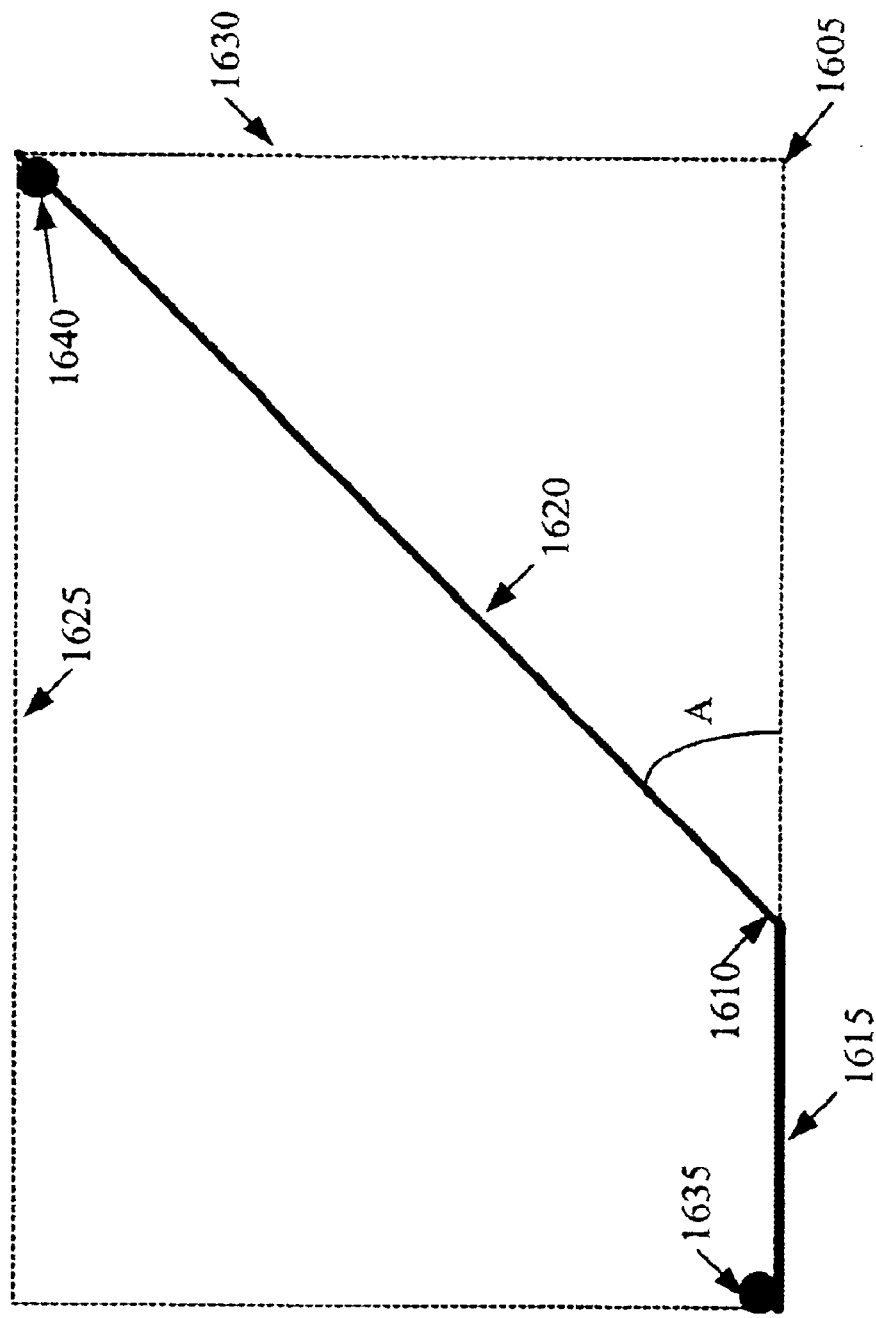
FIG. 16 presents an example of a bounding-box for two nodes two nodes of a connection graph.
Figure 17A:
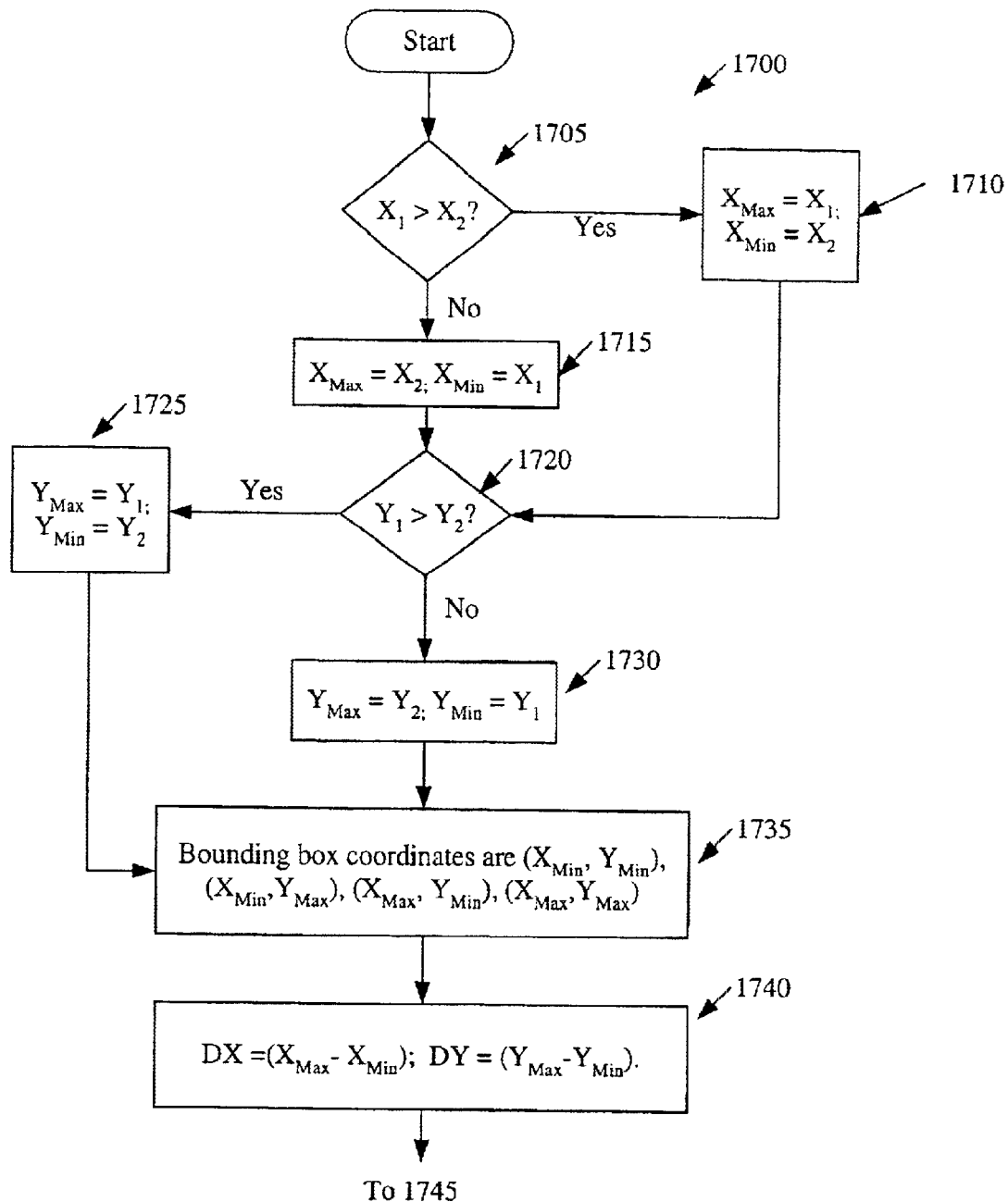
FIG. 17 illustrates a process that (1) identifies a bounding box for two nodes of a connection tree, and (2) computes the shortest distance between the two nodes.
Figure 17B:
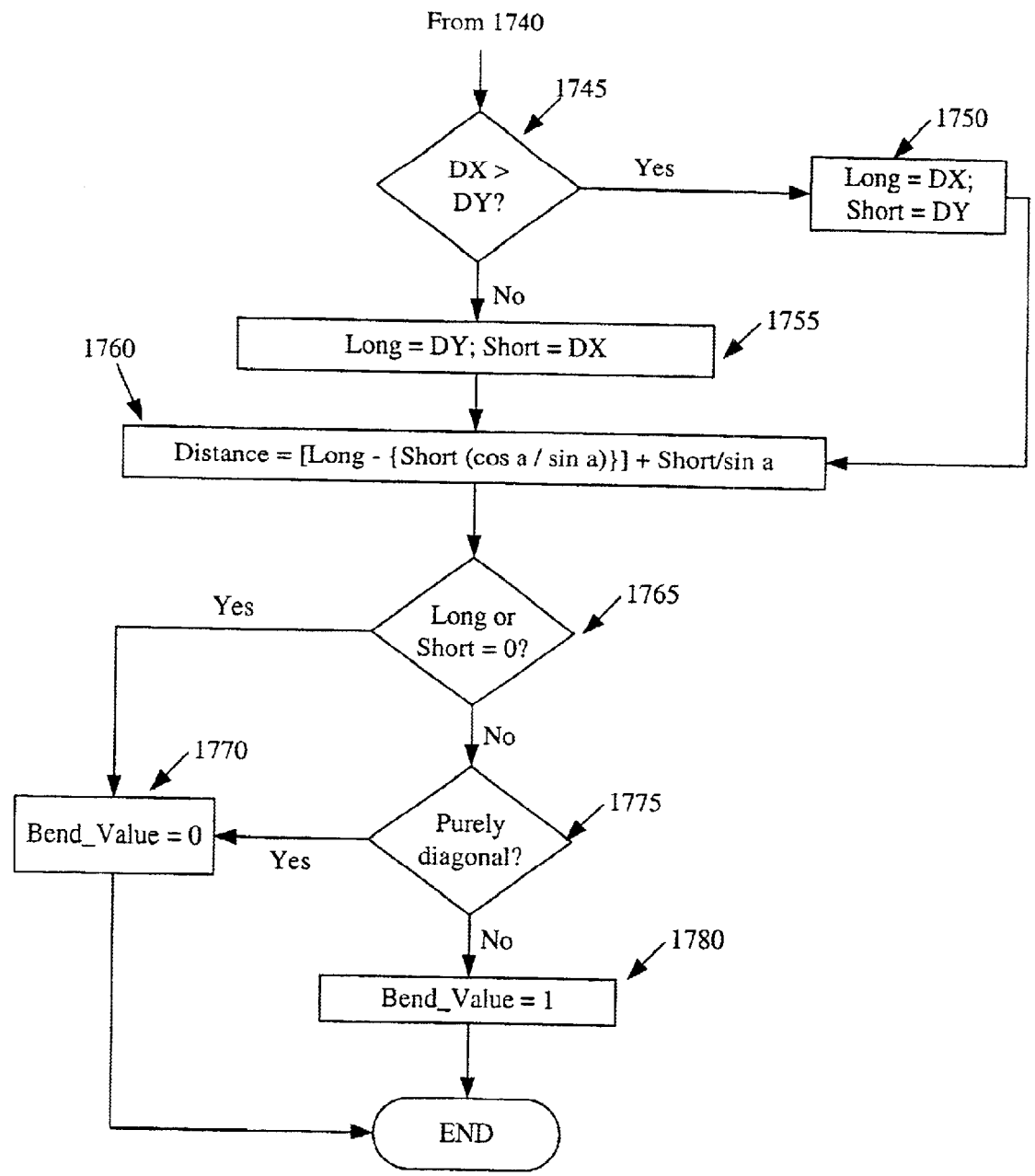

FIGS. 16 and 17 illustrate how some embodiments (1) calculate the length of an interconnect line connecting two nodes of a connection graph, and (2) detect whether this line has a diagonal bend. These embodiments perform these operations by treating the two nodes as opposing corners of a bounding box that has a long side (L) and a short side (S).

FIG. 16 presents an example of a bounding-box 1605 for two nodes 1635 and 1640. As shown in this figure, the line 1610 traverses the shortest distance between nodes 1635 and 1640 for IC layouts that utilize horizontal, vertical, and diagonal interconnect lines. This line is partially diagonal. Specifically, in this example, one segment 1620 of this line is diagonal, while another segment 1615 is horizontal.

Equation (A) below provides the distance traversed by line 1610 (i.e., the minimum distance between the nodes 1635 and 1640).

$$\text{Distance} = [L - \{S(\cos A / \sin A)\}] + S/\sin A \quad (A)$$

In this equation, "L" is the box's long side, which in this example is the box's width 1625 along the x-axis, while "S" is the box's short side, which in this example is its height 1630 along the y-axis. Also, in this equation, "A" is the angle that the diagonal segment 1620 makes with respect to the long side of the bounding box.

In some embodiments, this angle A corresponds to the direction of some of the diagonal interconnect lines in the IC layout. For instance, in some embodiments, the angle A equals 45° when the IC layout uses the octagonal wiring model. In this manner, the diagonal cut 1620 across the bounding box represents a potential diagonal interconnect line that forms the connection between the two nodes.

Equations (B)–(D) below illustrate how Equation (A) is derived. The length of the line 1610 equals the sum of the lengths of its two segments 1615 and 1620. Equation (B) provides the length of the horizontal segment 1615, while Equation (C) provides the length of the diagonal segment 1620.

$$\text{Length of } 1615 = L - (\text{Length of } 1620) * (\cos A) \quad (B)$$

$$\text{Length of } 1620 = S/\sin A \quad (C)$$

Equations (B) and (C) can be combined to obtain Equation (D) below, which when simplified provides Equation (A) above.

$$\text{Distance} = \text{Length of } 1615 + \text{Length of } 1620 \quad (D)$$

$$= L - S/\sin A * (\cos A) + S/\sin A$$

When the angle A equals 45°, Equation (A) simplifies to Equation (E) below.

$$\text{Distance} = L + S * (\text{sqrt}(2) - 1) \quad (E)$$

When the bounding box has no width or height, then the bounding box is just a line, and the minimum distance between the opposing corners of this line is provided by the box's long (and only) side, which will be a horizontal or vertical line. When the bounding box has equal sized height and width (i.e., when it is a square) and the angle A is 45°, a line that is completely diagonal specifies the shortest distance between the box's two opposing corners. When the bounding box has different sized height and width (i.e., when it is a rectangle) and the angle A is 45°, a line that has a diagonal bend (i.e., a line that has a diagonal component and a vertical or horizontal component) provides the minimum distance between the opposing corners of this bounding box.

When the angle A corresponds to the direction of some of the diagonal interconnect lines in the IC layout, the minimum distance computed by Equation (A) is an approximation of the shortest length of wiring required to connect two hypothetical modules or pins represented by the nodes 1635 and 1640. This distance might be shorter than the actual wiring path necessary for connecting the two nodes, as it may not be possible to route the net along line 1610. The distance value computed by Equation (A) simply provides a lower-bound estimate on the interconnect-line length required to connect the two nodes in a wiring architecture that utilizes horizontal, vertical, and diagonal wiring. Some embodiments also use this equation for other arbitrary wiring models. However, some of these embodiments select the angle A among several choices so that the distance quantified by this equation is minimized.

FIG. 17 illustrates a process 1700 that (1) identifies a bounding box for two nodes of a connection tree, (2) calculates the length of an interconnect line connecting the two nodes based on the bounding box's dimensions and Equation (A), and (3) detects whether the interconnect line has a diagonal bend.

This process initially (at 1705) determines whether the x-coordinate ($X_1$) of the first node is greater than the x-coordinate ($X_2$) of the second node. If so, the process defines (at 1710) the x-coordinate ($X_1$) of the first node as the maximum x-coordinate ($X_{Max}$), and the x-coordinate ($X_2$) of the second node as the minimum x-coordinate ($X_{Min}$). Otherwise, the process defines (at 1715) the x-coordinate ($X_2$) of the second node as the maximum x-coordinate ($X_{Max}$), and the x-coordinate ($X_1$) of the first node as the minimum x-coordinate ($X_{Min}$).

Next, the process determines (at 1720) whether the y-coordinate ($Y_1$) of the first node is greater than the y-coordinate ($Y_2$) of the second node. If so, the process defines (at 1725) the y-coordinate ($Y_1$) of the first node as the maximum y-coordinate ($Y_{Max}$), and the y-coordinate ($Y_2$) of the second node as the minimum y-coordinate ($Y_{Min}$). Otherwise, the process defines (at 1730) the y-coordinate ($Y_2$) of the second node as the maximum y-coordinate ($Y_{Max}$), and the y-coordinate ($Y_1$) of the first node as the minimum y-coordinate ($Y_{Min}$).

The process then defines (at 1735) the four coordinates of the bounding box as ($X_{MIN}$, $Y_{MIN}$), ($X_{MIN}$, $Y_{MAX}$), ($X_{MAX}$, $Y_{MIN}$), and ($X_{MAX}$, $Y_{MAX}$). Next, the process determines (at 1740) the bounding-box's width and height. The process determines (1) the width by taken the difference between the box's maximum and minimum x-coordinates, and (2) the height by taking the difference between the box's maximum and minimum y-coordinates. The process then determines (at 1745) whether the computed width is greater than the computed height. If so, the process defines (1750) the width as the long side and the height as the short side. Otherwise, the process defines (at 1755) the width as the short side and the height as the long side.

After 1750 or 1755, the process then uses (at 1760) the above-described Equation (A) to compute the length of the shortest interconnect line that connects the two nodes. The process then determines whether the interconnect line has a diagonal bend. Even though the process 1700 only counts the diagonal bends, other embodiments count other types of bends (e.g., 90° bends from horizontal to vertical lines), especially when non-octagonal wiring architectures are used.

To determine whether the interconnect line has a diagonal bend, the process 1700 initially determines (at 1765) whether the long or short side of the computed bounding box equals zero. If so, the interconnect line is a vertical or horizontal line that does not have a diagonal bend, and thereby the process sets (at 1770) the bend value of this line to zero.

Otherwise, the process determines (at 1775) whether the interconnect line is purely diagonal. When the angle A in Equation (A) is defined to be 45° or less, the process determines whether the interconnect line is purely diagonal by ascertaining whether the arctan of the bounding box's short side divided by its long side equals the angle A. When the angle A in Equation (A) is defined to be more than 45°, the process determines whether the interconnect line is purely diagonal by ascertaining whether the arctan of the bounding box's long side divided by its short side equals the angle A.

If the process determines that the interconnect line is purely diagonal, then the process sets (at 1770) the bend value of this line to zero as this line has no diagonal bend. Otherwise, the interconnect line has a diagonal bend (i.e., it has a diagonal segment and a vertical or horizontal segment), and therefore the process sets (at 1780) the bend value of this line to 1. After 1770 or 1780, the process ends.

2. Constructing Steiner Trees for all Possible Net Configurations and Pre-Tabulating Length and/or Bend Count for Each Tree.

Figure 18A:
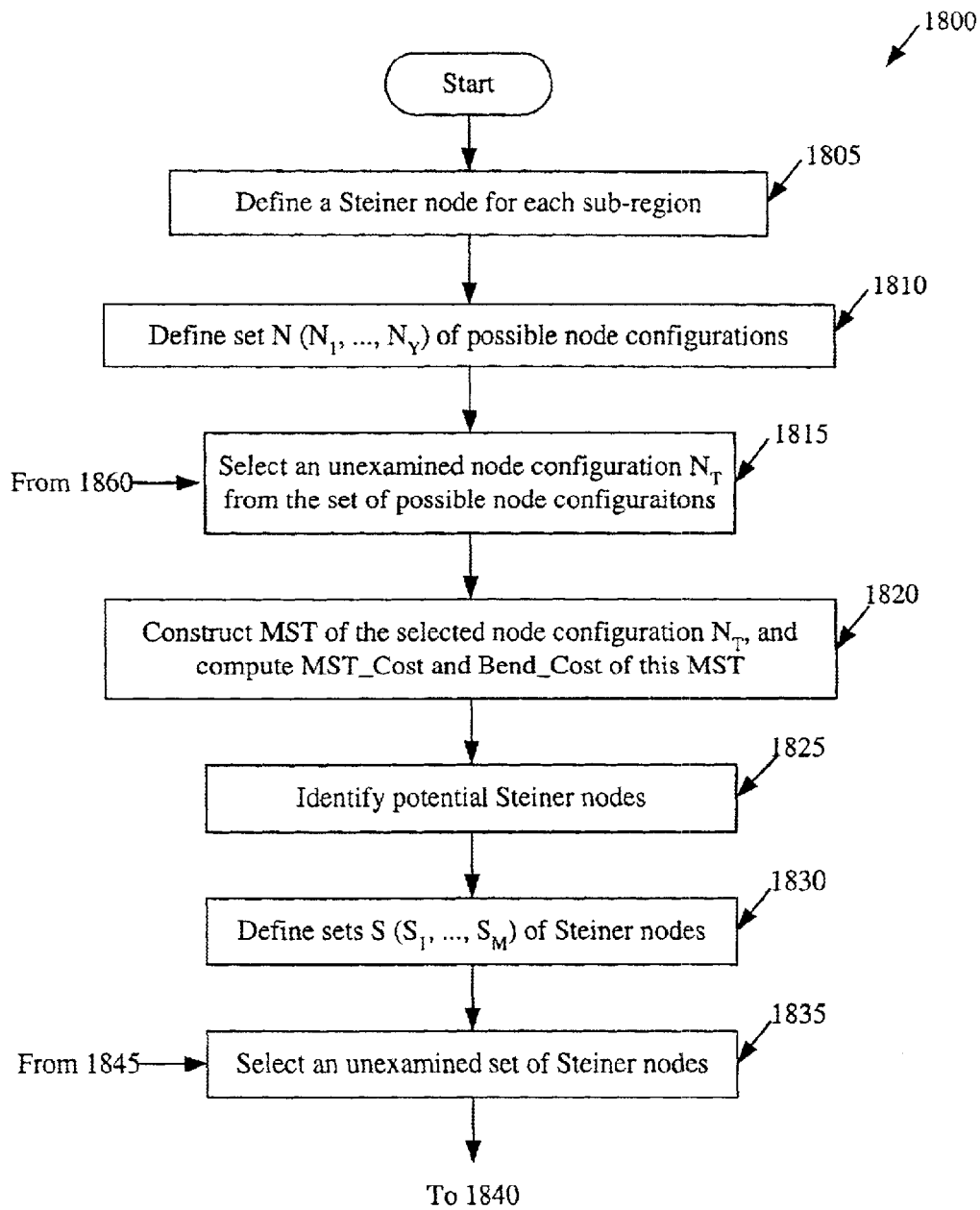
FIG. 18 illustrates a process that constructs Steiner trees for each possible net configuration with respect to a partitioning grid, and stores the length and bend-count of each constructed Steiner tree in a data structure.
Figure 18B:
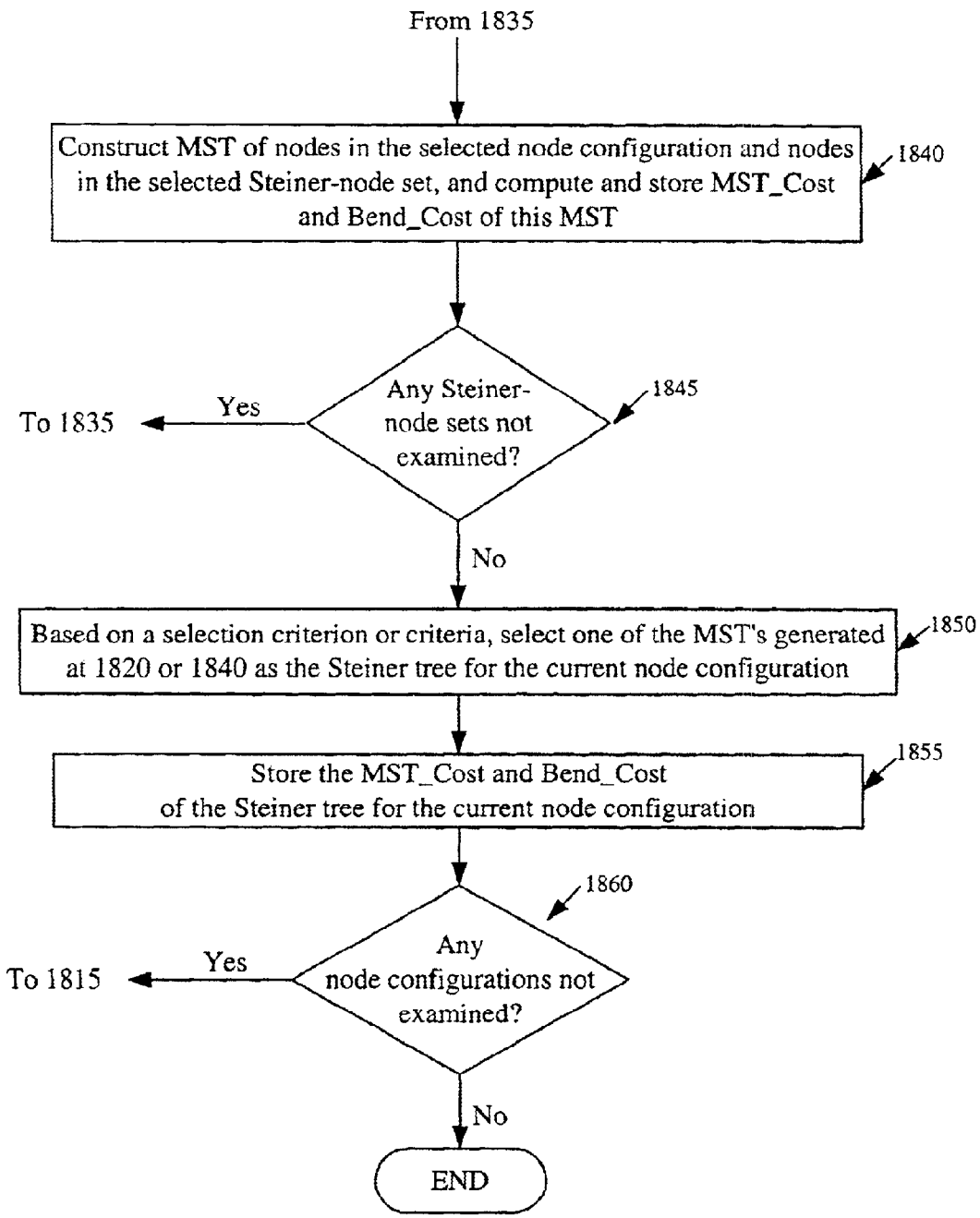

FIG. 18 illustrates a process 1800 that (1) constructs Steiner trees for each possible net configuration with respect to a partitioning grid, and (2) stores the length and/or diagonal bend-count of each constructed Steiner tree in a look-up table ("LUT"). This process is performed before the placement process 1100 of FIG. 11, so that the placement process in real-time does not have to construct and measure the length and/or bend-count of the Steiner tree for each net configuration. Instead, after process 1800 pre-tabulates the length and/or bend-count of the Steiner trees that model all possible the net configurations, the placement process 1100 needs only to (1) identify the configuration of each net with respect to the partitioning grid, (2) retrieve stored attributes for the identified-configurations, and (3) calculate the placement cost based on these retrieved attributes.

Figure 19:
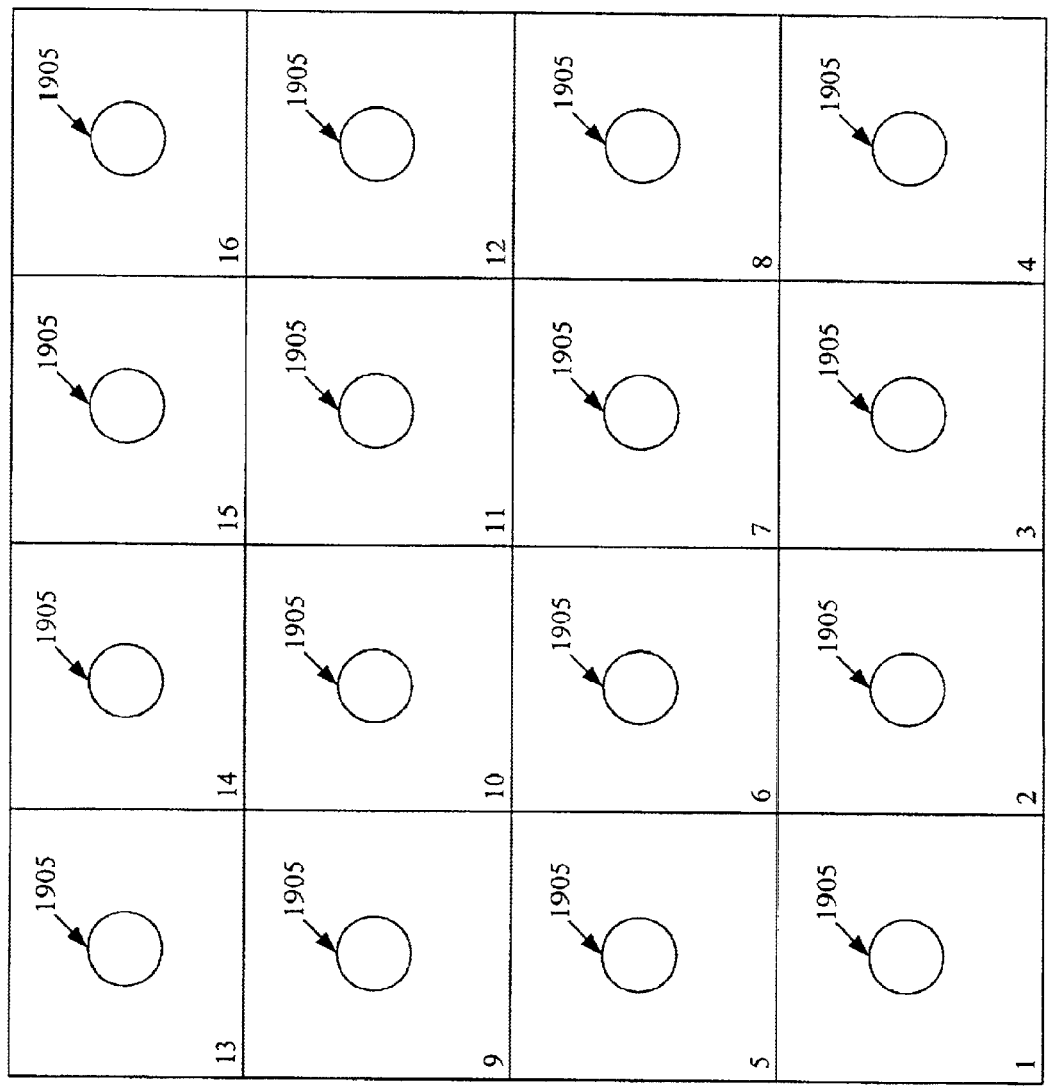
FIG. 19 pictorially illustrates sixteen Steiner-tree nodes for sixteen slots created by a 4-by-4 partitioning grid.

As shown in FIG. 18, process 1800 initially starts (at 1805) by defining a Steiner-tree node for each sub-region (also called slot) defined by a particular partitioning grid. FIG. 19 pictorially illustrates sixteen Steiner-tree nodes 1905 for sixteen slots created by a 4-by-4 partitioning grid. These nodes represent all the potential nodes of Steiner trees that model the interconnect topologies of all the net configurations. In FIG. 19, the identified nodes are positioned at the center of each slot. In other embodiments, the nodes can uniformly be defined at other locations in the slots (e.g., can be uniformly positioned at one of the corners of the slots).

Figure 20:
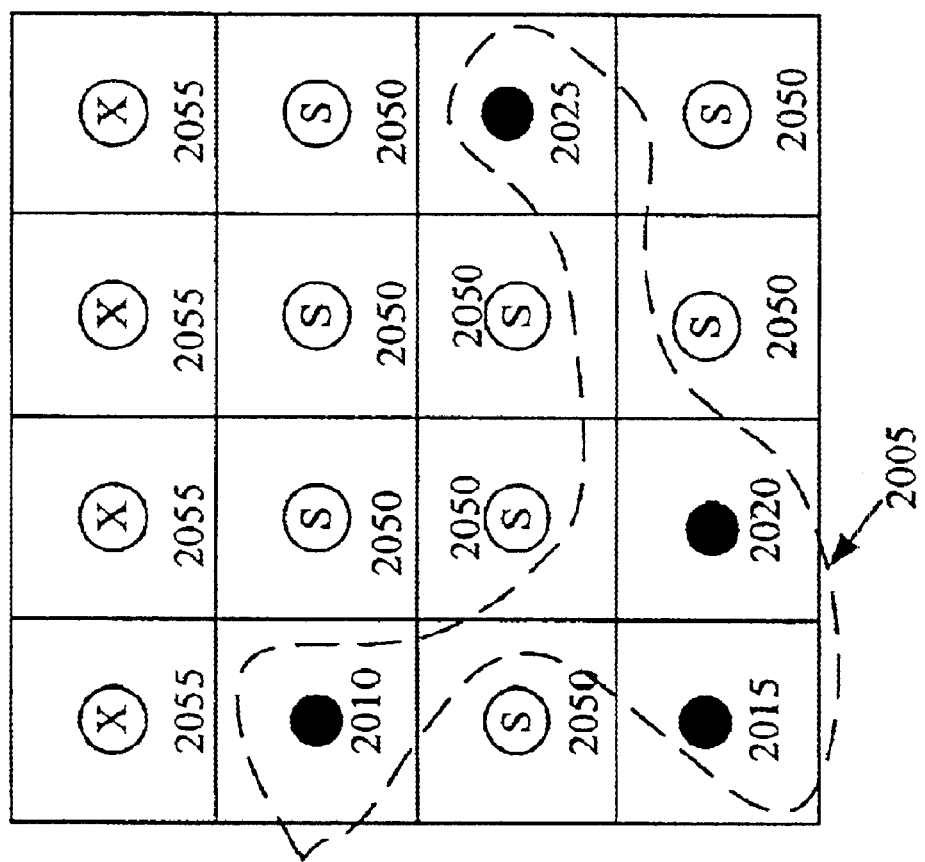
FIG. 20 illustrates one possible node configuration.

Next, the process 1800 defines (at 1810) a set N of possible node configurations. When the grid partitioning defines Y (e.g., four, nine, sixteen, twenty, etc.) sub-regions, set N includes $2^Y$ node configurations. After defining the set N of possible node configurations, the process 1800 select (at 1815) one of the possible node configurations $N_T$ from this set. FIG. 20 illustrates one possible configuration, which includes nodes 2010, 2015, 2020, and 2025. This node configuration coincides with the node configuration for the net 1205 illustrated in FIG. 12.

The process then constructs (at 1820) a minimum spanning tree ("MST") for the node configuration selected at 1815, and computes this tree's length (MST_Cost) and diagonal bend-count (Bend_Cost). The process constructs this minimum spanning tree by using edges that can be completely or partially diagonal. One manner of constructing such a MST and computing its length and bend-count will be described below by reference to FIG. 22.

Figure 21:
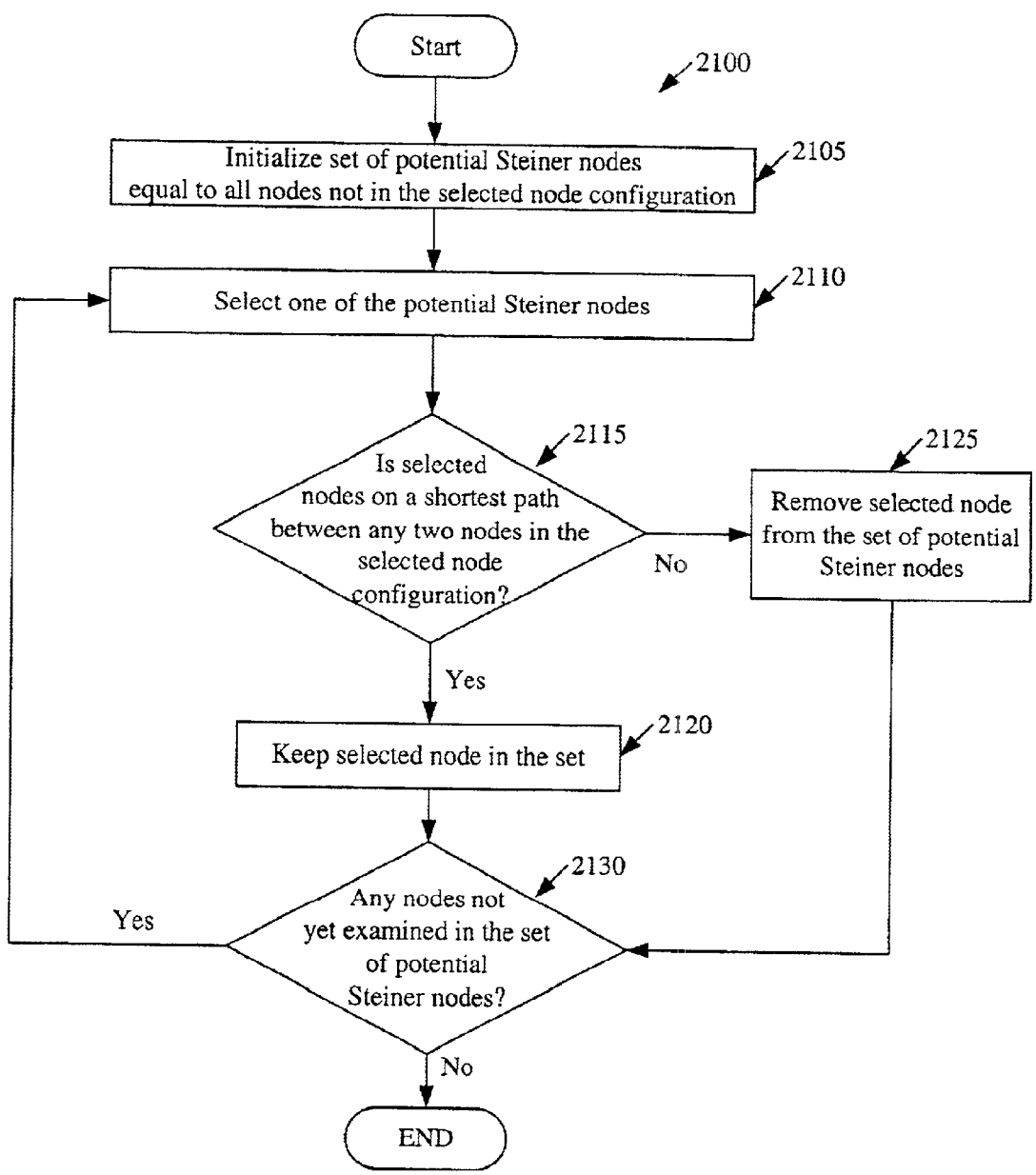
FIG. 21 illustrates the process for selecting potential Steiner nodes.

After constructing the MST for the selected node configuration, the process 1800 identifies (at 1825) potential Steiner nodes. FIG. 21 illustrates a process 2100 for identifying potential Steiner nodes. This process starts (at 2105) by initializing a set P of potential Steiner nodes equal to all the nodes defined at 1805 that are not part of the node configuration selected at 1815. This process then selects (at 2110) one of the potential Steiner nodes.

Next, the process 2100 determines (at 2115) whether the node (Q) selected at 2110 is on a shortest path between any two nodes in the selected node configuration. To make this determination, the process determines whether any two nodes (B and C) exit in the node configuration such that the distance between the two nodes (B and C) equals the sum of (1) the distance between the first node (B) and the selected node (Q), and (2) the distance between the second node (C) and the selected node (Q). In some embodiments, the process uses the above-described process 1700 and Equation (A) to calculate the distance between any pair of nodes.

If the process determines that the node Q selected at 2110 lies on a shortest path between any two nodes in the node configuration, the process keeps (at 2120) the selected node in the set P of potential Steiner nodes, flags this node as a node that it has examined, and transitions to 2130, which is described below. On the other hand, if the selected node (Q) is not on the shortest path between any two nodes in the selected node configuration, the process removes (at 2125) the selected node from the set P of potential Steiner nodes, and transitions to 2130.

At 2130, the process determines whether it has examined all the nodes in the set of potential Steiner nodes. If not, the process returns to 2110 to select another node in this set so that it can determine at 2115 whether this node is on a shortest path between any two nodes in the selected node configuration. When the process determines (at 2130) that it has examined all the nodes in the set of potential Steiner nodes, it ends.

FIG. 20 pictorially illustrates the result of performing process 2100 for the node configuration 2005. Specifically, this figure illustrates several potential Steiner nodes 2050, and several non-Steiner nodes 2055. The process 2100 initially defines the set of potential Steiner nodes to include all the nodes 2050 and 2055 that are not in the node configuration 2005. The process then removes the nodes 2055 from this set as these nodes do not lie on the shortest path between any two nodes in the selected node configuration.

Once the process 1800 performs (at 1825) the process 2100 of FIG. 21 to identify potential Steiner nodes, the process 1800 defines (at 1830) all possible sets of Steiner nodes. Each defined set of Steiner nodes includes one or more of the Steiner nodes identified at 1825. Also, each defined set of Steiner nodes has a maximum size that is two nodes less than the number of nodes in the selected node configuration.

The process 1800 then selects (at 1835) one of the Steiner-node sets defined at 1830. The process then (at 1840) (1) constructs a minimum spanning tree (MST) for the nodes in the selected node configuration and the selected Steiner-node set, and (2) computes and stores this MST's length (MST_Cost) and diagonal bend-count (Bend_Cost). The process constructs this MST by using edges that can be completely or partially diagonal. One manner of constructing such a MST and computing its length and bend-count will be described below by reference to FIG. 22.

Next, the process determines (at 1845) whether, in the Steiner node sets defined at 1830, there are any additional Steiner-node sets that it has not yet examined. If so, the process returns to 1835 to select another Steiner-node set, so that it can construct a MST for the nodes of this set and the nodes in the selected node configuration.

When the process determines (at 1845) that it has generated MST's of the selected node configuration and each Steiner-node set, the process uses (at 1850) a selection criterion to select one of the MST's generated at 1820 and 1840 as the Steiner tree for the current node configuration (i.e., the node configuration selected at 1815). In different embodiments, the process 1800 uses different selection criteria. For instance, in some embodiments, the process selects (at 1850) the MST with the smallest length (i.e., the MST with the smallest MST_Cost stored at 1820 and 1840).

In other embodiments, the process uses both the length and bend-count values to formulate a selection criterion or criteria. For instance, some embodiments select the shortest MST that has less than a maximum number of bends (e.g., the shortest MST that has less than two diagonal bends). If all the generated MST's have more than the maximum bend count, some of these embodiments select the shortest MST that has less than an incremented maximum bend count (e.g., the shortest MST that has less than three diagonal bends). Yet other embodiments combine each generated MST's length and bend-count (e.g., generate a weighted sum of the MST_Cost and the Bend_Cost) to obtain a combined score, based on which they select one of the MST's.

The process then stores (at 1855) in a storage structure (such as a LUT) the length (MST_Cost) and bend-count (Bend_Cost) of the Steiner tree identified at 1850. During the placement operation, a placer can then quickly identify the length and bend-count of the Steiner tree for the current node configuration by retrieving the stored length and bend-count from the storage structure.

The process next determines (at 1860) whether it has examined all the node configurations in the set N defined at 1810. If not, the process returns to 1815 to select unexamined node configuration from this set and then repeat operations 1820–55 to determine and store the Steiner length and bend-count for this node configuration. Otherwise, the process ends.

Figure 22:
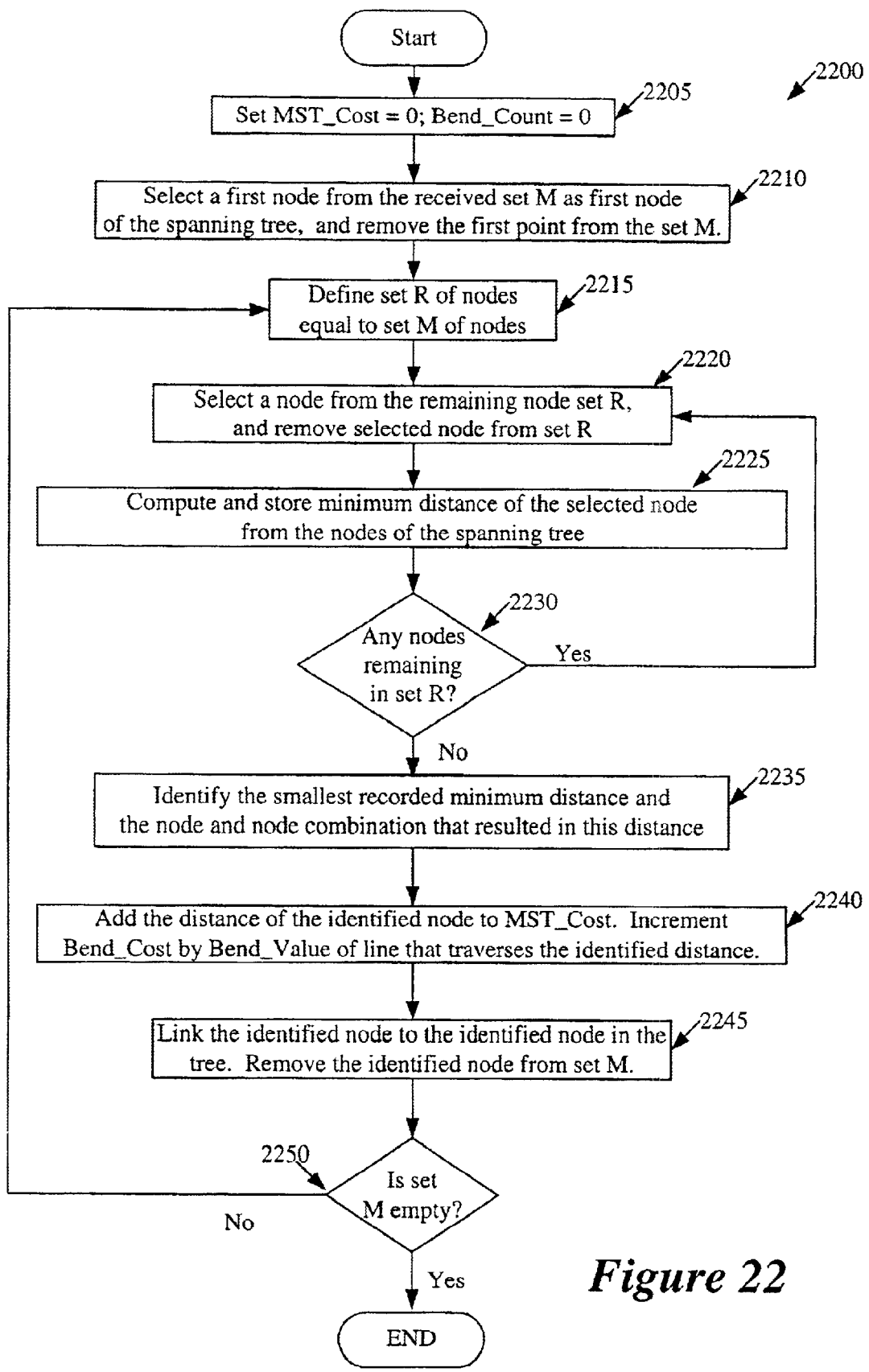
FIG. 22 illustrates a process used construct minimum spanning trees.

FIG. 22 illustrates a process 2200 that the process 1800 of FIG. 18 uses at 1820 and 1840 to construct minimum spanning trees. A minimum spanning tree for a node configuration is a tree that has N-1 edges that connect (i.e., span) the N nodes of the configuration through the shortest route, which only branches (i.e., starts or ends) at the nodes. The length of a MST for a net configuration provides a lower-bound estimate of the amount of wire needed to interconnect the nodes associated with the net configuration.

In some embodiments of the invention, the edges of the MST's can be horizontal, vertical, or diagonal. The diagonal edges can be completely or partially diagonal. Also, when the IC layouts use diagonal interconnect lines (e.g., ±120° interconnect lines), the diagonal edges of the MST's can be in the same direction (e.g., can be in ±120° direction) as some of the diagonal interconnect lines in the layout.

Figure 1:
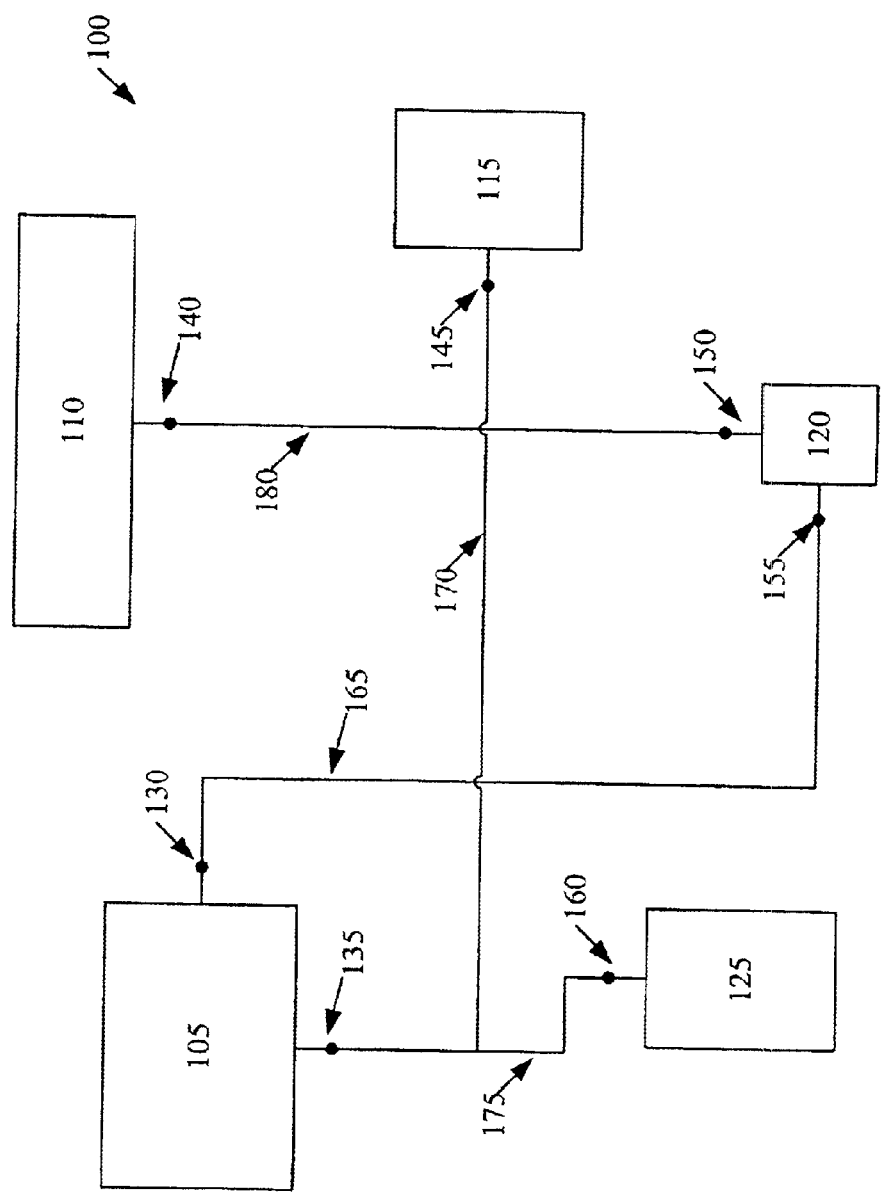
FIG. 1 illustrates an example of an IC layout.
Figure 3:
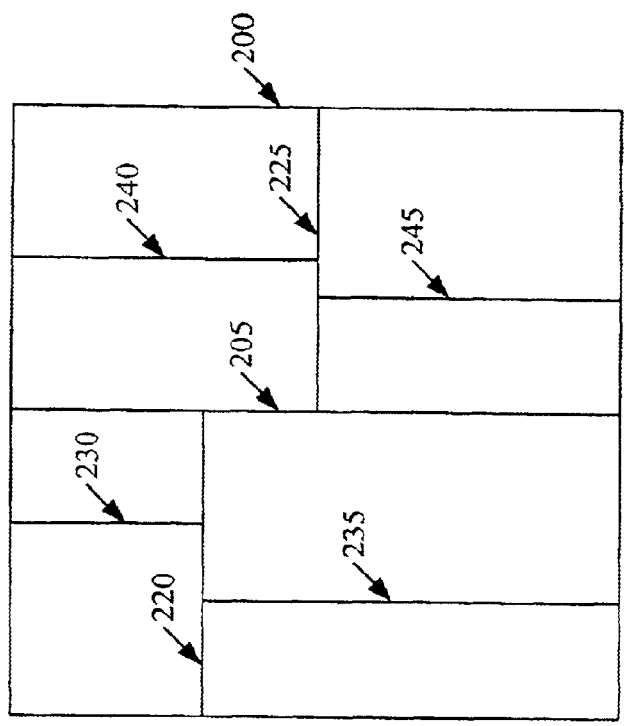
FIG. 3 illustrates the IC layout of FIG. 2 after it has been recursively partitioned by seven cut lines.
Figure 2:
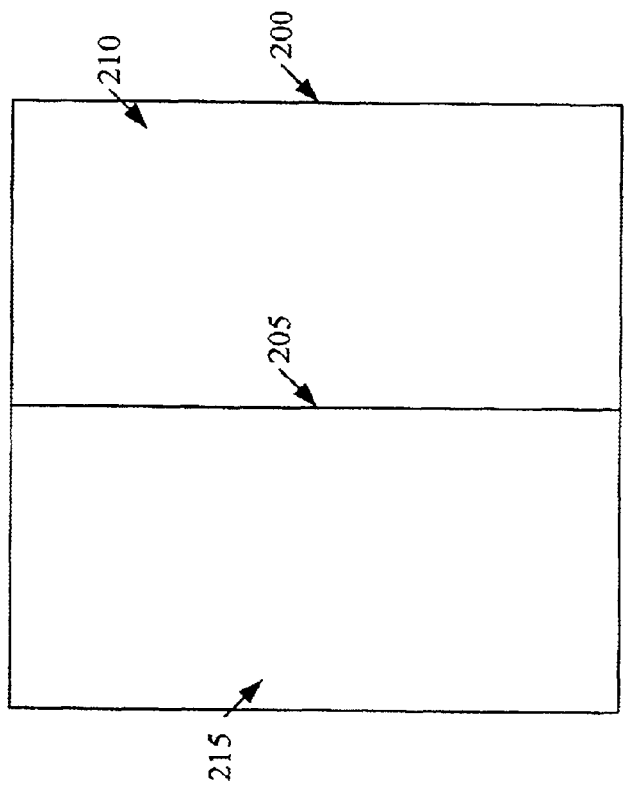
FIG. 2 illustrates an IC layout that is partitioned initially in two regions by a vertical cut line.
Figure 4:
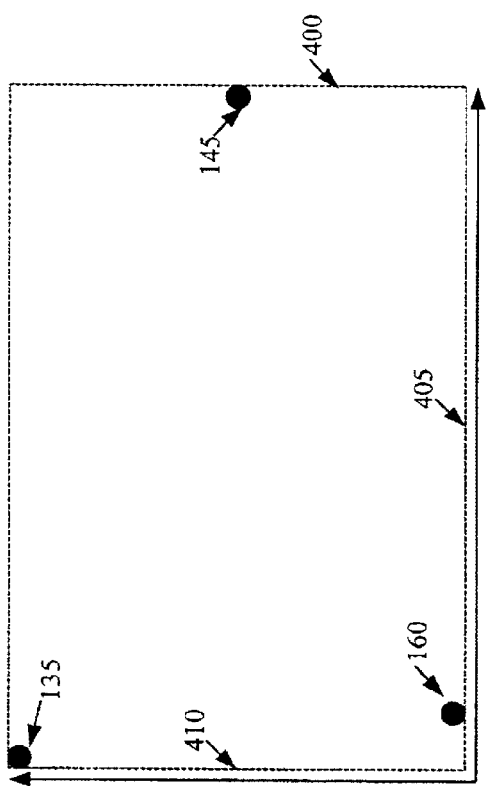
FIG. 4 illustrates a bounding box for a net that contains pins 135, 145, and 160 of FIG. 1.
Figure 5:
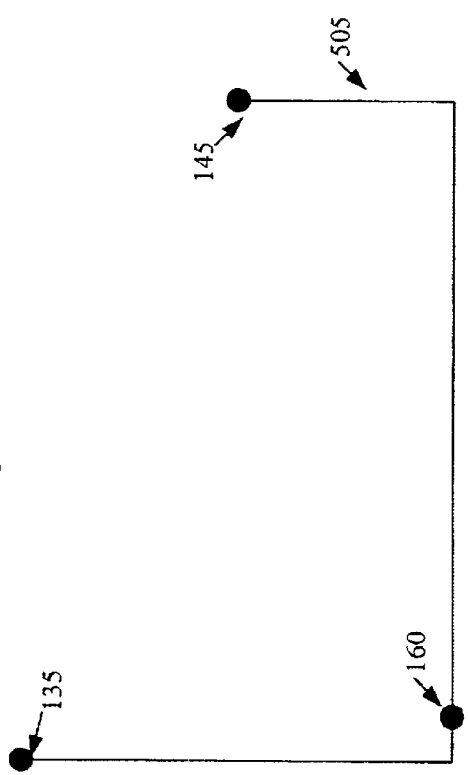
FIG. 5 illustrates a RMST for the net that contains pins 135, 145, and 160 of FIG. 1.
Figure 6:
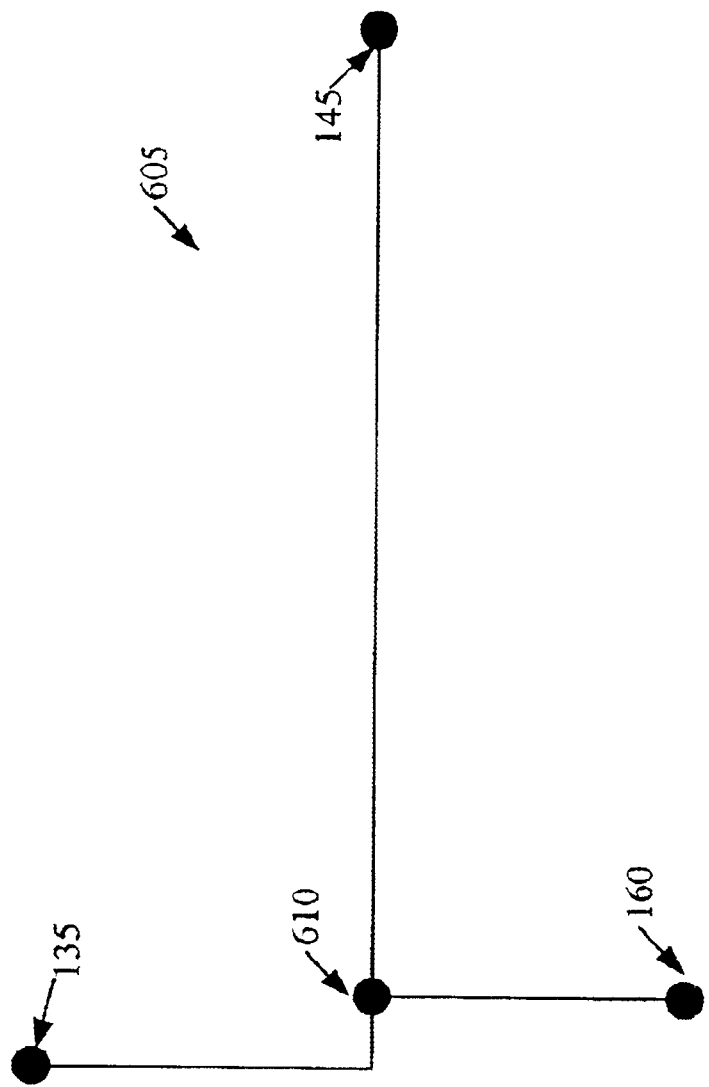
FIG. 6 illustrates a Steiner tree for the net that contains pins 135, 145, and 160 of FIG. 1.
Figure 8:
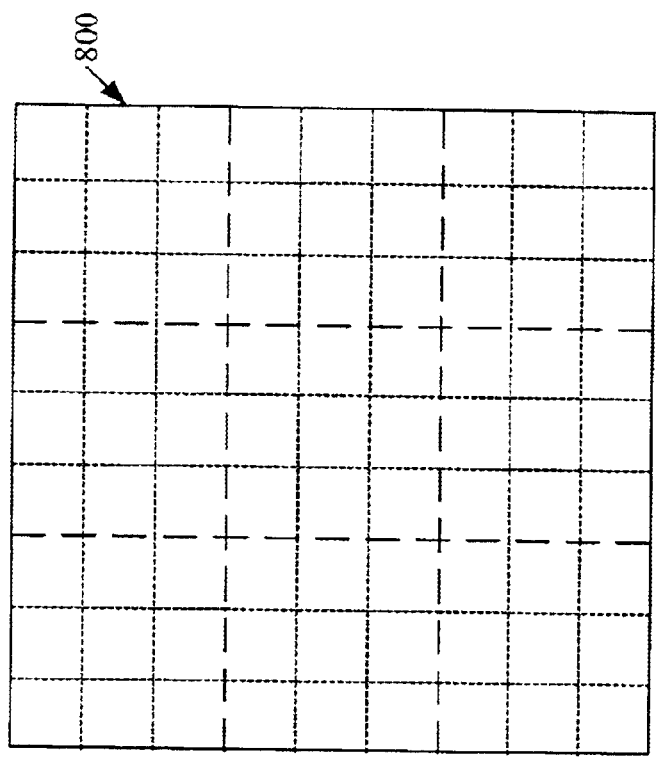
FIG. 8 illustrates an IC layout that is recursively divided into nine regions.
Figure 7:
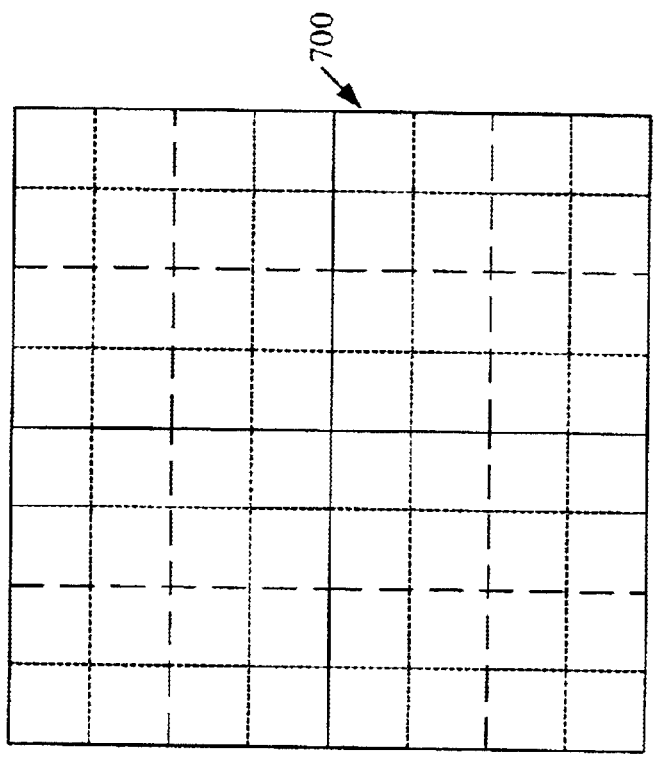
FIG. 7 illustrates an IC layout that is recursively divided into quadrisections.
Figure 23:
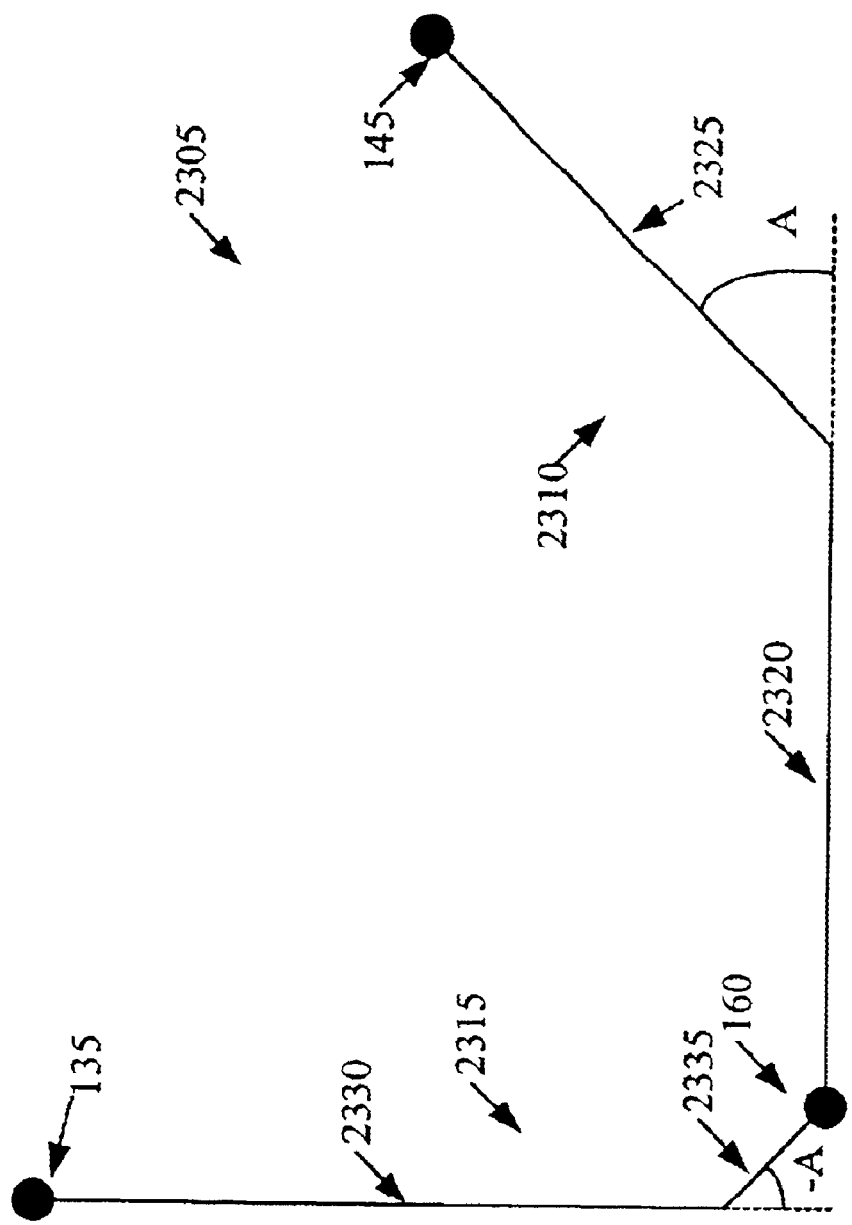
FIG. 23 illustrates an example of a MST that has horizontal, vertical, and diagonal edges.

For instance, when the IC layout uses an octagonal wiring model (i.e., uses horizontal, vertical, and 45° diagonal lines), some embodiments construct MST's that have horizontal, vertical, and 45° diagonal edges. FIG. 23 illustrates an example of such a MST. This tree 2305 is the MST of the net that contains pins 135, 145, and 160 of FIG. 1. This tree has two edges 2310 and 2315. The first edge 2310 has a horizontal segment 2320 and a +45° diagonal segment 2325, while the second edge 2315 has a vertical segment 2330 and a −45° diagonal segment 2335.

By treating the two nodes of each edge of an MST as two opposing corners of a bounding box, the length of each edge can be obtained by using the above-described process 1700 and Equation (A).

$$\text{Distance} = [L - \{S(\cos A / \sin A)\}] + S / \sin A \quad (A)$$

As described above, in this equation, "L" is the box's long side, "S" is the box's short side, and "A" is the angle that the diagonal segment of the edge makes with respect to the long side of the bounding box.

The process 2200 starts whenever the process 1800 calls it (at 1820 or 1840) (1) to construct an MST for a set M of nodes, and (2) to calculate the length and bend-count of this MST. This process initially (at 2205) sets the MST length (MST_Cost) and bend count (Bend_Cost) to zero. Next, the process (at 2210) (1) selects a node from the received set M of nodes as the first node of the spanning tree, and (2) removes this node from this set M.

The process then defines (at 2215) a remainder set R of nodes equal to the current set M of nodes. At 2220, the process selects a node from the remaining node set R, and removes the selected node from the set of remaining nodes. The process then computes and stores (at 2225) the distance between the node selected at 2220 and each current node of the spanning tree. The distance between the selected node and each node can be traversed by an edge that is completely or partially diagonal. Hence, in some embodiments, the process uses the above-described process 1700 and Equation (A) to compute the minimum distance between the selected node and each node. As mentioned above, the process 1700 not only computes the length of the line that traverses this minimum distance, but also computes the bend value for this line.

Next, the process determines (at 2230) whether there is any node remaining in set R. If so, the process returns to 2220 to select another node from this set, so that it can compute (at 2225) the distance between this node and the current nodes of the spanning tree. Otherwise, the process (at 2235) identifies the smallest distance recorded at 2225, and identifies the node combination (i.e., the node in set M and the MST's node) that resulted in this distance. The process then (at 2240) (1) adds the identified smallest distance to the MST length (MST_Cost), and (2) increments the MST bend count (Bend_Cost) by the bend value of the line that traverses this distance.

The process next (at 2245) (1) defines a tree node corresponding to the node identified at 2235, (2) removes the identified node from the node set M, and (3) links the defined tree node to the MST node identified at 2235. The process then determines (at 2250) whether the node set M is empty. If not, the process transitions back to 2215 to identify the next node (in this set M) that is closest to the current nodes of the MST. Otherwise, the process determines that it has constructed the MST for the received set M of nodes, returns the computed MST length (MST_Cost) and bend count (Bend_Cost) for this set, and then ends.

B. Pre-Tabulating Information about Wiring Directions Used and Edges Intersected by Steiner Trees.

The embodiments described above in Section III.A.2 pre-tabulate length and/or bend-count values of Steiner trees that model net configurations with respect to a partitioning grid. Other embodiments, however, pre-tabulate other attributes of these trees. For instance, some embodiments pre-tabulate information about the directed-wiring paths (also called directed routing or interconnect-line paths) that these trees use in the partitioning grid. As further described below, the stored wiring-path information can be used during placement to quantify wiring congestion (also called routing or interconnect-line congestion) of a particular placement configuration.

Figure 25:
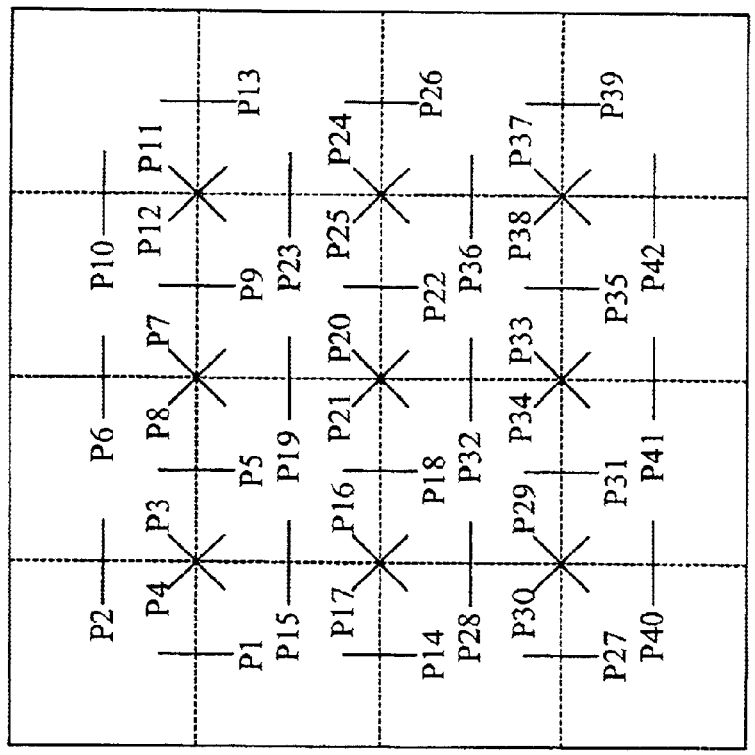
FIG. 25 illustrates 42 directed-wiring paths across the 42 edges of FIG. 24.
Figure 24:
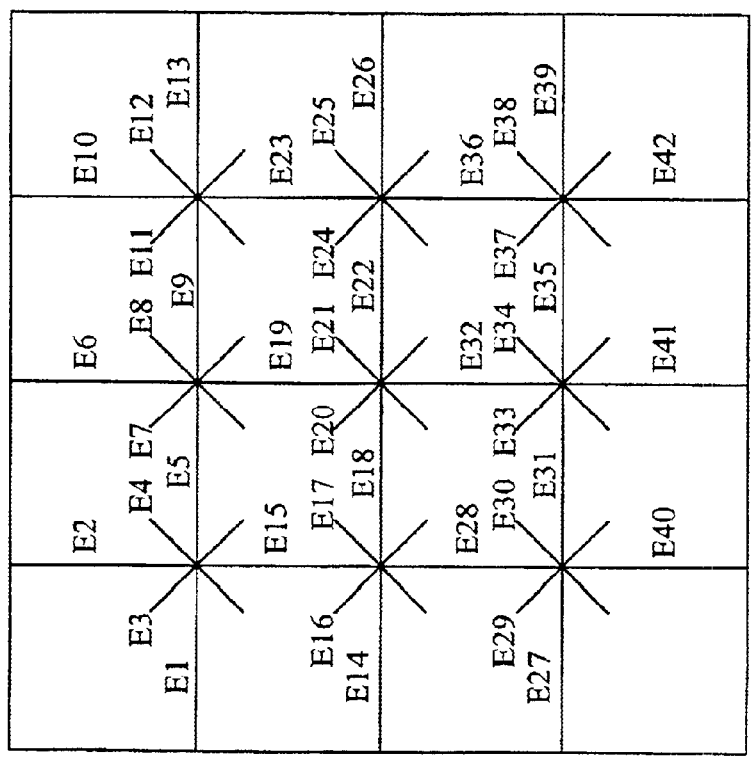
FIG. 24 illustrates 42 edges defined in a 4×4 grid.

The number of directed-wiring paths in a partitioning grid depends on the wiring model and the number of partitioning lines in the grid. For instance, 42 directed-wiring paths exist when the octagonal wiring architecture is used in combination with a 4×4 grid. Specifically, the combination of the octagonal wiring architecture and the 4×4 grid results in 42 edges between the slots of the 4×4 grid. FIG. 24 illustrates these 42 edges (E1–E42). Orthogonal to each particular edge is a directed-wiring path that specifies the direction of the interconnect lines that connect the two slots abutting the particular edge. As there are 42 edges in a 4×4 grid that uses the octagonal wiring model, there are 42 directed-wiring paths in these circumstances. FIG. 25 illustrates the 42 directed-wiring paths (P1–P42) across the 42 edges (E1–E42) of FIG. 24.

The directed-wiring paths do not necessarily specify the actual routing paths used during routing. For instance, directed-wiring path P28 in FIG. 25 does not necessarily have to specify the one and only routing path between the fifth and sixth slots, as routing paths can traverse the entire length of edge E28. Instead, the directed-wiring paths only specify the direction of the interconnect lines that connect the two slots abutting the particular edge.

The wiring-path information for each net configuration can be stored as an N-bit string or in an N-entry data structure (e.g., N-entry array), where N is the number of wiring directions that result from a particular combination of partitioning grid and wiring model. For instance, in the example illustrated in FIG. 25, each net configuration's wiring-path information can be stored in a 42-bit string or 42-entry array.

Different embodiments store different directed-wiring path information. Some embodiments identify only one of routing pattern (e.g., one Steiner tree) for each net configuration. Hence, for each net configuration, these embodiments only store the identity of the directed-wiring paths used by the net configuration's selected routing pattern. For each net configuration, such an identify can be stored as an N-bit string, where each bit in this string corresponds to one of the directed-wiring paths and each particular bit is set when the identified routing pattern uses the directed-wiring path corresponding to the particular bit. For instance, if (1) the routing pattern 1305 of FIG. 13 is selected to connect the node configuration of net 1205 of FIG. 12 and (2) the numbering convention of FIG. 25 is used to number the possible directed-routing paths, the wiring-path information for the selected routing pattern 1305 is a 42-bit string that has its $17^{th}$, $31^{st}$, $32^{nd}$, $36^{th}$, and $40^{th}$ bits set (e.g., set to 1) and all the other bits not set (e.g., equal to 0).

Other embodiments enumerate several routing patterns for each net configuration within the partitioning grid. For instance, some embodiments identify the optimal Steiner trees for each net configuration. It is advantageous to enumerate and store information about all the optimal routing patterns when the exact routing pattern for each net configuration is not selected during placement. In this manner, the placer can account for all the congestion that can potentially result from each net configuration.

The embodiments that identify several routing patterns for each net configuration can store different types of information about the directed-wiring paths used by these routing patterns. For instance, some of these embodiments count and store the number of times each directed-routing path in the grid is used by the identified optimal trees of each net configuration. For each net configuration, such count information can be stored in an N-entry data structure, where each entry stores the count information for one of the directed-wiring paths.

Figure 26:
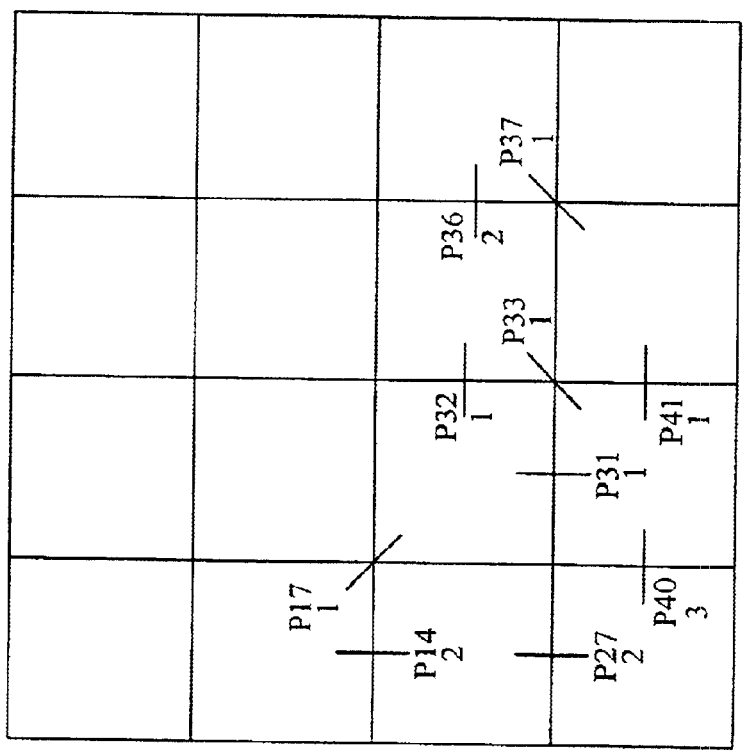
FIG. 26 illustrates path-usage counts for the trees illustrated in FIGS. 13–15.

For example, as mentioned above, Steiner trees 1305, 1405, and 1505 of FIGS. 13–15 provide the optimal routing patterns for the node configuration of net 1205 of FIG. 12 when the octagonal wiring model is used. As illustrated in FIG. 26, these trees (1) use the directed-wiring paths 17, 31–33, 37, and 41 once, (2) use the directed-wiring paths 14, 27 and 36 twice, and (3) use the directed-wiring path 40 thrice. This count information can be stored in a 42-entry array, where each entry corresponds to one of the wiring paths. In this array, the entries for the $17^{th}$, $31^{st}$–$33^{rd}$, $37^{th}$, and $41^{st}$ paths are set to 1, the entries for the $14^{th}$, $27^{th}$, and $36^{th}$ paths are set to two, the entries for the $40^{th}$ path is set to 3, and the entries for all other paths are set to 0.

Other embodiments do not store the number of times each directed-routing path in the grid is used by the identified trees of each net configuration. For instance, some embodiments store the probability that the identified trees of a net configuration use each directed-routing path. For each directed-routing path, this probability can be obtained by dividing the number of times the identified trees use the directed-routing path by the total number of identified trees.

Figure 27:
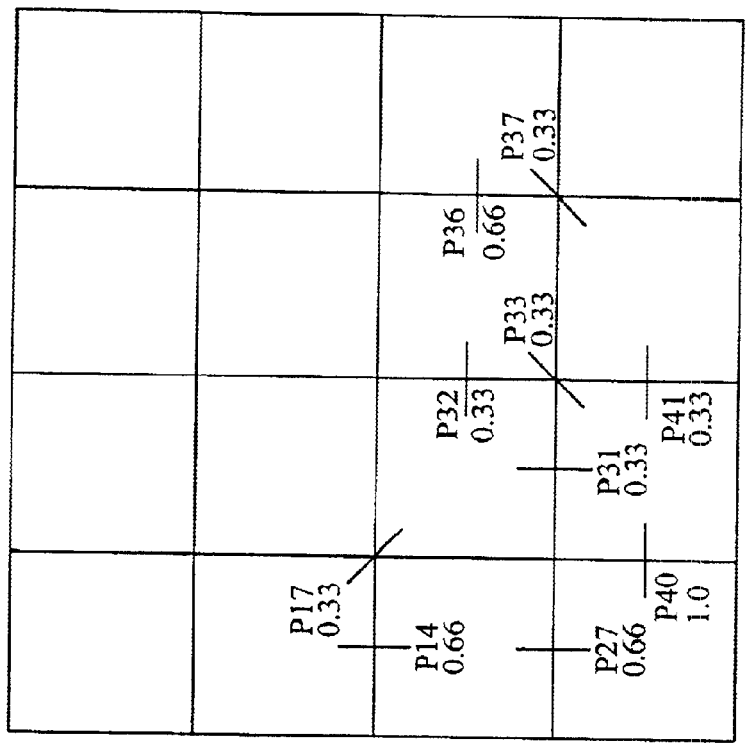
FIG. 27 illustrates path-usage probabilities for the trees illustrated in FIGS. 13–15.

By way of example, FIG. 27 illustrates these probabilities for the directed-routing paths used by the Steiner trees 1305, 1405, and 1505 of FIGS. 13–15. These probabilities are obtained by dividing the count information (illustrated in FIG. 26) for these directed-routing paths by 3, which is the number of the identified routing trees. As illustrated in FIG. 27, these probabilities are (1) 0.33 for the directed-wiring paths 17, 31–33, 37, and 41, (2) 0.66 for the directed-wiring paths 14, 27 and 36, (3) 1 for the directed-wiring path 40, and (4) 0 for the remaining directed-wiring paths. This probability information can be stored in a 42-entry array, where each entry corresponds to one of the wiring paths. In this array, the entries for the $17^{th}$, $31^{st}$–$33^{rd}$, $37^{th}$, and $41^{st}$ paths are set to 0.33, the entries for the $14^{th}$, $27^{th}$, and $36^{th}$ paths are set to 0.66, the entries for the $40^{th}$ path is set to 1, and the entries for all other paths are set to 0.

During placement, the placer can calculate congestion cost estimates for different placement configurations by using the pre-tabulated wiring-path information. To calculate such a congestion cost, the placer for each net (1) identifies the net's configuration with respect to the partitioning grid, and then (2) retrieves the pre-tabulated wiring-path information, which includes one value for each wiring path in the grid.

The placer can generate different congestion cost estimates based on these retrieved values. For instance, in some embodiment, the placer calculates a congestion cost by (1) summing the retrieved values for each particular wiring path over all the nets, (2) squaring this sum, and (3) adding the squared sums of all the wiring paths. Equation F illustrates this calculation mathematically.

$$\text{Cost} = \sum_{Path}\left(\sum_{nets} F(\text{netconfig, path})\right)^2 \tag{F}$$

In this equation, F(netconfig, path) represents the retrieved value of a particular wiring path for a particular net configuration.

Other embodiments calculate a congestion cost by (1) summing the retrieved values for each particular wiring path over all the nets, and (2) selecting the maximum sum. Equation G illustrates this calculation mathematically.

$$\text{Cost} = \max_{Path}\left(\sum_{nets} F(\text{netconfig, path})\right) \tag{G}$$

Yet other embodiments use other approaches to compute placement cost estimates based on the wiring-path values. For instance, instead of summing the retrieved values for each particular wiring path over all the nets, some embodiments might combine these values associated with each wiring path in a different manner (e.g., some might multiply the values associated with each wiring path).

The above-described embodiments pre-tabulate wiring-path information. Other embodiments, however, pre-tabulate edge-intersect information, instead of wiring-path information. Storing the edge-intersection information is analogous to storing the wiring-path information, since each wiring path is defined across a particular edge, as illustrated by FIGS. 24 and 25.

Some embodiments identify the edge-intersect information for a net configuration by (1) defining edges in the partitioning grid based on the grid and the wiring model, (2) specifying one or more connection graphs (such as Steiner trees) for each net configuration within the grid, and (3) identifying the edges that the specified graphs intersect.

As with the wiring-path information, different embodiments store different edge-intersect information. For instance, the embodiments that identify only one routing pattern (e.g., one Steiner tree) for each net configuration, can store for each net configuration the identity of the edges intersected by the net configuration's selected routing pattern. For each net configuration, such an identify can be stored as an N-bit string, where each bit in this string corresponds to one of the edges and each particular bit is set when the identified routing pattern intersects the edge corresponding to the particular bit. For instance, if (1) the routing pattern 1305 of FIG. 13 is selected to connect the node configuration of net 1205 of FIG. 12 and (2) the numbering convention of FIG. 24 is used to number the defined edges in the grid, the edge-intersect information for the selected routing pattern 1305 is a 42-bit string that has its $17^{th}$, $31^{nd}$, $32^{nd}$, $36^{th}$, and $40^{th}$ bits set (e.g., set to 1) and all the other bits not set (e.g., equal to 0).

On the other hand, some of the embodiments that enumerate several routing patterns for each net configuration, count and store the number of times each edge is used by the enumerated routing patterns of the net configuration. For each edge, other embodiments store the probability that the enumerated trees for the net configuration intersect the edge. This probability can be obtained by dividing the number of times the identified trees intersect the edge by the total number of identified trees.

Figures 28, 29:
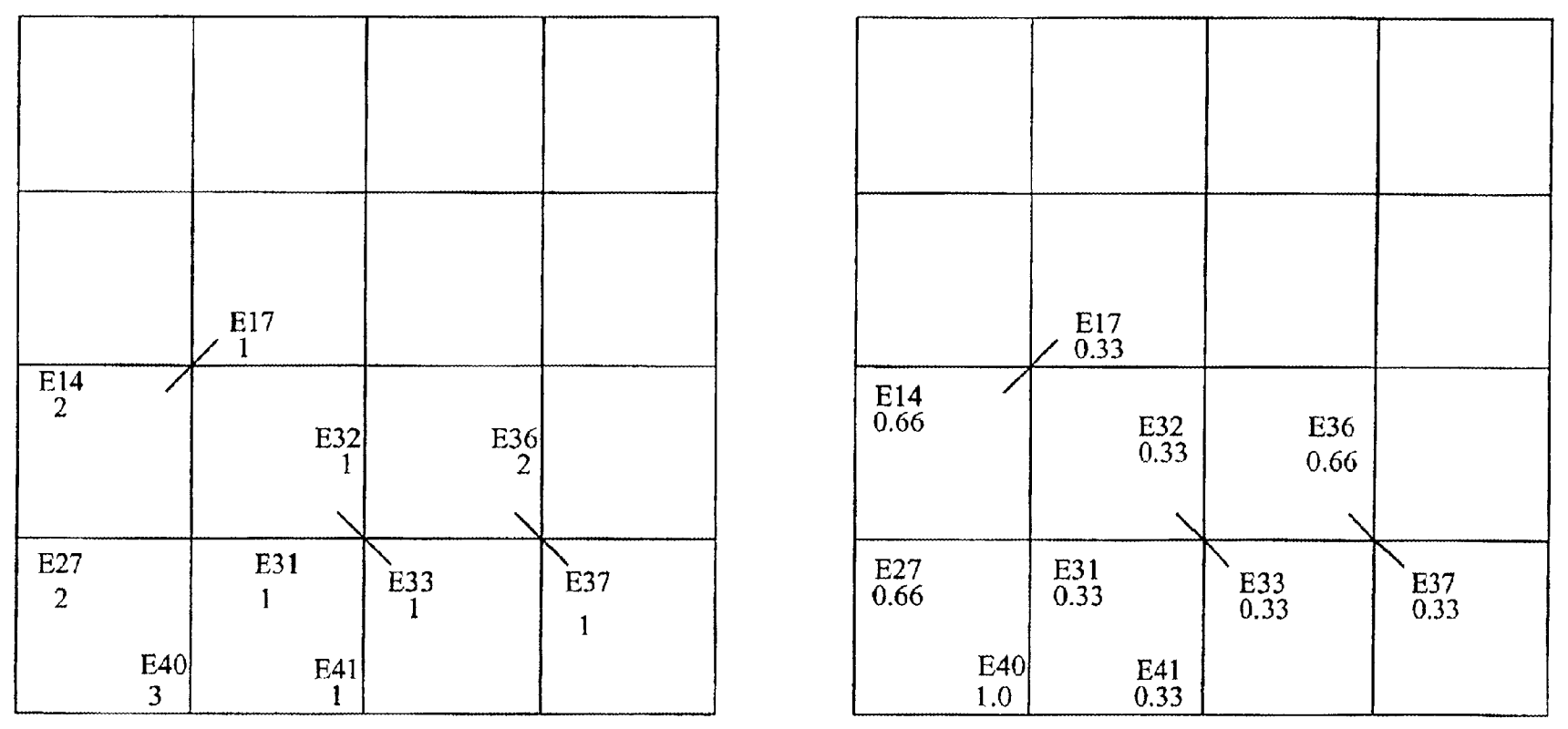

FIGS. 28 and 29 respectively illustrate the count and probability information for the Steiner trees 1305, 1405, and

1505 of FIGS. 13–15 that provide routing patterns for the node configuration of net 1205 of FIG. 12. For each net configuration, the count or probability information can be stored in an N-entry data structure, where N corresponds to the number of edges and each entry stores the count or probability information for one of the edge. In the above-mentioned example, the count information for trees 1305, 1405, and 1505 can be stored in a 42-entry array, with the entries for the $17^{th}$, $31^{st}$–$33^{rd}$, $37^{th}$, and $41^{st}$ edges set to 1, the entries for the $14^{th}$, $27^{th}$, and $36^{th}$ edges set to two, the entries for the $40^{th}$ edge set to 3, and the remaining entries set to 0. Similarly, the probability information for these trees can be stored in a 42-entry array, with entries for the $17^{th}$, $31^{st}$–$33^{rd}$, $37^{th}$, and $41^{st}$ edges set to 0.33, the entries for the $14^{th}$, $27^{th}$, and $36^{th}$ edges set to 0.66, the entries for the $40^{th}$ edge set to 1, and the entries for the remaining edges set to 0.

A placer can calculate congestion cost estimates based on the edge-intersection information similarly to how it would calculate such estimates based on the wiring-path information. Specifically, to calculate such a congestion cost, the placer initially for each net (1) identifies the net's configuration with respect to the partitioning grid, and then (2) retrieves the pre-tabulated edge-intersection information, which includes one value for each edge in the grid.

The placer can then generate different congestion cost estimates based on these retrieved values. For instance, in some embodiment, the placer calculates a congestion cost by (1) summing the retrieved values for each particular edge over all the nets, (2) squaring this sum, and (3) adding the squared sums of all the edges. Equation H illustrates this calculation mathematically.

$$\text{Cost} = \sum_{Edges}\left(\sum_{nets} F(\text{netconfig, edge})\right)^2 \quad (H)$$

In this equation, F(netconfig, edge) represents the retrieved value of a particular edge for a particular net configuration.

Other embodiments calculate a congestion cost by (1) summing the retrieved values for each particular edge over all the nets, and (2) selecting the maximum sum. Equation I illustrates this calculation mathematically.

$$\text{Cost} = \max_{edge}\left(\sum_{nets} F(\text{netconfig, edge})\right) \quad (I)$$

Yet other embodiments use other approaches to compute placement cost estimates based on the edge-intersect values. For instance, instead of summing the retrieved values for each particular edge over all the nets, some embodiments might combine these values associated with each edge in a different manner (e.g., some might multiply the values associated with each edge).

Figure 30A:
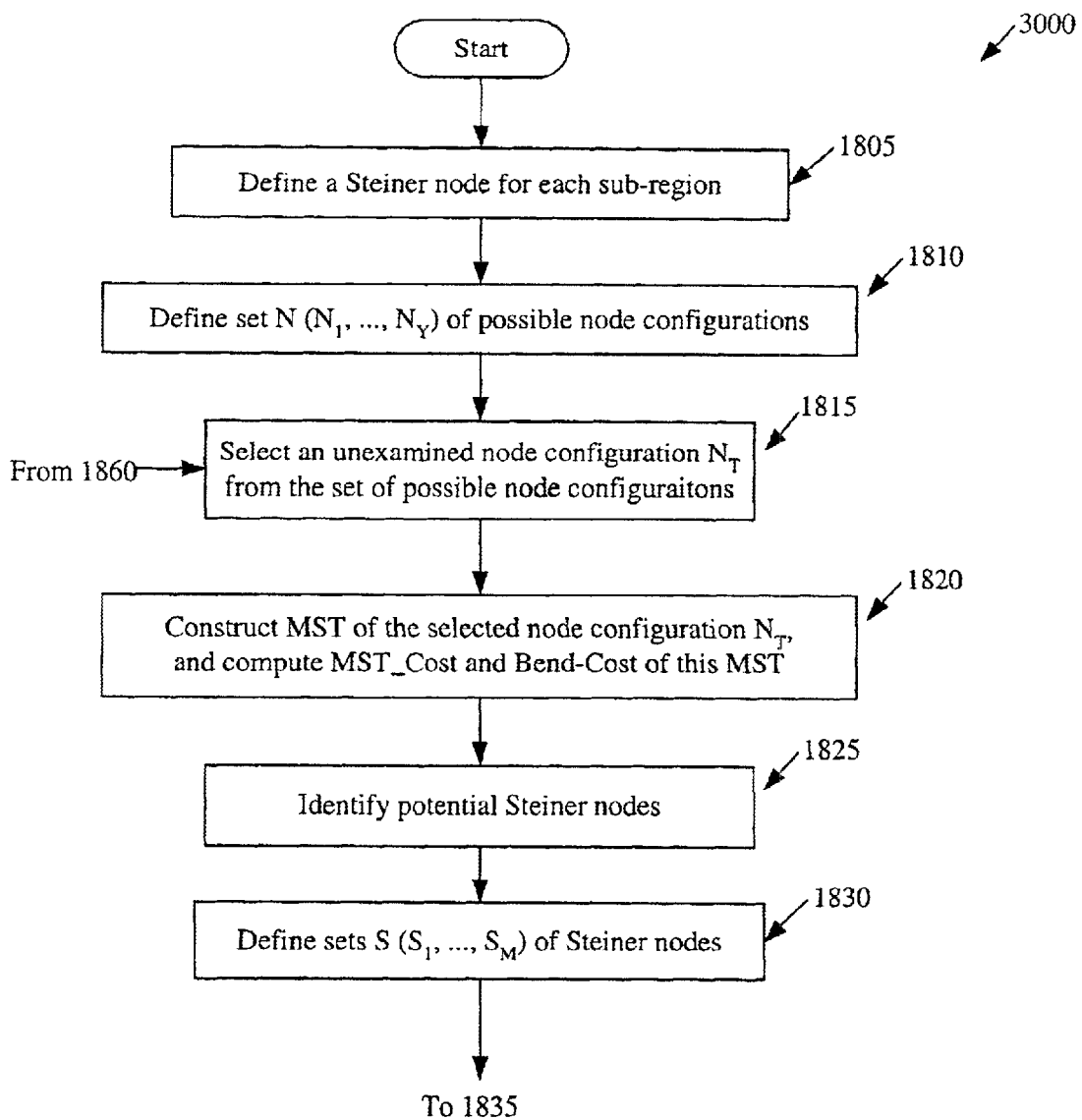
FIG. 30 illustrates a process that constructs one or more optimal Steiner trees for each possible net configuration with respect to a partitioning grid, and computes and stores path count and probability information.
Figure 30B:
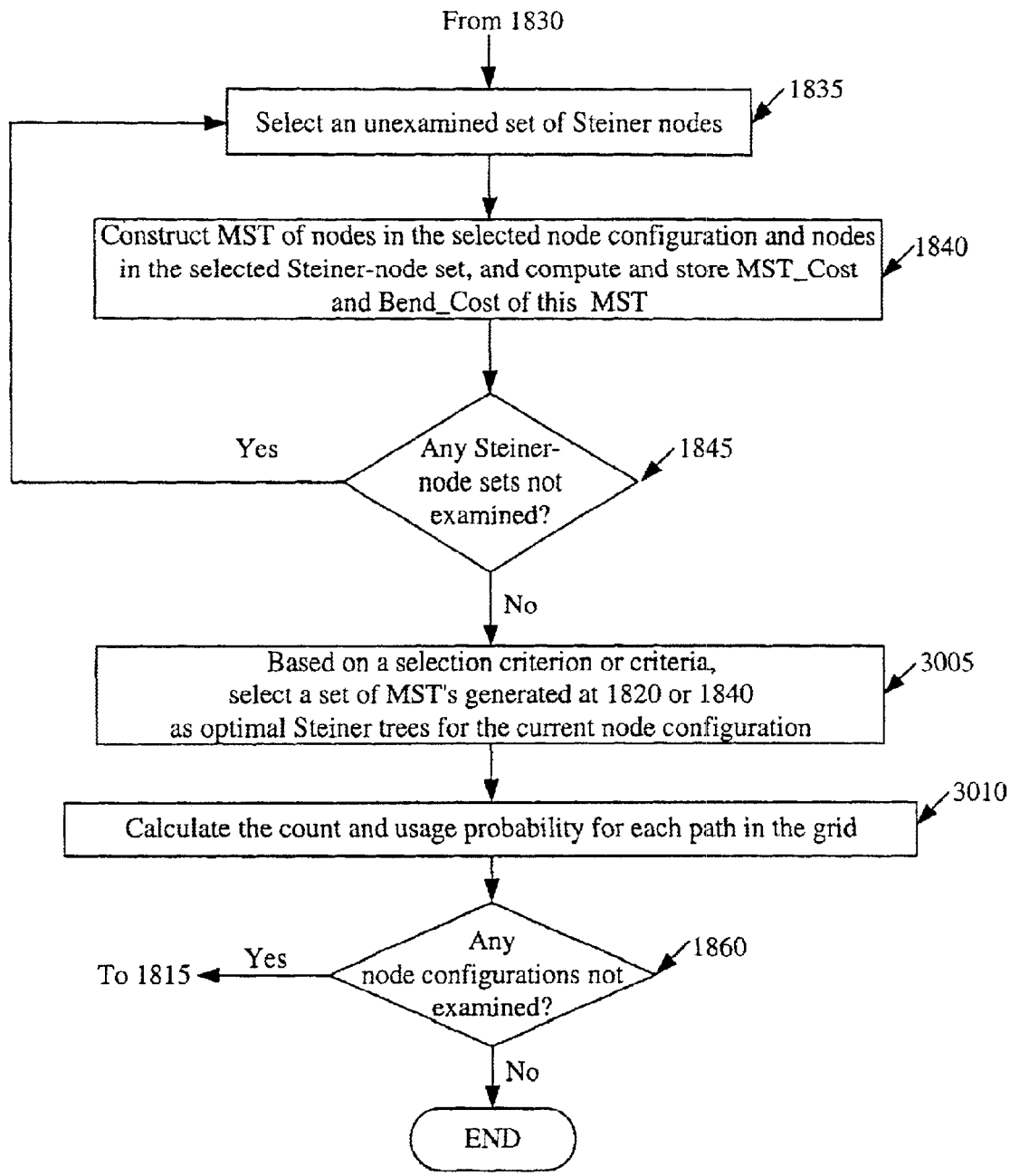

FIG. 30 illustrates a process 3000 that (1) constructs one or more optimal Steiner trees for each possible net configuration with respect to a partitioning grid, (2) computes count and probability of the trees using each interconnect-line path in the grid, and (3) stores the computed count and path-usage probabilities in a storage structures (such as a LUT). This process is performed before the placement process 1100 of FIG. 11, so that the placement process in real-time does not have to construct the Steiner trees and determine the path-usage probabilities for each net configuration. Also, as mentioned above, some embodiments define the set of interconnect-line paths in the grid based on the grid and on the wiring model used. For instance, as described above, some embodiments define 42 edges for using the octagonal wiring model in a 4×4 grid.

The process 3000 is identical to process 1800 of FIG. 18, except for two operations 3005 and 3010. Operations 1805–1845 and 1860 of process 3000 are identical to similarly numbered operations 1805–1845 and 1860 of process 1800. Hence, these operations 1805–1845 and 1860 will not be further described below, in order not to obscure the description of the invention with unnecessary detail. It should also be noted that the description of FIGS. 19–22 are equally applicable for the process 3000. For instance, like process 1800, the process 3000 (1) calls process 2100 at 1825 to identify potential Steiner nodes, and (2) calls process 2200 at 1820 and 1840 to construct MST's for particular sets of nodes.

As mentioned above, one difference between process 1800 and process 3000 is that, unlike the process 1800 that identifies one MST at 1850 as the current node configuration Steiner tree, the process 3000 at 3005 selects one or more of the MST's generated at 1820 or 1840 as the optimal Steiner trees for the current node configuration. The process 3000 selects one or more Steiner trees (at 3005) because it is designed to help enumerate all potential congestion that can result from a particular node configuration.

This process selects its set of Steiner trees for the current node configuration based on one or more criteria. For instance, in some embodiments, this process selects the shortest MST's as the Steiner trees (i.e., the process only uses length as a selection criterion). In other embodiments, this process uses both the length and bend-count of the MST's to select its set of Steiner trees. For example, some embodiments might select the shortest MST's that have less than a pre-specified number of bends as the Steiner trees; if none of the MST's have less than the pre-specified number of bends, these embodiments increment the minimum bend count and then select the shortest MST's with that have less than the incremented pre-specified number of bends.

Figure 31:
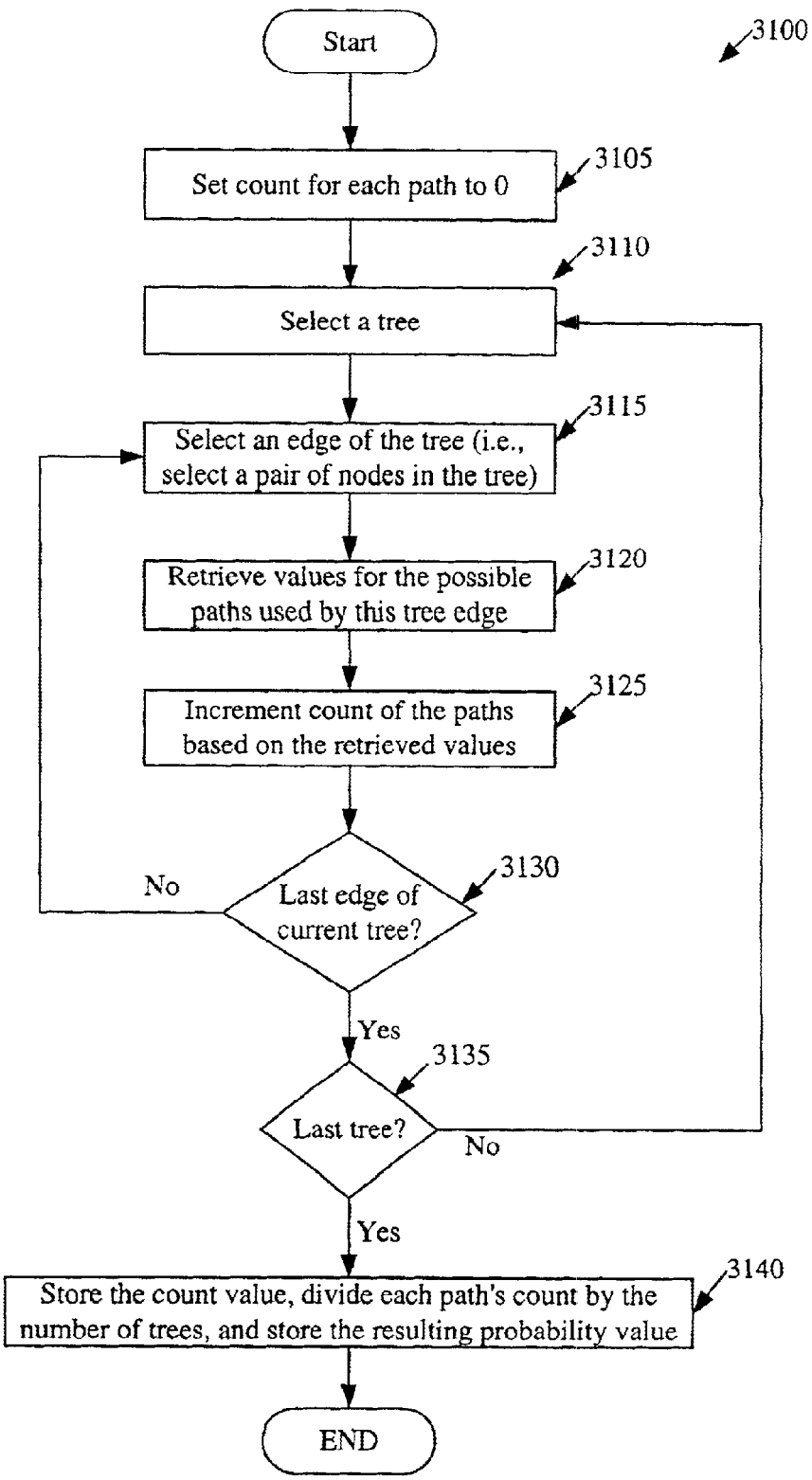
FIG. 31 illustrates a process for calculating the count and path-usage probabilities resulting from the Steiner trees selected by the process of FIG. 30.

After selecting one or more Steiner trees for the current node configuration at 3005, the process 3000 calls (at 3010) a process 3100 of FIG. 31 to calculate the count and path-usage probabilities resulting from the selected Steiner trees. In some embodiments, this process starts when process 3000 calls it at 3010 and supplies it with a set of Steiner trees (i.e., one or more Steiner trees).

The process 3100 starts by initializing (at 3105) the count values for each path to 0. The process then selects (at 3110) a received Steiner tree, and selects (at 3115) one of the edges in the tree (i.e., selects a pair of linked nodes in the tree, where these nodes were linked at 2245 of FIG. 22). Next, the process retrieves (at 3120) values for possible paths that this tree uses. In some embodiments, the process retrieves these values from a LUT that stores path-usage values for any combination of the tree slot nodes. In other words, this LUT maps the endpoints of each possible tree edge within the grid to a set of path-usage values.

When the tree edge endpoints are not adjacent (i.e., when the pair of nodes selected at 3115 are not adjacent), more than one optimal route might exist between the endpoints (i.e., between the node pairs). Hence, the path-usage values in the LUT might specify values for multiple optimal routes. Also, in these circumstance, the retrieved usage value for a particular path might be greater than 1 to indicate that more than one optimal route use the particular path to connect the node pairs selected at 3115.

For example, for the Steiner trees shown in FIGS. 13–15, the process 3000 would identify two sets of node connections as two possible Steiner trees. One set of node connections (e.g., node 1310-node 1315-Steiner node 1320-node 1325-node 1330) represent the Steiner tree 1305 of FIG. 13, while another node connection (e.g., node 1325-node 1310-node 1315-node 1335) could represent either the Steiner tree of FIG. 14 or 15.

In the first set of nodes representing the Steiner tree 1305 of FIG. 13, only one route exists between any two connected pairs of nodes. Hence, for any pair from this set, the mapping LUT would return a 42 values, with all the values equal to 0 except the value for the path between the selected node pair. This non-zero value would be 1 to indicate that only one route exists between the selected node pair.

On the other hand, for the second set of nodes representing either Steiner tree 1405 or 1505, two routes exist between nodes 1315 and 1330. The Steiner tree 1405 uses one of these routes, while the Steiner tree 1505 uses the other. For this node pair (i.e., for nodes 1315 and 1330) in this node set, the mapping LUT would return 38 path values equal to 0, and 4 path values equal to 1. Two of the four values would correspond to the paths 33 and 36 used by the Steiner tree 1405, while the other two values would correspond to paths 37 and 41 used by Steiner tree 1505.

As mentioned above, when the path-usage values in the LUT specify values for multiple optimal routes between a selected node pair, and more than one optimal route use a particular path, the mapper stores a path usage-value greater than one for the particular path. For example, when the selected node pairs are the node for slot 1 and the node for slot 14 (according to the numbering convention of FIG. 12), the mapper would store a 2 for the path 27 (i.e., the path between slots 1 and 5), since two of the three optimal routes between nodes 1 and 14 use this path.

After retrieving values for possible paths that this tree uses, the process increments (at 3125) count of the paths based on the retrieved values. Next, the process determines (at 3130) whether it has examined the last edge of the current tree (i.e., whether it has examined the last linked node pair in the current tree). If not, the process transitions back to 3115 to select the next tree edge (i.e., the next linked node pair) and to repeat 3120 and 3125 for this next tree edge.

When the process determines (at 3130) that it has examined the last tree edge, it then determines (3135) whether it has examined the last tree supplied by the process 3000. If not, the process returns to 3110 to select another tree and then determine the path-usage for this tree. Otherwise, the process records (at 3140) the usage count for each path. Also, for each particular path, the process (at 3140) (1) divides the usage count by the number of the received trees to obtain the usage probability value of the particular path, and then (2) stores this resulting probability value. The process then ends.

Although the processes 3000 and 3100 were described above for calculating path-usage counts and probabilities, one of ordinary skill will realize that analogous processes can be used to calculate edge-intersect counts and probabilities. Also, the above-described embodiments calculate and store information about wiring paths used and edge intersected by Steiner trees that have potential diagonal edges. However, one of ordinary skill in will realize that some embodiments calculate and store such path-usage and/or edge-intersect information for any arbitrary connection graphs that model net configurations with respect to the partitioning grid. Also, some embodiments that measure and utilize such path usage and/or edge-intersect information do not use diagonal edges in their Steiner trees or their other arbitrary connection graphs (e.g., only use Manhattan Steiner trees or other Manhattan connection graphs).

Figure 32A:
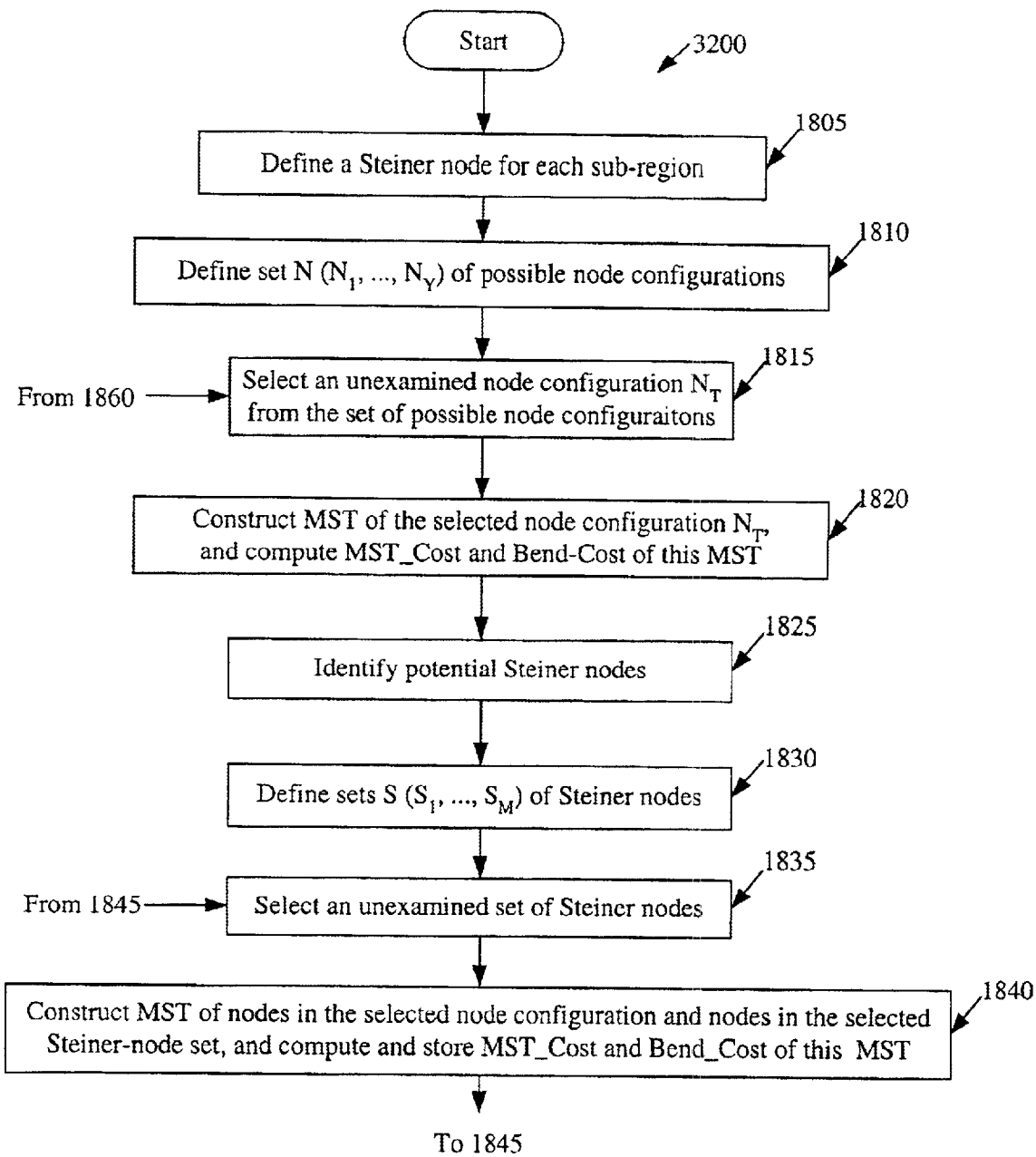
FIG. 32 illustrates a process that pre-tabulates the length, bend-count, and path-usage values of Steiner trees that model possible net configurations within a partitioning grid.
Figure 32B:
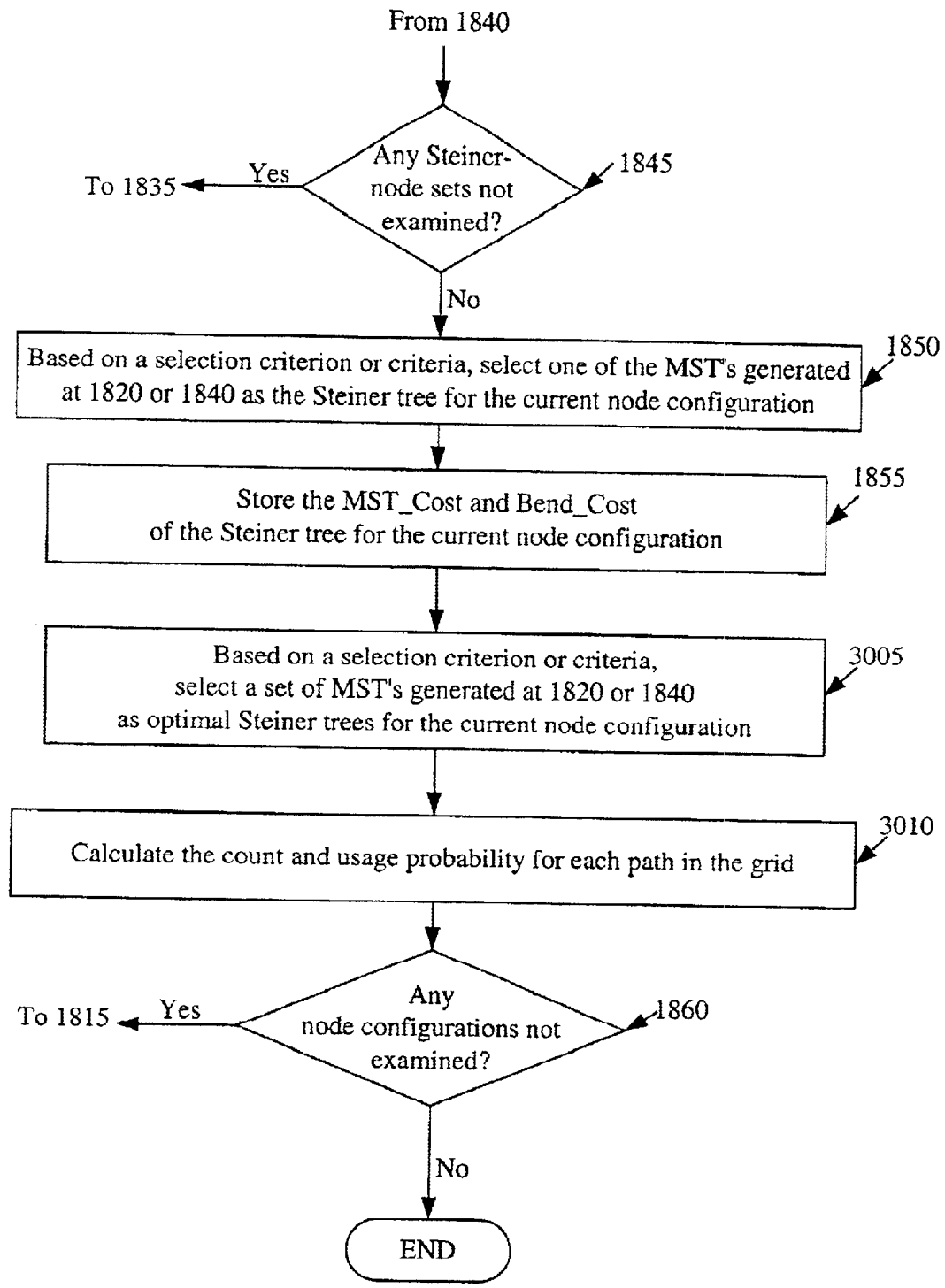

C. Pre-Tabulating Edge-Intersect, Length, and Bend-Count Values for Steiner Trees Some embodiments pre-tabulate multiple attributes of the Steiner trees that model the net configurations with respect to the partitioning grid. For instance, FIG. 32 illustrates a process 3200 that pre-tabulates the length, bend-count, and path-usage values of such Steiner trees. This process 3200 is a combination of the process 1800 of FIG. 18 and the process 3000 of FIG. 30. It includes all the operations 1805–1845 of the processes 1800 and 3000, operations 1850 and 1855 of the process 1800, and operations 3005 and 3010 of the process 3000. As these operations were described above, they will not be further described below, in order not to obscure the description of the invention with unnecessary detail. Pre-tabulating the length, bend-count, and path-usage values allows the placer to make placement designs based on any one of these attributes or any combination of these attributes.

D. Pre-Tabulating Steiner Trees for Different Wiring Models.

Figure 33:
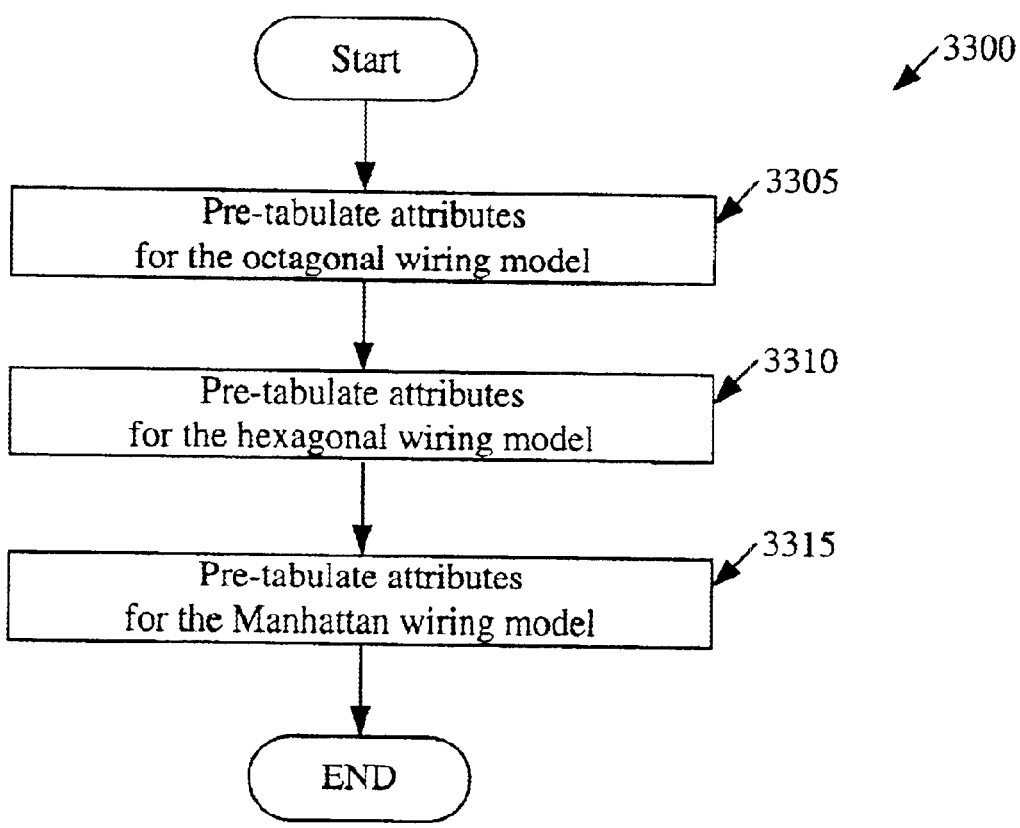
FIG. 33 illustrates a process that pre-tabulates one or more Steiner tree attributes for several different wiring models.

Some embodiments of the invention pre-tabulate one or more Steiner tree attributes for several different wiring models. For instance, FIG. 33 illustrates a process 3300 that performs the process 1800, the process 3000, or the process 3200 once (at 3305) for the octagonal wiring model, once (at 3310) for the hexagonal wiring model, and once (at 3315) for the Manhattan wiring model.

To model all possible net configurations for the octagonal wiring model, this process calculates (at 3305) the length, bend-count, and/or path-usage values of Steiner trees with potential 45° diagonal edges. In other words, at 3305, the process 3300 uses 45° as the angle A in Equation (A) that process 2100 and 2200 of process 1800, process 3000, and process 3200 use.

To model all possible net configurations for the hexagonal wiring model, this process calculates (at 3310) the length, bend-count, and/or path-usage values of Steiner trees with potential 120° diagonal edges. In other words, at 3310, the process 3300 uses 120° as the angle A in Equation (A) that process 2100 and 2200 of process 1800, process 3000, and process 3200 use.

To model all possible net configurations for the Manhattan wiring model, these embodiments calculate (at 3315) the length, bend-count, and/or path-usage values of Manhattan Steiner trees. In other words, at 3315, the process 3300 uses 90° as the angle A in Equation (A) that process 2100 and 2200 of process 1800, process 3000, and process 3200 use.

IV. Recursive 4-by-4 Partitioning

A. Software Architecture.

Figure 34:
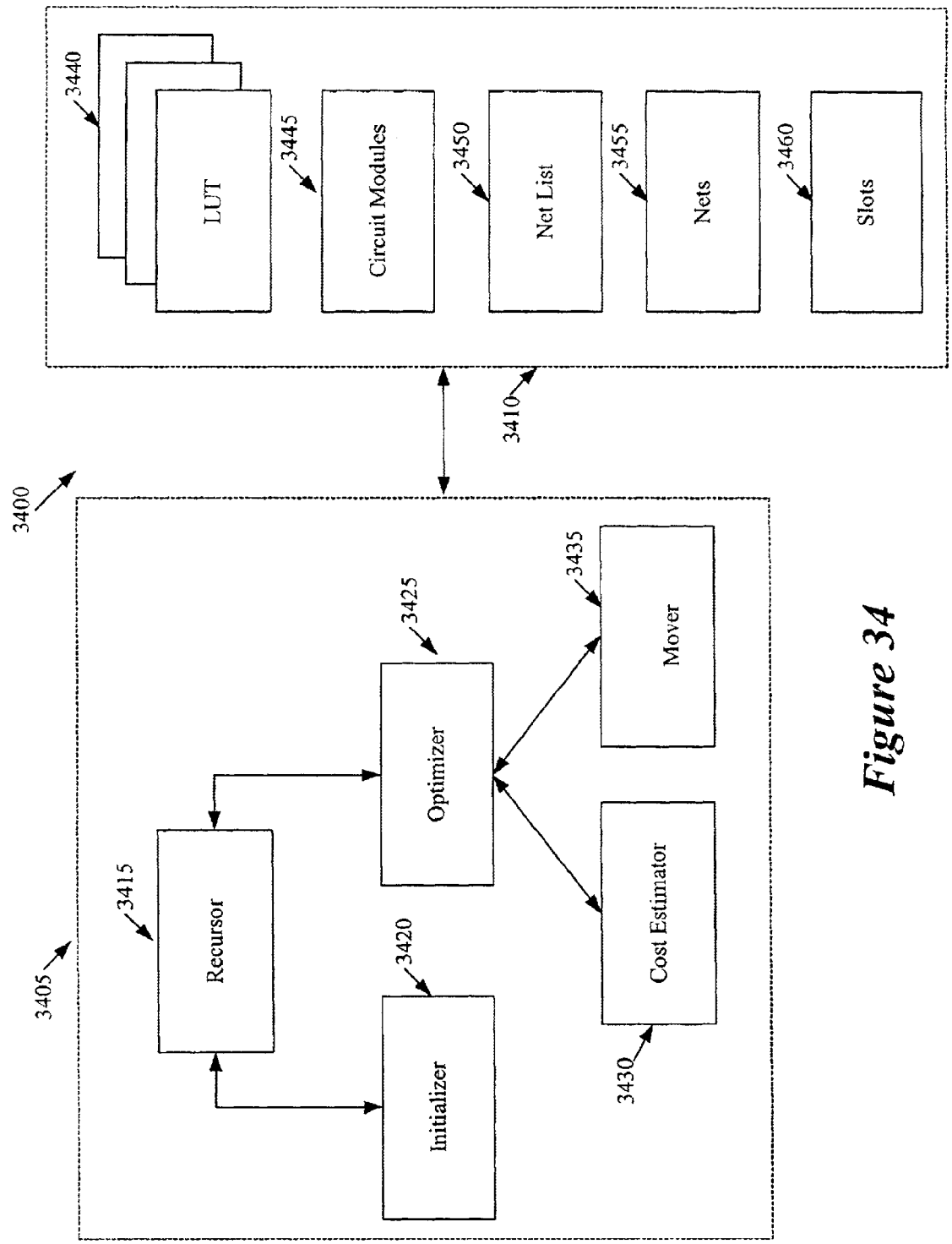
FIG. 34 illustrates the software architecture of a placer used in some embodiments of the invention.

FIG. 34 illustrates the software architecture of a placer 3400 of some embodiments of the invention. This software architecture includes several software modules 3405 and several data constructs 3410. The software modules include a recursor 3415, an initializer 3420, an optimizer 3425, a cost estimator 3430, and a mover 3435, while the data constructs 3410 include LUT's 3440, circuit modules 3445, net list 3450, nets 3455, and slots 3460.

The recursor 3415 defines partitioning grids that recursively divide the IC layout into smaller and smaller sub-regions. In some embodiments, the recursor uses different shaped partitioning grids for different recursion levels. In the embodiments described below, however, the recursor uses the same shaped partitioning grids for all the recursion levels. At each recursion level, the recursor simply adjusts the coordinates of the partitioning grid to match the coordinates of the IC region at that recursion level. Using the same shaped partitioning grids for all the recursion levels has several advantages. For instance, it allows the placer 3400 to use one set of pre-tabulated net-configuration attributes for all the recursion levels, as this set could be used to define the relative costs of the net configurations at any one level.

Figure 35:
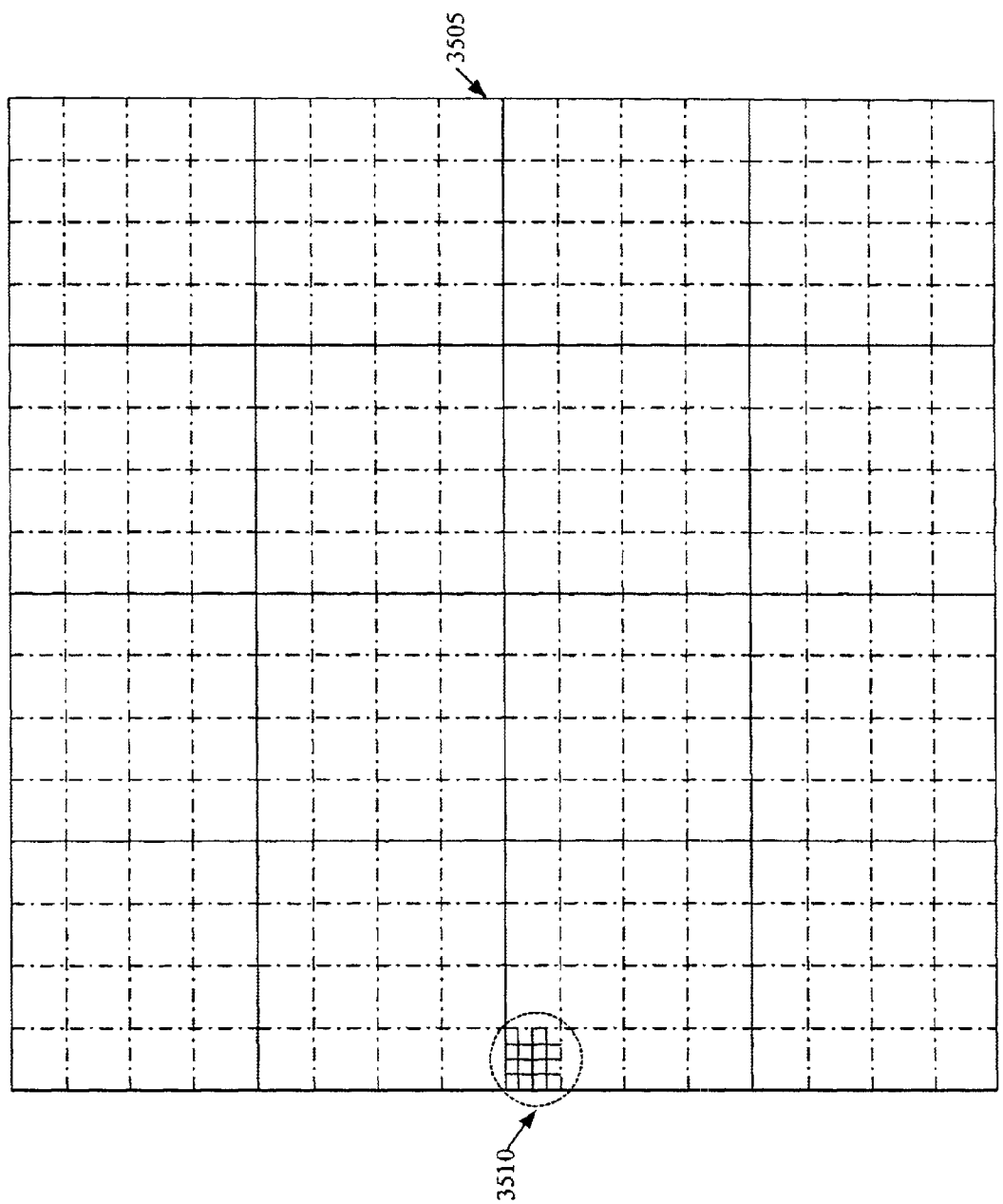
FIG. 35 illustrates an IC layout that is recursively divided into sets of 16 sub-regions.

In the embodiments described below, the recursor uses 3 evenly-spaced horizontal lines and 3 evenly-spaced vertical lines to recursively divide IC-layout regions into 16 identically-sized sub-regions (i.e., 16 identically-sized slots). FIG. 35 illustrates an IC layout 3505 that is recursively divided into sets of 16 sub-regions. Specifically, the IC layout is divided initially into 16 sub-regions, each of these sub-regions is further divided into 16 smaller sub-regions, and one of the smaller sub-regions 3510 is further sub-divided into 16 sub-regions.

At each recursion level, the initializer 3420 calculates the placement cost of the initial placement configuration within that level's IC region. The initializer calculates this cost by first calculating initial configuration and balance costs, and then using these costs to calculate the initial placement cost.

In other words, in the embodiments described below, the placement cost has two components, the configuration cost and the balance cost. The configuration cost is the cost associated with the placement configuration of the nets with respect to that level's partitioning grid. This cost is computed based on attributes (such as wirelength, bend-count, path-usage, edge-intersect, etc.) of connection graphs that model the net configurations. As described below, these attributes are pre-tabulated and stored in LUT's 3440. On the other hand, the balance cost at each recursion level reflects the size of the circuit modules in each sub-region defined by that level's partitioning grid. Hence, by factoring the balance cost, a placer can prevent some sub-regions from being excessively full.

At each recursion level, the embodiments described below calculate the balance cost based on (1) the capacity of each slot at that level, and (2) the size of circuit modules within each slot. Also, at each recursion level, these embodiments calculate the configurations costs by (1) identifying each net's configuration with respect to that level's partitioning grid, (2) using each net's configuration to retrieve pre-tabulated attributes from the LUT's, and (3) computing a configuration cost based on the retrieved attribute or attributes for the net configurations.

After the initializer 3420 calculates the placement cost of the initial placement configuration within a recursion level's IC region, the optimizer 3425 then iteratively modifies the placement configuration to improve the placement cost within that region. For each potential move that the optimizer selects, the optimizer uses the cost estimator 3430 to calculate the placement cost of the move.

The optimizer then analyzes these costs to determine whether to make the move. If it decides to make the move, the optimizer uses the mover 3435 to modify the placement configuration according to the selected move.

FIGS. 41–49 further describe the software modules 3405. However, before describing these software modules, the data constructs 3410 will be described below by reference to FIGS. 36–40.

B. Data Constructs.

1. LUT's.

The LUT's 3440 store placement attributes for all possible net configurations. Specifically, some embodiments store in the LUT's attributes of Steiner trees that model the interconnect topologies of the net configurations (i.e., that model the topologies of the interconnect lines connecting the sub-regions that contain the circuit modules of the nets). In some embodiments of the invention, the Steiner trees have edges that are completely or partially diagonal.

In the embodiments described below, the LUT's store the length and path-usage values of the Steiner trees for all possible net configurations. Some of these embodiments also consider the bend-count values of the trees during pre-tabulation of the length or path-usage values by using the bend-count values as one of the factors for selecting the trees. Other embodiments, however, store the bend-count values for the trees instead of, or in addition to, the length and path-usage values. Several processes for selecting Steiner trees and pre-tabulating their length, bend-count, and path-usage values were discussed above in Section III. One of ordinary skill will understand that other embodiments also store other attributes of trees.

Some embodiments calculate the configuration cost of the Steiner trees by combining (e.g., generating a weighted sum of) multiple attributes (e.g., length, bend-count, etc.) of the trees. Such a calculation can be performed during the pre-tabulating process or during the placement process.

In some embodiments, the placer 3400 can operate with different wiring architectures. In these embodiments, different LUT's can be used to store the configuration attributes for the different wiring models. For instance, when the IC layout uses the octagonal wiring model, one of the LUT's 3440 stores the length, bend-count, and/or path-usage values of Steiner trees that can have 45° diagonal edges. Alternatively, when the IC layout uses the hexagonal wiring model, one of the LUT's stores the length, bend-count, and/or path-usage values of the Steiner trees that can have 120° diagonal edges. One of the LUT's can also store length, bend-count, and/or path-usage values for rectilinear Steiner trees, i.e., Steiner trees that only use horizontal and vertical lines.

In some embodiments, each LUT is a table of floating point numbers. Each table is indexed by a configuration code. In other words, to retrieve configuration attribute for a particular net configuration, the configuration code for the net configuration is identified, and this configuration code is used to identify the entry in the LUT that stores the net's configuration attribute.

In the embodiments described below, the configuration code is a 16-bit number, where each bit represents a sub-region defined by the current partitioning grid. Specifically, in some embodiments, each configuration-code bit is set (e.g., equals 1) when the associated net has a circuit module in the sub-region represented by the configuration-code bit, and is not set (e.g., equals 0) when the associated net does not have a circuit module in this sub-region. Also, in these embodiments, there are $2^{16}$ configuration codes that represent the $2^{16}$ possible net configurations.

2. Net and Net List.

Figure 36:
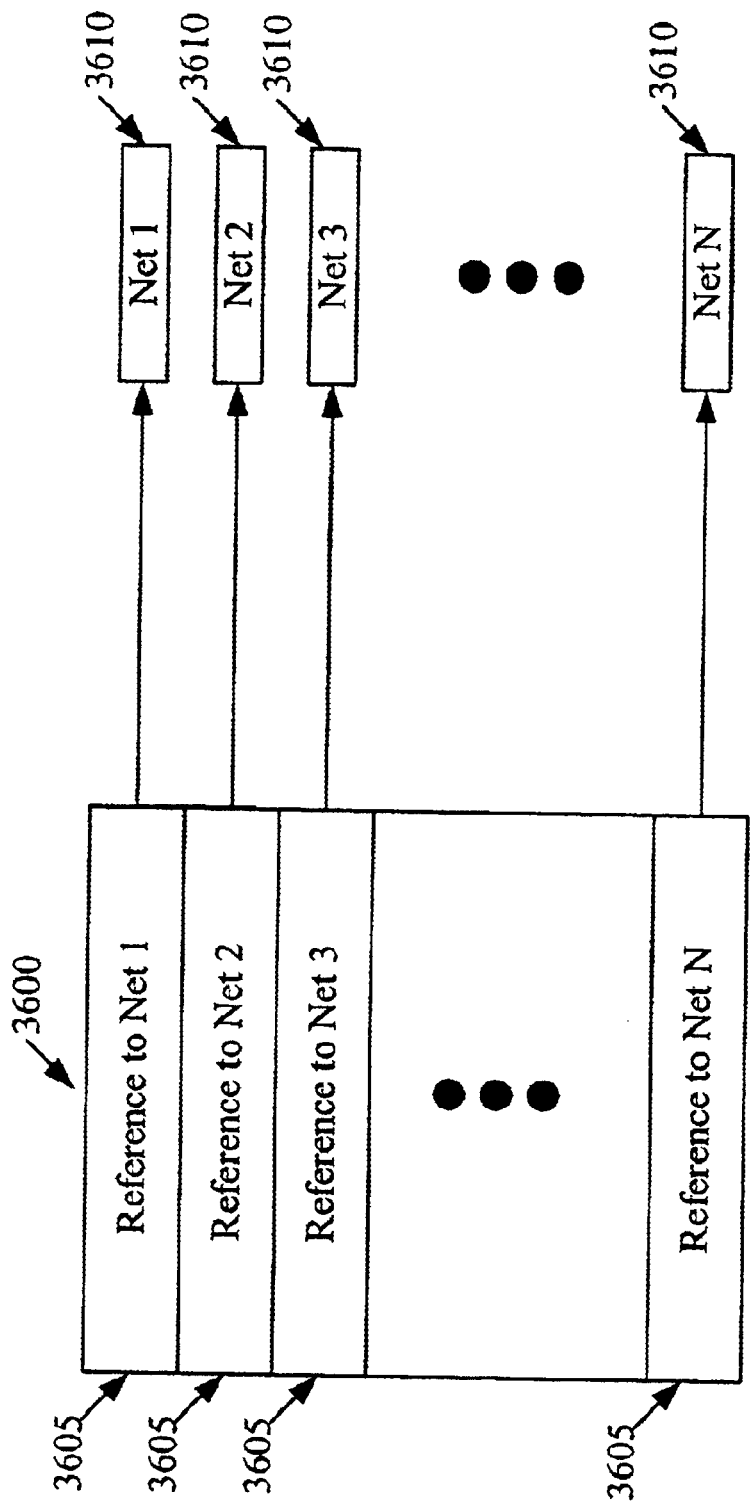
FIG. 36 illustrates the data structure for a net list.

FIG. 36 illustrates the data structure for a net list 3600. In some embodiments of the invention, each net data structure is a net data object (i.e., an instantiation of a net data class). As shown in FIG. 36, the net list includes several fields 3605. Each field refers (e.g., points) to a net 3610.

Figure 37:
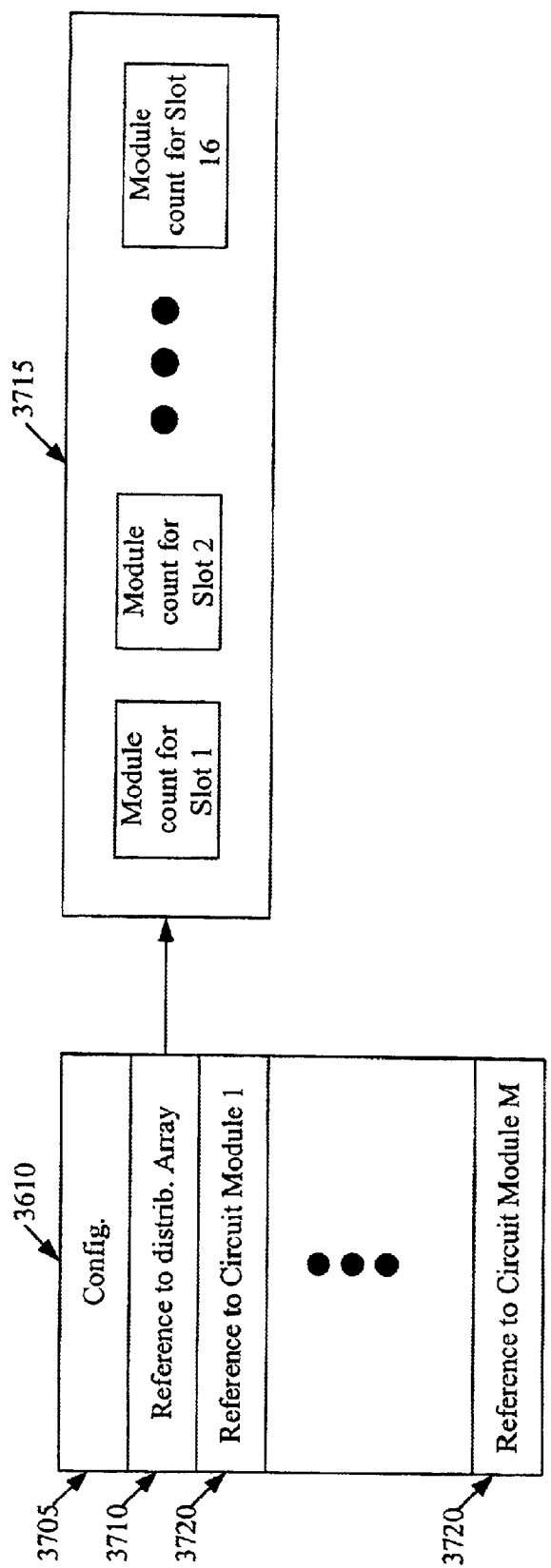
FIG. 37 illustrates the data structure for a net.

FIG. 37 illustrates the data structure for a net. In some embodiments of the invention, each net data structure is a net data object (i.e., an instantiation of a net data class). Each net data structure 3610 includes a field 3705 that stores the net's configuration code. At each stage in the recursion process, each net's configuration code is a 16-bit number that describes the net's configuration with respect to that stage's partitioning grid.

Each bit in the configuration code represents one of sixteen sub-regions defined by a partitioning grid. In some embodiments, each configuration-code bit is set to 1 when the associated net has a circuit module in the sub-region represented by the configuration-code bit, and is set to 0 when the associated net does not have a circuit module in this sub-region. For instance, under such an approach, the configuration code is 1100000110000000 for the net 1205 with respect to the partitioning grid 1200 of FIG. 12. This code reflects that this net has circuit modules in the 1, 2, 8, and 9 sub-regions defined by partitioning grid 1200. When a net has no circuit modules within a partitioning grid, the net's code configuration within that grid is represented by a string of 16 zeros. Also, for each partitioning grid, there are $2^{16}$ configuration codes that represent the $2^{16}$ possible net configurations within that grid.

As shown in FIG. 37, the net data structure 3610 also includes a field 3710 that refers (e.g., points) to a distribution array 3715. At each stage in the recursion process, the distribution array 3715 is defined with respect to the partitioning grid for that stage. This array includes 16 integer entries. Each entry corresponds to a partitioned sub-region defined by the recursor 3415, and specifies the number of the net's circuit modules in its corresponding sub-region. For instance, the distribution array for net 1205 with respect to the partitioning grid 1200 is illustrated below.

Distrib. Array for Net 1205=[1, 1, 0, 0, 0, 0, 0, 2, 1, 0, 0, 0, 0, 0, 0, 0]

As described below by reference to FIG. 42, each time the recursor defines a new partitioning grid that divides a particular IC region into 16 smaller sub-regions, the initializer 3420 (1) records in each net's data structure a configuration code that represents the net's initial configuration within the newly partitioned region, and (2) records in each net's distribution array the count of the net's circuit modules within each of the defined sub-regions. Also, as further described below by reference to FIG. 49, each time the mover 3435 repositions one or more circuit modules of the net, the mover modifies the net's configuration code and its distribution array.

As shown in FIG. 37, the data structure 3610 of a net also includes one or more fields 3720 that refer (e.g., point) to the data structures of circuit modules on the net.

3. Circuit Modules.

Figure 38:
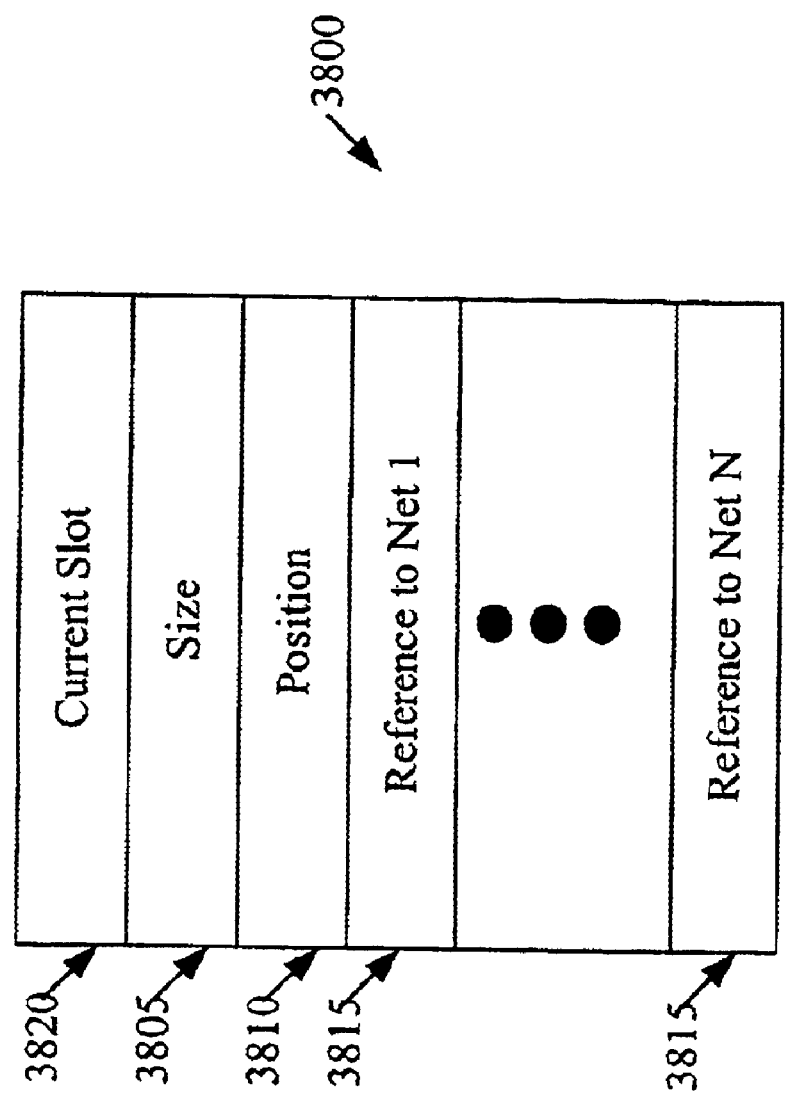
FIG. 38 illustrates the data structure of a circuit module.

FIG. 38 illustrates the data structure of a circuit module. In some embodiments of the invention, each circuit-module data structure is a data object (i.e., an instantiation of a circuit-module class). As shown in this figure, this data structure 3800 includes a field 3805 that specifies the size of the circuit module. It also includes a field 3810 that specifies the position of the circuit module in the IC layout. In some embodiments, the circuit module's position is specified by the x- and y-coordinates of module's origin (e.g., its center). The data structure 3800 also includes one or more fields 3815 that refer (e.g., point) to the data structures of nets on which the circuit module resides.

The data structure 3800 also includes a field 3820 that specifies the slot (i.e., sub-region) that contains the circuit module. At each stage in the recursion process, the current-slot field 3820 is defined with respect to the partitioning grid for that stage. As further described below by reference to FIG. 42, each time the recursor defines a new partitioning grid that divides a particular IC region into 16 smaller sub-regions, the initializer 3420 identifies the position of each circuit module with respect to the newly defined sub-regions. For each circuit module that falls within one of these sub-regions, the initializer then records the identity of the sub-region that contains the module in the current-slot field 3820 of the circuit module data structure. When a circuit module does not fall within any of the sub-regions defined by a particular partitioning grid, the entry in the current-slot field 3820 is set to a default value (e.g., 0). This default value indicates the circuit module is outside of the current partitioned IC region.

As further described below by reference to FIG. 49, each time the mover 3435 repositions a circuit module, the mover ascertains the slot that contains the module after its move, and modifies the current-slot field 3820 to reflect the new location of the circuit module.

4. Slot.

Figure 39:
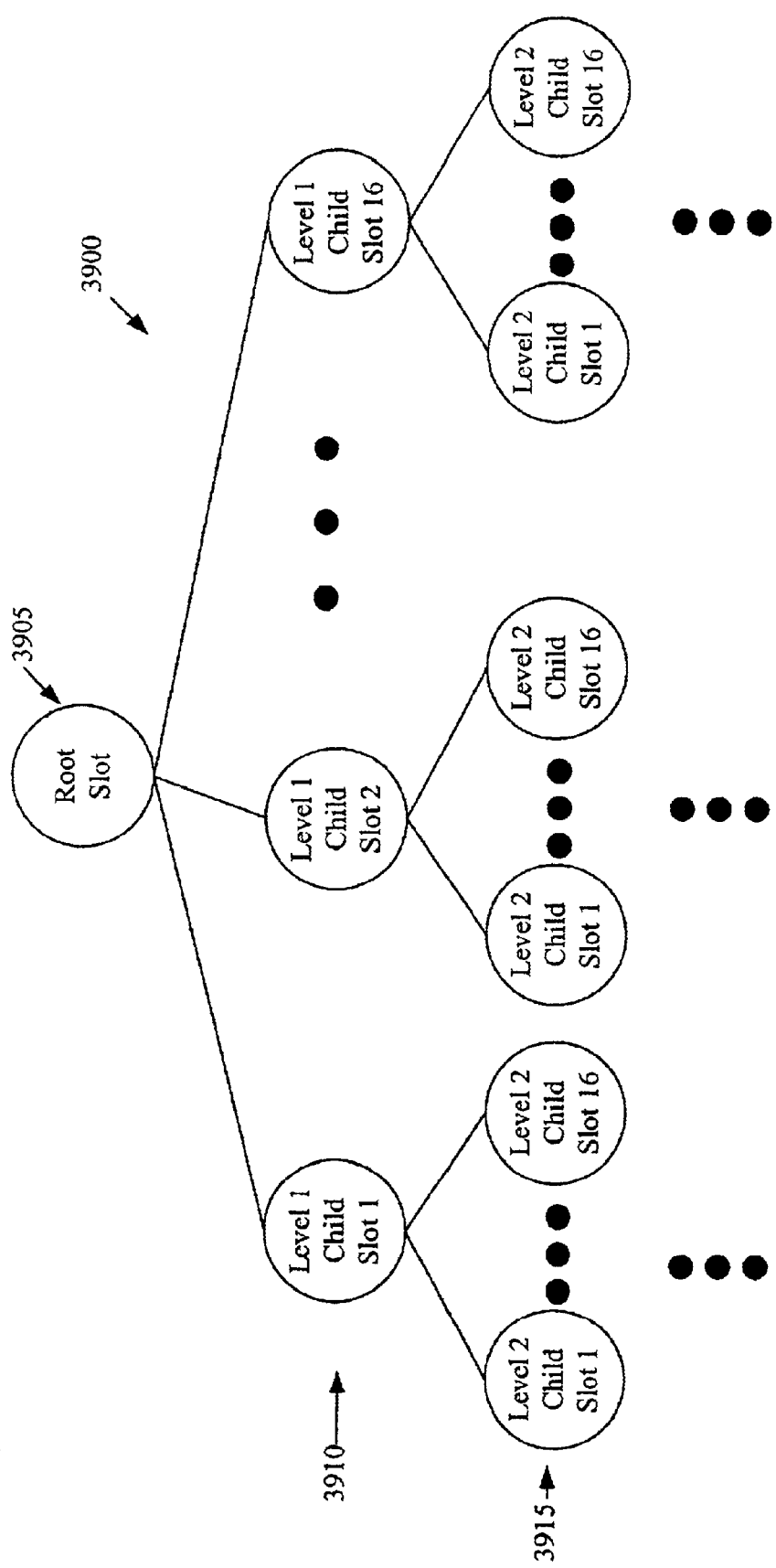
FIG. 39 presents a graph that illustrates the hierarchy of slots defined by the recursor.

At each stage in the recursion process, the recursor 3415 divides a particular IC region into 16 sub-regions or slots. FIG. 39 presents a graph that illustrates the hierarchy of slots (i.e., sub-regions) defined by the recursor. This graph 3900 illustrates two levels 3910 and 3915 of the recursion process. In this graph, each node represents an IC region at a particular stage within the recursion process. Also, in this graph, the root node represents the entire IC layout, while each non-root node represents a portion of the IC layout.

In a slot-hierarchy graph (such as graph 3900), each node has either 0 child nodes or 16 child nodes. A node has 16 child nodes when the recursor partitions that node's region into 16 sub-regions. Conversely, a node does not have child nodes when its corresponding region is not partitioned.

Figures 40, 43:
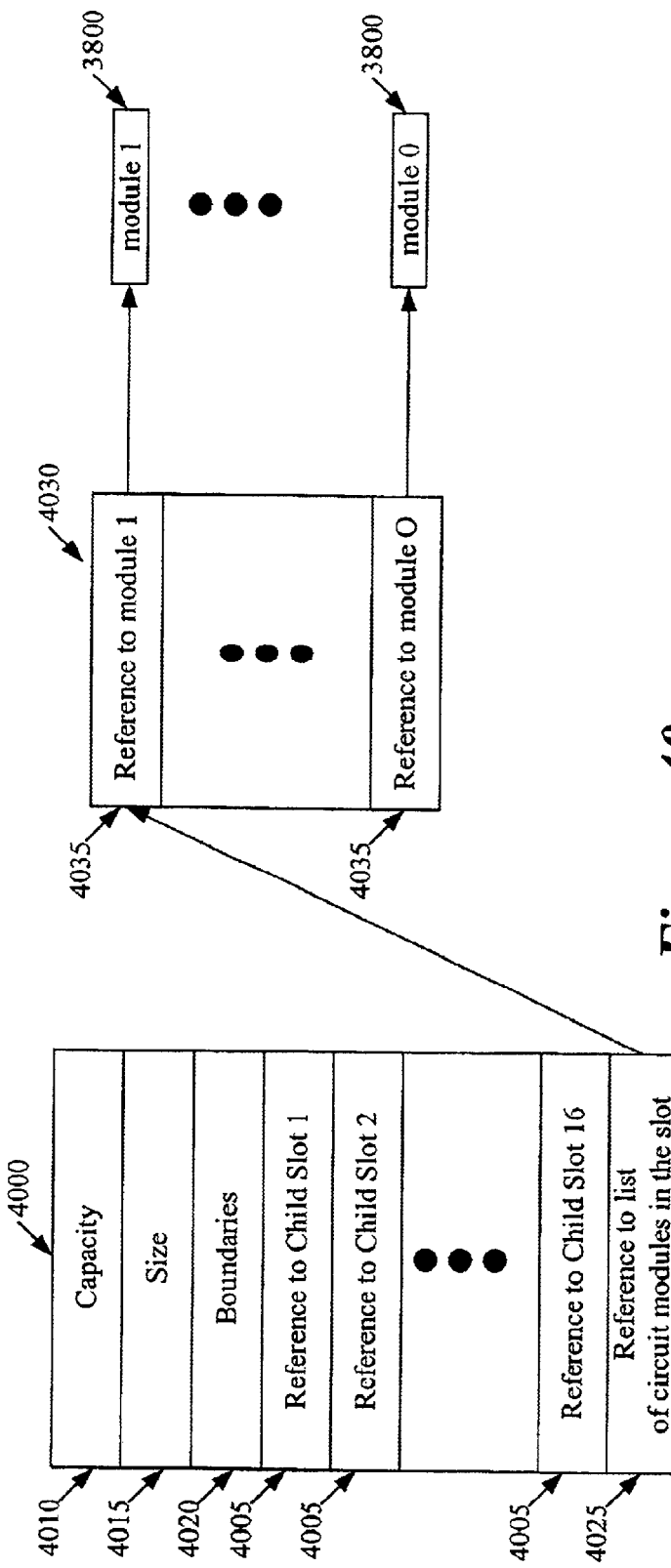
FIG. 40 presents a data structure for a slot.
FIG. 43 illustrates a global path-usage data structure that stores the sum of all the path-usage values over all the nets.

In some embodiments, the recursor 3415 defines a slot data structure to represent each node in a slot-hierarchy graph (such as graph 3900). FIG. 40 presents one such data structure 4000 for a slot. In some embodiments of the invention, each slot data structure is a slot data object (i.e., an instantiation of a slot data class).

The slot data structure 4000 includes sixteen reference fields (e.g., pointer fields) 4005. When the recursor partitions a slot, the recursor defines 16 child slot data structures (e.g., 16 child data objects), and links each particular reference field 4005 of the slot's data structure 4000 to one of the defined child-slot data structure. On the other hand, when the recursor does not partition a slot, that slot's data structure does not have any child slot data structures (i.e., that slot's reference fields 4005 do not refer to any child slot data structures).

The slot data structure 4000 also specifies the capacity 4010 and size 4015 of the slot. In addition, this data structure specifies the boundaries 4020 of the slot. The boundary data of a set of 16 child slots at a given recursion level is defined by evenly dividing the boundary data of their parent slot along the x- and y-axis. This data structure 4000 also includes a reference (e.g., a pointer) 4025 to a list 4030 of circuit modules in the slot. This list 4030 includes one or more references (e.g., one or more pointers) 4035 to one or more circuit modules 3800 in the slot 4000.

C. Recursor.

Figure 41:
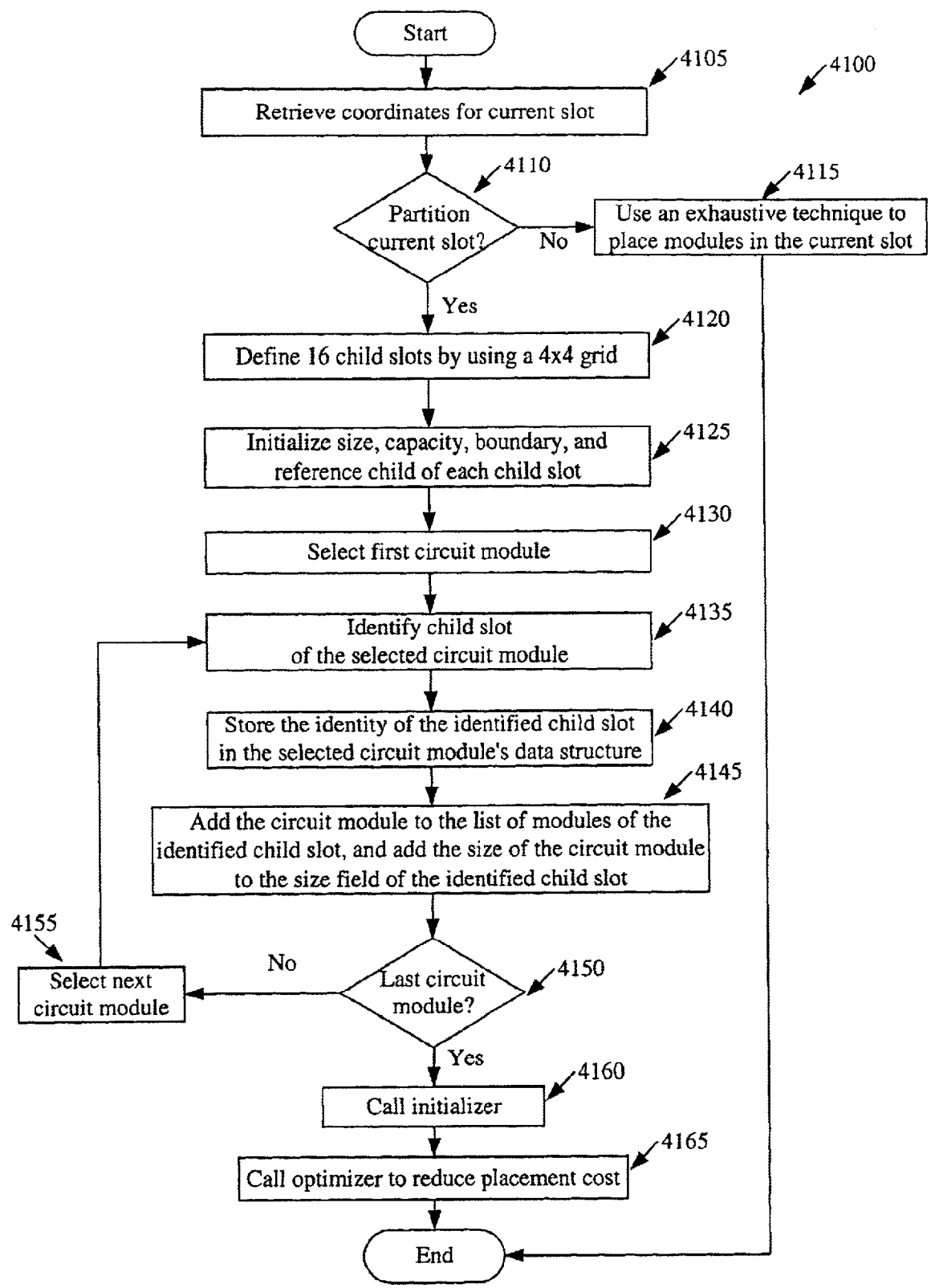
FIG. 41 illustrates a process performed by a recursor of FIG. 34.

FIG. 41 illustrates a process 4100 that the recursor 3415 performs. The recursor initially performs this process for the root slot corresponding to the entire IC layout, and then iteratively performs this process for each slot defined thereafter that meets a certain criteria. Initially, the process 4100 retrieves (at 4105) the boundary coordinates for the current slot that it is analyzing. This information is stored in the field 4020 of the slot's data structure 4000.

Next, the process determines (at 4110) whether it needs to partition the current slot into 16 child slots (i.e., whether it needs to define 16 child slots for the current slot). In some embodiments, the process partitions the current slot when the slot contains more than a threshold number (e.g., 10) of circuit modules. The process can ascertain the number of circuit modules in the current slot through the slot's list 4030 of circuit modules.

If the process determines (at 4110) that it does not need to partition the current slot into 16 child slots, it uses (at 4115) an exhaustive technique to place the circuit modules in the current slot (i.e., to identify the final position of the circuit modules in the current slot). One such exhaustive technique is the branch-and-bound technique, such as the one disclosed in A. E. Caldwell, A. B. Kahng and I. L. Markov, "Optimal Partitioners and End-Case Placers for Standard-Cell Layout", Proceedings of the ACM International Symposium on Physical Design, April 1999, pp. 90–96.

On the other hand, when the process determines (at 4110) that it does need to partition the current slot, the process defines (at 4120) 16 child slots for the current slot. To define these child slots, the process uses sets of 3 horizontal and vertical lines (such as the lines shown in FIG. 35) to partition the region defined by the slot's boundaries into 16 sub-regions. For each of the resulting sub-regions, the process defines (at 4120) a child slot data structure 4000, and links these child data structures to the data structure of the current slot.

Next, for each child data structure 4000 defined at 4120, the process initializes (at 4125) the values of fields 4005, 4010, 4015, and 4020. The process initializes the reference fields 4005 to nil. Also, the process computes each child's capacity, boundary, and size data based on the capacity, boundary, and size data of the current slot, and then uses these computed values to initialize respectively the capacity field 4010, the size field 4015, and the boundary field 4020.

The process then selects (at 4130) a circuit module of the current slot or a circuit module outside of the current slot that shares a net with a module inside the current slot. In some embodiments, the process identifies the circuit modules within the current slot through list 4030 of the current-slot data structure 4000, and identifies the related circuit modules outside of the current slot through the net's of the circuit modules within the current slot. The process analyzes (at 4135) the selected circuit module's position data to identify the child slot that contains the selected circuit module. The process next stores (at 4140) the identity of the identified child slot in the current-slot field 3820 of the selected circuit module's data structure 3800. If the selected circuit module is not in the current slot, the process stores (at 4140) a default value in the field 3820. At 4145, the process then adds a reference to the selected circuit module's data structure in the identified child slot's list 4030, and increments the identified slot's size value 4015 by the size of the selected circuit module.

The process determines (at 4150) whether it has examined all the circuit modules. If not, the process selects (at 4155) another circuit module, and then repeats 4135–4145 to (1) identify a child slot that contains the selected circuit module, (2) initialize the current-slot field of the newly selected circuit module, (3) increment the size value of the identified child slot, and (4) add a reference to the circuit module in the data structure of the identified child slot.

When the process determines (at 4150) that it has examined all of circuit modules, the process first calls (at 4160) the initializer 3420 to determine the initial placement cost, and then calls (at 4165) the optimizer 3425 to optimize the placement cost. The process then ends.

The operations performed by the initializer 3420 are described below by reference to FIGS. 42–46, while the operations performed by the optimizer 3425 are described below by reference to FIGS. 47–49.

D. Initializer.

1. Overall Flow.

Figure 42:
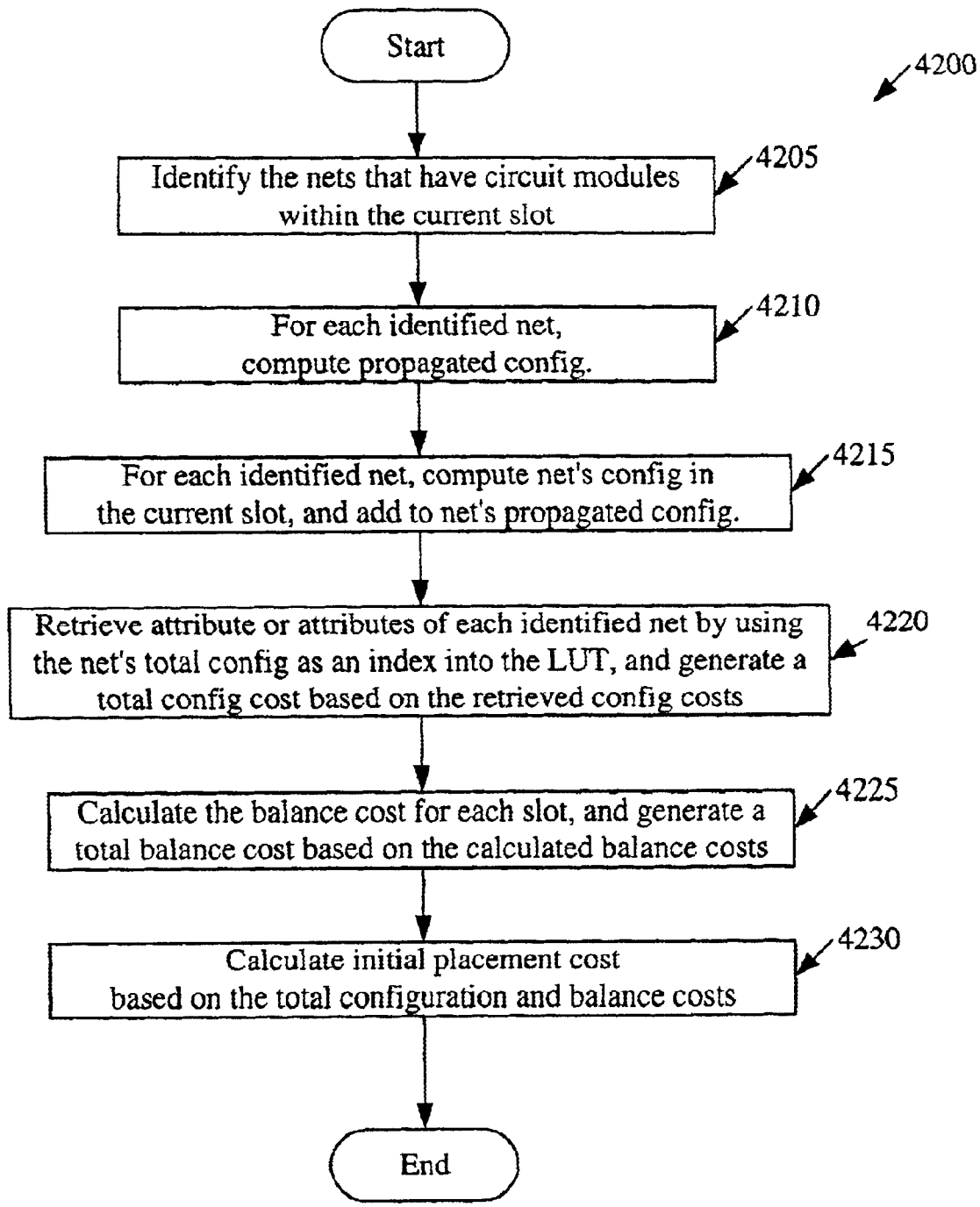
FIG. 42 illustrates a process performed by an initializer of FIG. 34.

FIG. 42 illustrates a process 4200 that the initializer 3420 performs each time the recursor 3425 calls (at 4160) the initializer to compute the initial placement cost for a current slot. As mentioned above, this placement cost is a combination of configuration and balance costs that the initializer also computes.

The process 4200 initially identifies (at 4205) the nets that have circuit modules in the current slot. The circuit-module list 4030 of the current slot's data structure 4000 identifies the circuit modules of the current slot. In turn, the identified circuit modules' data structure fields 3815 identify the nets that have circuit modules in the current slot.

Each identified net might also have modules outside of this slot, and these outside modules affect the structure of the connection graph that models the net's interconnect topology within the current slot. This is because the connection graph that models the net configuration within the current slot has to connect to the connection graph that models the net's configuration outside of the current slot.

Hence, after identifying (at 4205) the nets that have circuit modules in the current slot, the process 4200 computes a propagated configuration code for each identified net, in order to account for the possible positions of circuit modules outside of the current slot. The process stores the propagated configuration code for each identified net in the configuration field 3705 of the net's data structure 3700. The propagated configuration code, and the computation of this code, will be further described below by reference to FIGS. 44 and 45.

Next, for each identified net, the process computes (at 4215) the net's configuration code with respect to the partitioning grid of the current slot. The computation of the net's configuration code will be further described below by reference to FIG. 46.

At 4215, the process also (1) generates an aggregate configuration code for each net by adding the computed configuration code and the propagated configuration code of the net, and (2) stores the aggregate configuration code in the net's configuration field 3705.

The process then uses (at 4220) the configuration codes of the identified nets to retrieve from one or more LUT's 3440 attributes of the Steiner trees that model the interconnect topologies of the net configurations. For each net configuration, the process uses the net's aggregate configuration code as a value (i.e., an index) that specifies a location in a LUT that stores the net's configuration attribute. When more than one LUT's are used to store more than one attribute for each net configuration, each net's aggregate configuration code specifies a location in each LUT, and each of these locations stores a different attribute for the net configuration.

Based on the retrieved configuration attributed of the identified nets, the process calculates (at 4220) a total configuration cost for the net configurations in the current slot. In different embodiments, the total configuration cost is the total wirelength cost, the total congestion cost, the total bend cost, or a combination of any of the above.

For instance, when the retrieved attribute is length, the process can combine (e.g., sum) the retrieved lengths to obtain a total wirelength cost for the configuration. When the retrieved attributes are length and bend-count values, the process can combine these values (e.g., can generate a weighted sum of these values) to obtain another total configuration cost estimate for the placement configuration.

When the retrieved attributes are path-usage values, the placer can calculate a total congestion cost for a placement configuration within a partitioned slot by (1) summing the retrieved values for each particular path over all the nets, (2) squaring this sum, and (3) adding the squared sums of all the paths, as discussed above by reference to Equation F. Also, as mentioned above by reference to Equation G, other embodiments calculate a congestion cost by (1) summing the retrieved values for each particular path over all the nets, and (2) selecting the maximum sum as the congestion cost.

When the initializer calculates a total configuration cost based on the pre-tabulated path-usage values, the initializer creates a 42-entry global data structure (e.g., a 42-entry array) that stores the sum of all the path-usage values over all the nets. FIG. 43 illustrates one such global path-usage data structure 4300, which has one entry for each particular path, and this entry stores the sum of the retrieved values for its path over all the nets.

In some embodiments, the initializer calculates the total configuration cost by combining the cost computed for multiple attributes. For instance, in some embodiments, the initializer generates a weighted sum of a placement-configuration's wirelength cost and congestion cost.

The process then computes (at 4225) a total balance cost for the initial placement configuration in the current slot. To do this, the process (1) computes the individual balance cost for each of the current slot's child slots, which the recursor defined at 4120, and (2) calculates the total balance cost based on these computed individual balance costs.

For instance, in some embodiments, the balance cost (G) of each child slot is a function of that slot's capacity (C) and that size (S) of the circuit modules in that slot. Some embodiments (1) estimate the capacity of each child slot as 1/16 of the capacity of the current parent slot, and (2) calculate each child slot's size (S) by summing the sizes of the circuit modules within that slot.

Different embodiments then use different balance equations to calculate the balance cost of each child slot based on that slot's capacity and size. Equations (J)–(M) below list several different balance functions that are used in different embodiments.

$$G(S,C) = [\max(S-C, 0)]^4 \tag{J}$$

$$G(S,C) = [\max(S-C, 0)]^2 \tag{K}$$

$$G(S,C) = |S-C|/C \tag{L}$$

$$G(S,C) = S|S-C|/C \tag{M}$$

$$G(S,C) = N|S-C|/C \tag{N}$$

In these equations, S represents the size of modules in the child slot, C represents the capacity of the child slot, and N is the number of modules in the slot. Each slot's size value is stored in its data-structure size field 4015, its capacity is stored in its data-structure capacity field 4010, and the number of its modules is discerned from its data-structure list 4030.

To calculate the total balance cost for the current slot, some embodiments sum the computed individual balance costs of the child slots, as indicated by Equation (O) below.

$$\text{Total Balance Cost} = \sum_{slots} \text{balance(cost)} \tag{O}$$

After calculating to the total balance cost at 4225, the process 4200 calculates the initial placement cost. In some embodiments, the process calculates this cost as a weighted sum of the total configuration cost and the total balance cost, as indicated in Equation (P) below.

$$\text{Placement Cost} = \text{Total Configuration Cost} + \tag{P}$$
$$(\omega * \text{Total Balance Cost})$$

In this equation, ω is a weighting factor. Once the process 4200 calculates the initial placement cost, it ends.

2. Computing Propagated Configuration.

As mentioned above, the process 4200 computes (at 4210) the propagated configuration code for each net it identifies (at 4205) as having one or more circuit modules in the current slot. The propagated configuration code of an identified net accounts for the possible positions of that net's circuit modules outside of the current slot.

Figure 44:
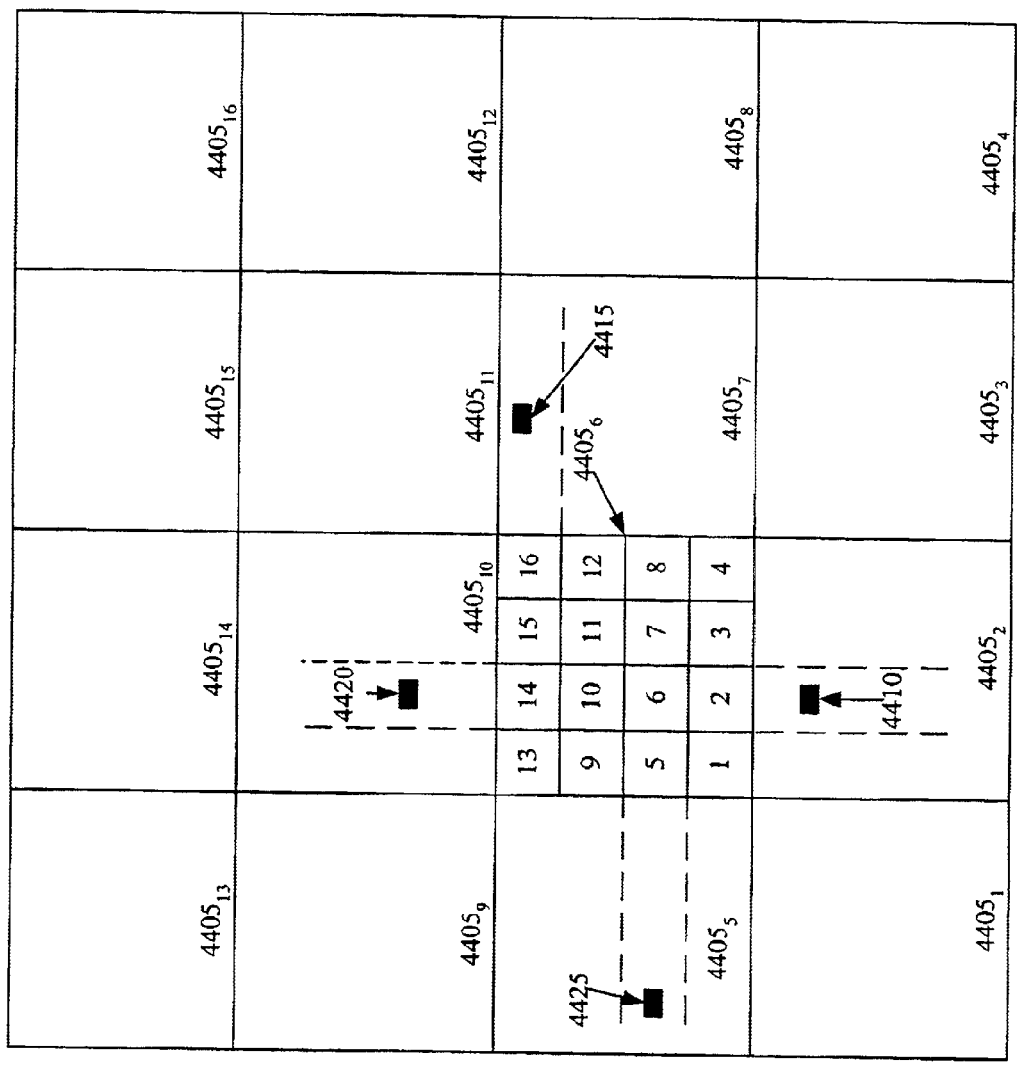
FIG. 44 illustrates an IC layout that has been partitioned into sixteen slots.
Figure 45:
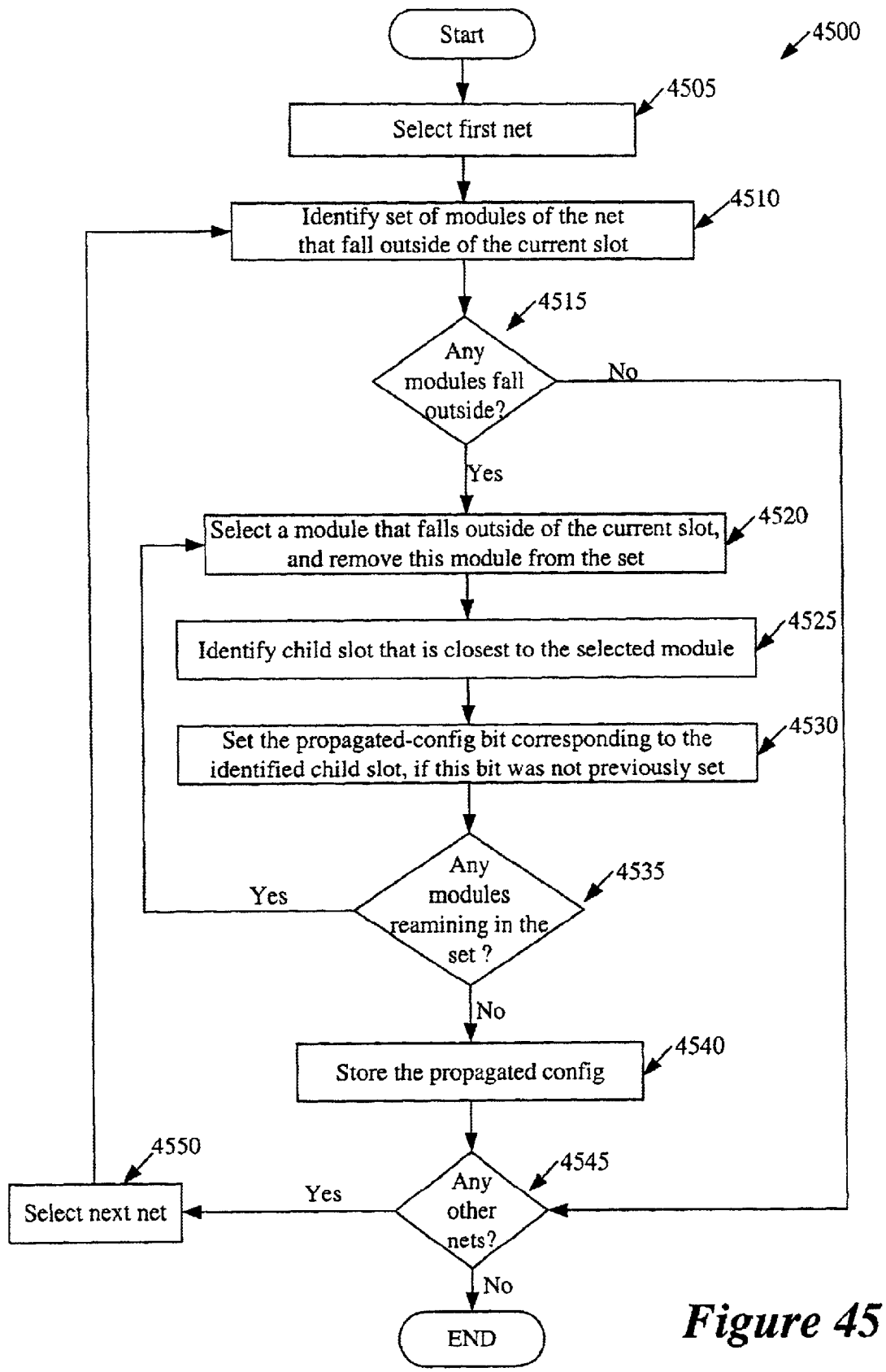
FIG. 45 illustrates a process for generating propagated configuration codes.

FIGS. 44 and 45 illustrate one manner for generating the propagated configuration codes. FIG. 44 illustrates an IC layout 4400 that has been partitioned into sixteen slots $4405_1$–$4405_{16}$. One of these slots is the current slot $4405_6$, which the recursor has further partitioned into 16 child slots that are numbered 1–16 in FIG. 44.

In some embodiments of the invention, a 16-bit number represents the propagated configuration code of each net that has one or more circuit modules in the current slot ($4405_6$). Each bit in this code corresponds to a child slot of the current slot ($4405_6$). Some embodiments define a net's 16-bit propagated configuration code by setting to 1 each bit whose corresponding child slot is the closest slot to a circuit module of the net outside of the current slot.

Under this approach, (1) the $16^{th}$ bit of a net's propagated configuration code is set to 1 when the net has one or more circuit modules in the upper-right neighbor slots of the current slot (e.g., when the net has circuit modules in the neighboring slots $4405_{11}$, $4405_{12}$, $4405_{15}$, and $4405_{16}$ of $4405_6$), (2) the $13^{th}$ bit of the propagated configuration code is set to 1 when the net has one or more circuit modules in the upper-left neighbor slots of the current slot (e.g., when the net has circuit modules in the neighboring slots $4405_9$ and $4405_{13}$ of $4405_6$), (3) the $4^{th}$ bit of the propagated configuration code is set to 1 when the net has one or more circuit modules in the lower-right neighbor slots of the current slot (e.g., when the net has circuit modules in the neighboring slots $4405_3$ and $4405_4$ of $4405_6$), (4) the $1^{st}$ bit of the propagated configuration code is set to 1 when the net has one or more circuit modules in the lower-left neighbor slots of the current slot (e.g., when the net has circuit modules in the neighboring slot $4405_1$, of $4405_6$).

On the other hand, if the net has circuit modules directly above (e.g., in slots $4405_{10}$ and $4405_{14}$) or below (e.g., in slot $4405_2$), or to the left (e.g., in slot $4405_5$) or right (e.g., in slots $4405_7$ and $4405_8$) of the current slot ($4405_6$), the bits 1–5, 8, 9, 12–16 are set to 1 if their corresponding child slots are the closest slots to the circuit modules.

For instance, in FIG. 44, a net has circuit modules at positions 4410, 4415, 4420, and 4425. Hence, the net's propagated configuration code has its bits 2, 16, 14, and 5 set to 1, because child slots 2, 16, 14, and 5 are the closest child slots respectively to positions 4410, 4415, 4420, and 4425. It should be noted that, under this approach of computing the propagated configuration code, the bits 6, 7, 10, and 11 in the propagated configuration code are never set to 1, since their corresponding child slots are never the closest slots to the circuit modules outside of the current slot. Other embodiments, however, use other techniques for defining the propagated configuration codes.

FIG. 45 illustrates a process 4500 for generating the propagated configuration codes of the nets that the process 4200 identifies at 4205. This process 4500 starts when the process 4200 calls it at 4210. The process 4500 initially selects (at 4505) one of the nets identified at 4205. Next, the process examines (at 4510) all the circuit modules of the selected net in order to identify the modules of this net that fall outside of the current slot. The process performs this identification by identifying the circuit modules that have a default value stored in their current-slot field. The recursor stores (at 4140) a default value in the current-slot field of a circuit-module's data structure when it determines that the circuit module is outside of the current slot and hence does not fall within any of this slot's child slots.

Next, the process 4500 determines whether it identified at 4510 any of the net's circuit modules outside of the current slot. If not, the process transitions to 4545, which will be described below. Otherwise, the process selects (at 4520) one of the modules identified at 4510, and removes this module from the identified set of modules.

The process then identifies (at 4525) the child slot closest to the selected module, according to the identification scheme described above by reference to FIG. 44. In other words, the corner child slots 1, 4, 16, and 13 are identified when the selected circuit module respectively resides in the lower-left, lower-right, upper-right, and upper-left neighbor slots of the current slot. When the selected circuit module resides directly above or below, or to the right or left, of the current slot, then the identified child slot is one of the child slots 1–5, 8, 9, 12–16 that is closest to the circuit module. The process identifies the closest child slot by comparing the coordinates of the circuit module with the boundary coordinates of the current slot and its child slots.

After identifying the closest child slot, the process sets (at 4530) the propagated-configuration-code bit corresponding to the identified child slot, so long as this bit was not previously set. The process next determines (at 4535) whether the set identified at 4510 contains any other modules (i.e., whether there are any of the net's modules outside of the current slot that it has not yet examined). If so, the process transitions back to 4520 to select another module from the set.

Otherwise, the process determines that it has examined all of the net's modules that are outside of the current slot, and hence stores (at 4540) the computed propagated configuration code in the net's configuration field 3705. The process then determines (at 4545) whether it has examined all the nets identified at 4205. If not, it selects (at 4550) another net, and transitions back to 4510 to repeat its operations for the newly selected net. Otherwise, the process ends.

3. Computing Net Configuration.

Figure 46:
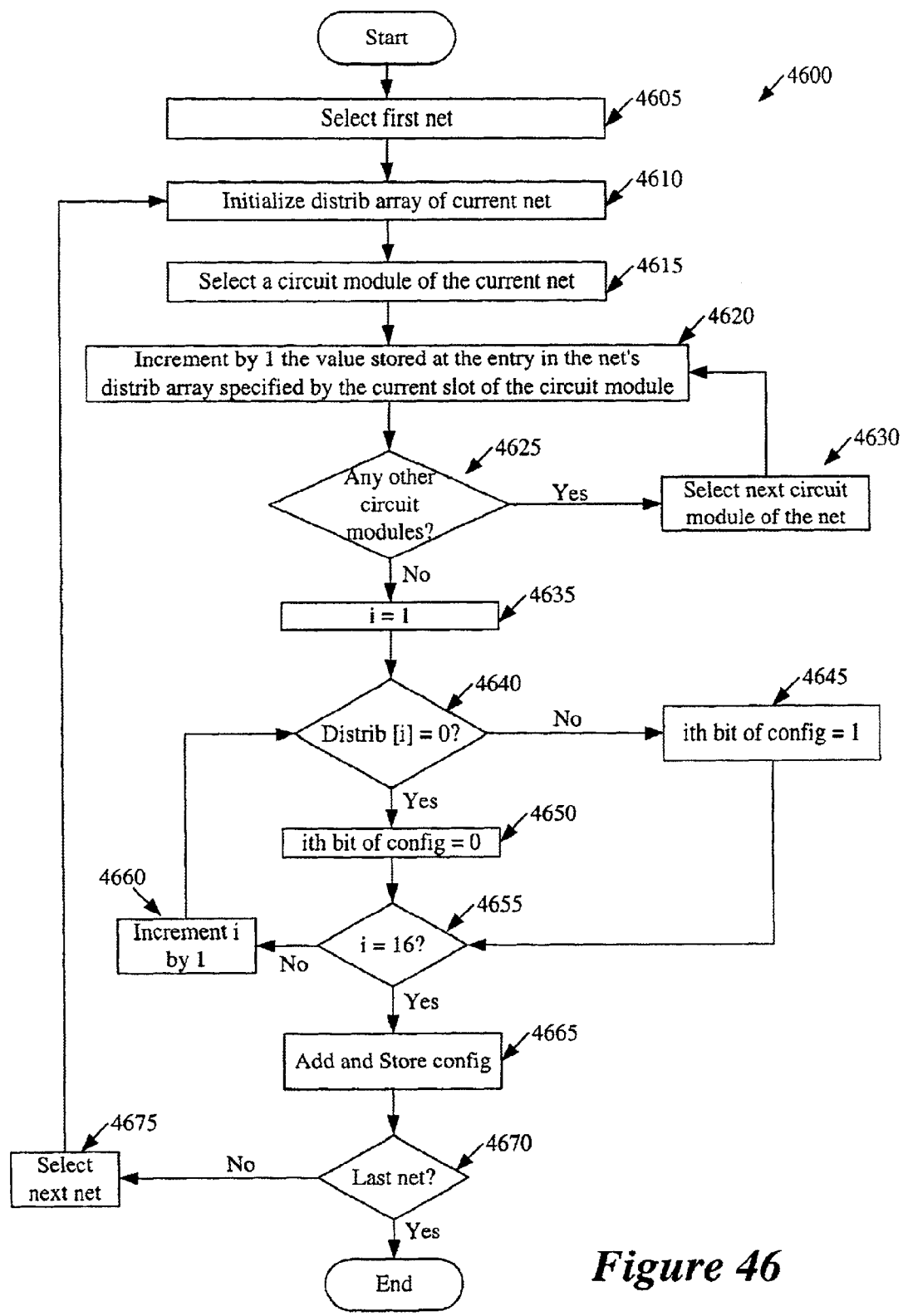
FIG. 46 illustrates a process that generates total configuration codes.

FIG. 46 illustrates a process 4600 that generates a total configuration code for each net that the process 4200 identifies (at 4205) as having circuit modules in the current slot. This process 4600 starts when the process 4200 calls it at 4215. The process 4600 initially selects (at 4605) one of the identified nets. Next, the process initializes (at 4610) the distribution array 3715 of the selected net by setting its 16 entries to 0. From the list 4030 of circuit modules of the selected net, the process then selects (at 4615) a circuit module of the current net.

The process retrieves (at 4620) the current-slot value 3820 from the selected circuit module's data structure 3800. This value is either (1) a default value, or (2) a non-default value specifying a child slot of the current slot that contains the selected circuit module. If this value is not the default value, the process increments (at 4620) by 1 the distribution-array entry that corresponds to the child slot identified by this value.

Next, the process determines (at 4625) whether it has examined all the circuit modules of the selected net. If not, the process selects (at 4630) a new circuit module of the net. The process then transitions back to 4620 (1) to identify the current-slot value of the newly selected circuit module, and (2) if this value is not the default value, to increment by 1 the distribution-array entry corresponding to the child slot identified by this value.

When the process 4600 determines (at 4625) that it has examined all the modules of the selected net, the process sets (at 4635) a counter I equal to 1. Next, the process determines (at 4640) whether the distribution-array entry at the location specified by the counter variable I equals 0. If not, the process realizes that the net has at least one circuit module in child slot I, and hence sets (at 4645) this net's configuration-code bit I to 1. Otherwise, the process realizes that the net does not have any circuit module in child slot I, and therefore sets (at 4650) this net's configuration-code bit I to 0.

From 4645 and 4650, the process transitions to 4655, where it determines whether the counter variable I equals 16. If not, it increments (at 4660) this variable I by 1, and transitions back to 4640 to set the Ith bit of the net's configuration code. When the counter variable I equals 16, the process determines that it has set all the bits of the net's configuration code. Consequently, it generates (at 4665) a total configuration code by adding the computed net configuration code to the net's propagated configuration code, which was previously recorded (at 4540) in the configuration field 3705. The process then stores this total configuration code in the net's configuration field 3705.

After 4665, the process determines (at 4670) whether it has examined all the identified nets for the current slot. If not, the process selects (at 4675) another net, and transitions back to 4610 to repeat the operations to ascertain this net's total configuration code. Otherwise, the process ends.

D. Optimizer.

1. Overall Flow.

As described above, the initializer 3420 calculates the configuration, balance, and placement costs of the initial placement configuration in the current slot. The initializer then returns these costs to the recursor 3415, which, in turn, calls the optimizer 3425 to optimize these costs. The optimizer can use a variety of optimization techniques, such as local optimization, simulated annealing, KLFM, etc. However, in the embodiments described below, the optimizer uses a simulated annealing technique.

Simulated annealing is an optimization technique that iteratively modifies the placement configuration to improve the placement score generated by a cost-calculating function. At each iteration, this technique might move one circuit module, swap two modules, or move a number of related modules. Also, at each iteration, this technique randomly selects moves. It also accepts moves that make the calculated cost worse, but it tolerates fewer bad moves as the number of iterations increases.

Figure 47A:
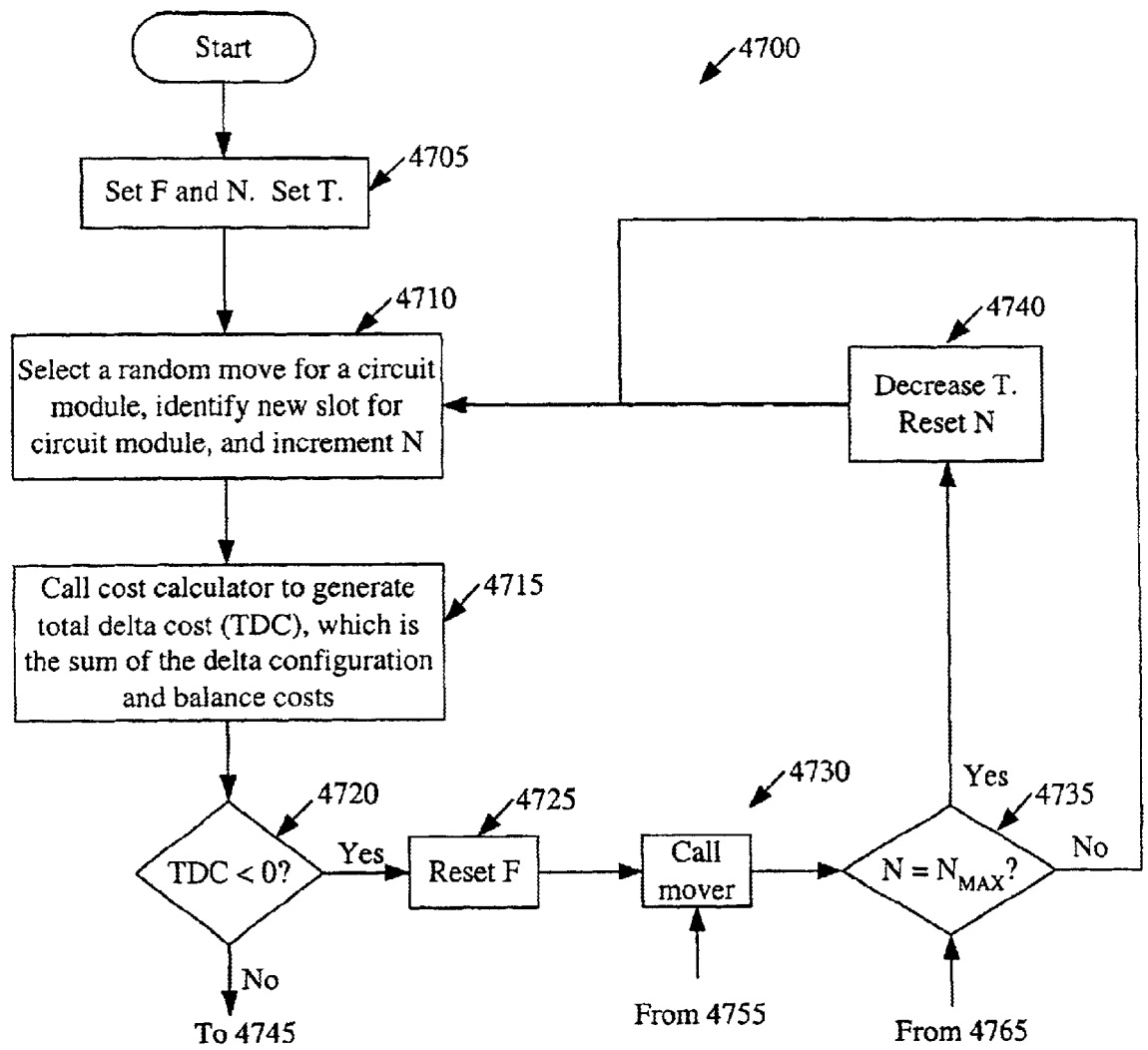
FIG. 47 illustrates one example of a simulated annealing process.
Figure 47B:
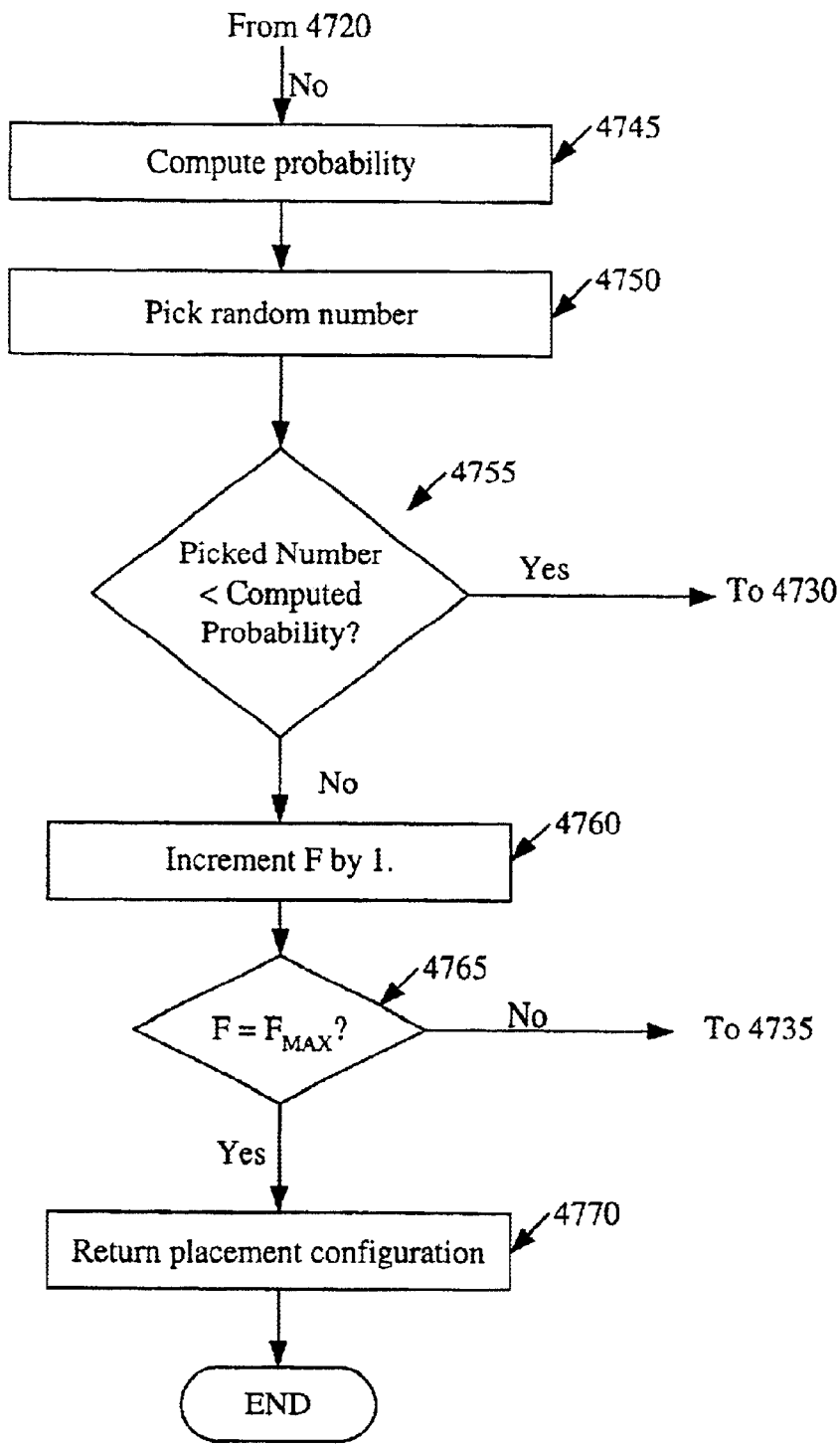

FIG. 47 illustrates one example of a simulated annealing process 4700. This process starts when it receives an initial placement configuration for a current slot from the recursor 3415. In some embodiments, the process receives the initial configuration by receiving the data structure 4000 for the current slot. As mentioned above, this data structure has a list 4030 that identifies all the circuit modules in the current slot; these modules, in turn, identify all the nets of the circuit modules within the current slot.

As shown in FIG. 47, the process sets (at 4705) a futile-iteration counter (F) equal to 1. The process uses this counter to determine whether it needs to terminate its operation as it has performed a predetermined number of iterations without improving the score. At 4705, the process also sets an annealing "temperature" T and iteration counter N. As further described below, the annealing temperature determines how likely the process 4700 will accept bad moves. The iteration counter is used to decrease this temperature over time, so as to make process 4700 less willing to accept bad moves over time.

Next, the process (at 4710) selects a random move for a circuit module in the current slot. However, one of ordinary skill will realize that some embodiments select (at 4710) random moves for two or more circuit modules in the current slot. At 4710, the process 4700 also increments the iteration counter N.

The process then calls (at 4715) the cost estimator 3430 to compute the total delta cost (TDC) of the selected random move. To calculate the total delta cost, the estimator 3430 calculates the delta configuration and balance costs, and then computes the total delta cost based on these calculated costs. The cost estimator will be further described below by reference to FIG. 48.

After calling the cost estimator, the process next determines (at 4720) whether the computed total delta cost of the selected random move is less than 0. If so, the selected random move improves the placement cost of the net configuration in the current slot. Hence, the process resets (at 4725) the futile-iteration counter F to 1, and then calls (at 4730) the mover 3435 to modify the net configurations within the current slot in accordance with the move. The mover's operations will be described below by reference to FIG. 49.

The process next determines (4735) whether the iteration counter N has reached a maximum. If not, the process returns to 4710 to select another random move. Otherwise, the process decreases (at 4740) the annealing temperature and resets the iteration counter N at 4740, and then returns to 4710 to select another random move.

If the process determines (at 4720) that the calculated total delta cost of the selected random move is not less zero, the process computes (at 4745) a probability between 0 and 1. In some embodiments, the equation for computing the probability equals $e^{-(TDC)/T}$, where TDC is the calculated total delta cost of the selected move and T is the annealing temperature.

Next, the process picks (at 4750) a random number between 0 and 1. At 4755, the process determines whether the random number is less than the computed probability. If so, the process transitions to 4730 to call the mover 3435, and perform the other operations associated with the move, as described above. Otherwise, the process increments (at 4760) the futile-iteration counter F by one.

The process then determines (at 4765) whether the futile-iteration count equals a pre-specified maximum ($F_{MAX}$). If not, the process transitions to 4735 to determine whether the iteration counter N has reached its maximum value. When the process has performed a pre-specified maximum number of iterations without improving the placement score, it returns (at 4770) the current placement configuration, and then ends.

2. Cost Estimator.

Figure 48A:
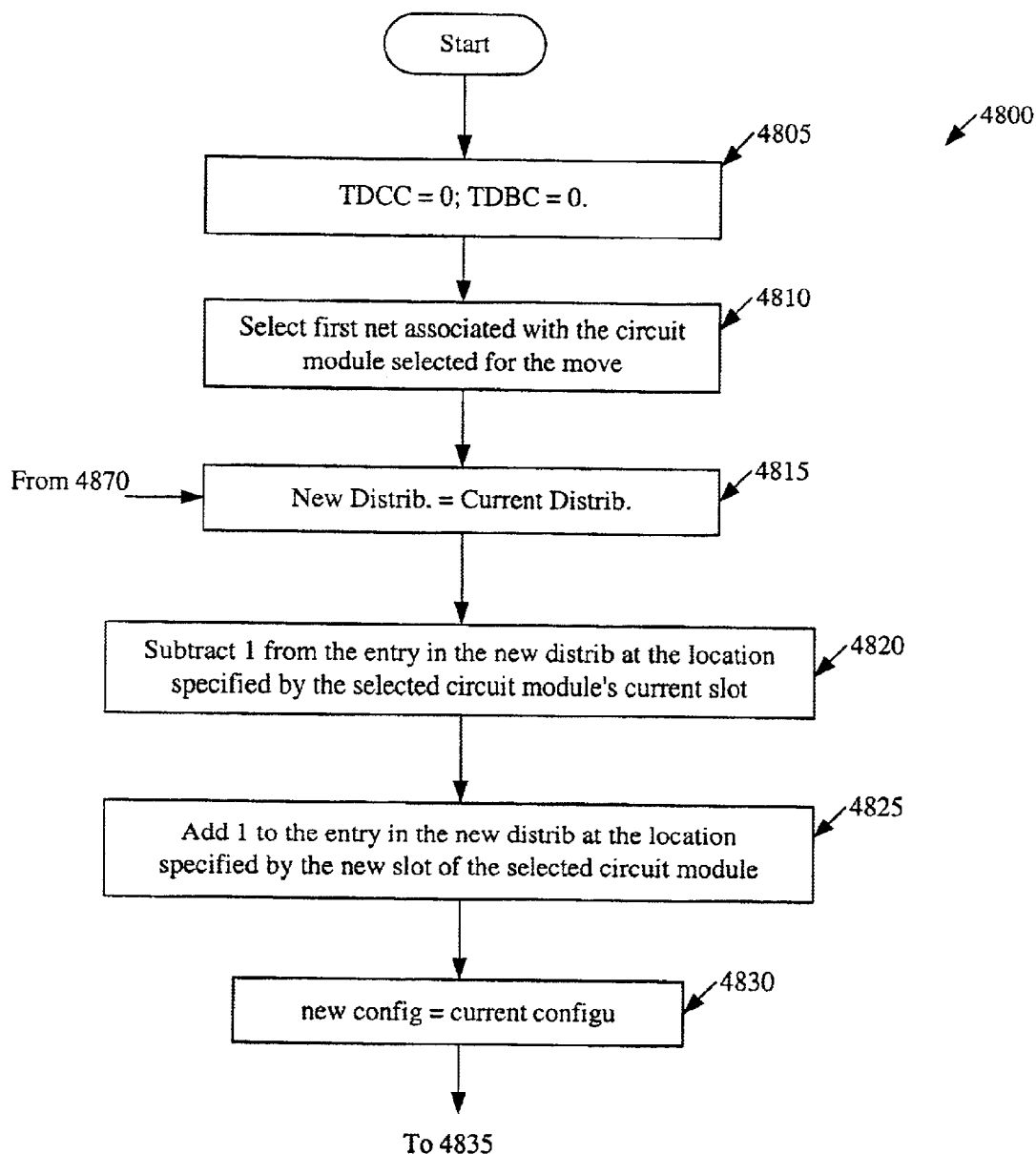
FIG. 48 illustrates a process that a costs estimator performs.
Figure 48B:
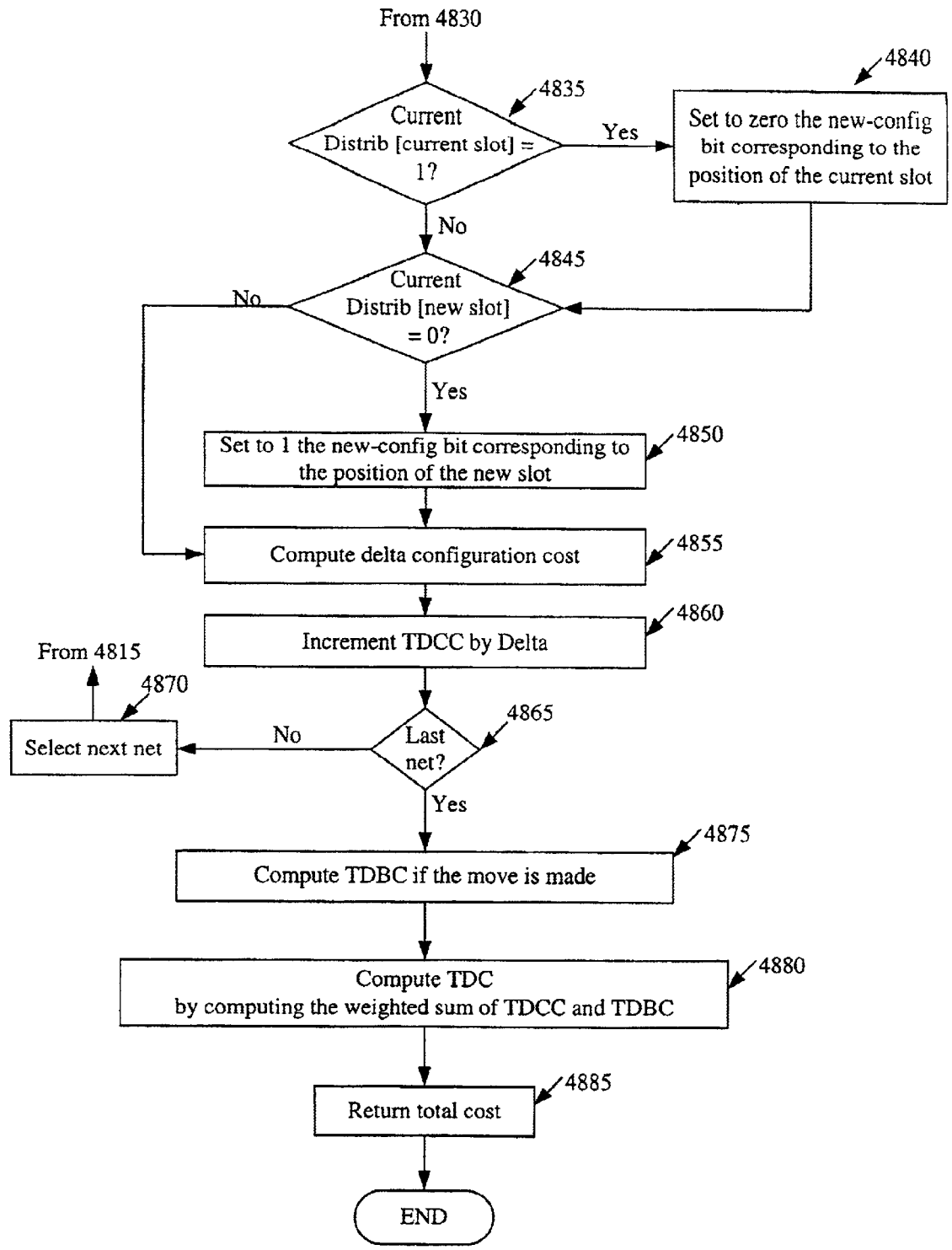

FIG. 48 illustrates a process 4800 that the costs estimator 3430 performs when the optimizer 3425 calls it at 4715. This process computes the total delta cost (TDC) associated with the random move of the circuit module selected at 4710. To calculate the total delta cost, the estimator 3430 calculates the total delta configuration cost (TDCC) and the total delta balance cost (TDBC).

The process 4800 calculates the total delta configuration cost by performing the following three operations for each net on which the selected circuit module resides. First, the process determines how the selected move would modify the distribution array of the net. Second, the process computes a new configuration code based on the possible modification to the distribution array. Third, the process computes a delta configuration cost by subtracting the configuration cost for the new configuration code from the configuration cost for the current configuration code. The process sums the delta configuration costs of all the module's of the net to obtain the total delta configuration cost.

More specifically, the process 4800 initially sets (at 4805) the total delta configuration cost (TDCC) and the total balance cost (TDBC) to zero. It then selects (at 4810) a first net associated with the circuit module that the process 4700 selected at 4710. The process identifies this net through one of the reference fields 3815 in the data structure 3800 of the selected circuit module.

The process then defines (at 4815) a new distribution array equal to the current distribution array of the net selected at 4810. Next, the process adjusts the values in the new distribution array based on the selected move. Specifically, at 4820, the process subtracts 1 from the entry in the distribution array that corresponds to the child slot that currently contains the selected circuit module. The process identifies the selected circuit module's current child slot through the current-slot field 3820 of the circuit-module data structure 3800. The process then adds (at 4825) 1 to the entry in the distribution array that corresponds to the child slot that will contain the selected circuit module if the move is made. The process identifies this child slot through the coordinates of the randomly-selected move.

The process then defines (at 4825) a new configuration code to be equal to the current configuration code of the net. Next, the process adjusts the values in the new configuration code based on the selected move. Specifically, at 4835, the process determines whether the current child slot contains only the selected circuit module. The process makes this determination by deciding whether the entry in the current distribution array that corresponds to the current child slot equals 1. If not, the process transitions to 4845, which will be described below. If so, the process sets (at 4840) to zero the new-configuration-code bit that corresponds to the position of the module's current child slot, and then transitions to 4845.

At 4845, the process determines whether the child slot that will contain the selected circuit module after the move has any circuit modules. The process makes this determination by deciding whether the entry in the current distribution array that corresponds to the new child slot equals 0. If not, the process transitions to 4855, which will be described below. If so, the process sets (at 4850) to 1 the new-configuration-code bit that corresponds to the position of the new child slot, and then transitions to 4855.

At 4855, the process calculates a delta configuration cost. When the pre-tabulated attributes are length of the connection graphs that model the net configurations, the process calculates the delta configuration cost by (1) retrieving the length values for the new and current configuration codes, and (2) subtracting the new code's length from the current code's length.

On the other hand, when the pre-tabulated attributes are path-usage values, the process for calculating the delta configuration cost is slightly more involved. To do this, the process (1) retrieves the path-usage values for the new and current configuration codes, (2) defines a temporary global path-usage data structure to equal the global path-usage data structure 4300, (3) subtracts the path-usage values for the current configuration code from the corresponding path-usage values in the temporary global data structure, and (4) adds the path-usage values for the new configuration code to the corresponding path-usage values in the temporary global data structure. The process then uses the above-described Equation F or G to calculate a new total congestion cost based on the path-usage values in the resulting temporary global data structure. The process next subtracts the new total congestion cost from the current total congestion cost to obtain the delta congestion cost at 4855.

The process then increments (at 4860) the total delta configuration cost TDCC by the delta computed at 4855. Next, the process determines (at 4865) whether it has examined all the nets on which the selected circuit module resides. If not, the process selects (at 4870) another net that connects to the circuit module, and repeats operations 4815–65 to calculate the change in the configuration cost for this net if the circuit module is moved.

When the process 4800 determines (at 4865) that it has examined all the nets for the selected circuit module, the process computes(at 4875) the total delta balance cost (TDBC) for the move. In some embodiments, the process uses Equation (J) below to compute TDBC.

$$TDBC = \text{New balance of } j - \text{Old balance of } j + \text{New balance of } i - \text{Old balance of } I. \quad (J)$$

In this equation, i represents the circuit module's new child slot (i.e., the child slot that will contain the module if the move is made), while j represents the circuit module's current child slot. Equations (K)–(N) provide the new and old balance costs for the new and current child slots.

$$\text{New balance of } j = G(\{S[j] - \text{size}(X)\}, C[j]); \quad (K)$$

$$\text{Old balance of } j = G(S[j], C[j]) \quad (L)$$

$$\text{New balance of } i = G(\{S[i] + \text{size}(X)\}, C[i]) \quad (M)$$

$$\text{Old balance of } i = G(S[i], C[i]) \quad (N)$$

In these equations, S and C are current size and capacity of the slot, and G is the balance function.

After computing the total delta balance cost at 4875, the process computes (at 4880) the total delta cost (TDC) by computing a weighted sum of the total delta configuration cost and the total delta balance cost. The process then returns (at 4885) the total delta cost (TDC), and then ends.

3. Mover.

Figure 49A:
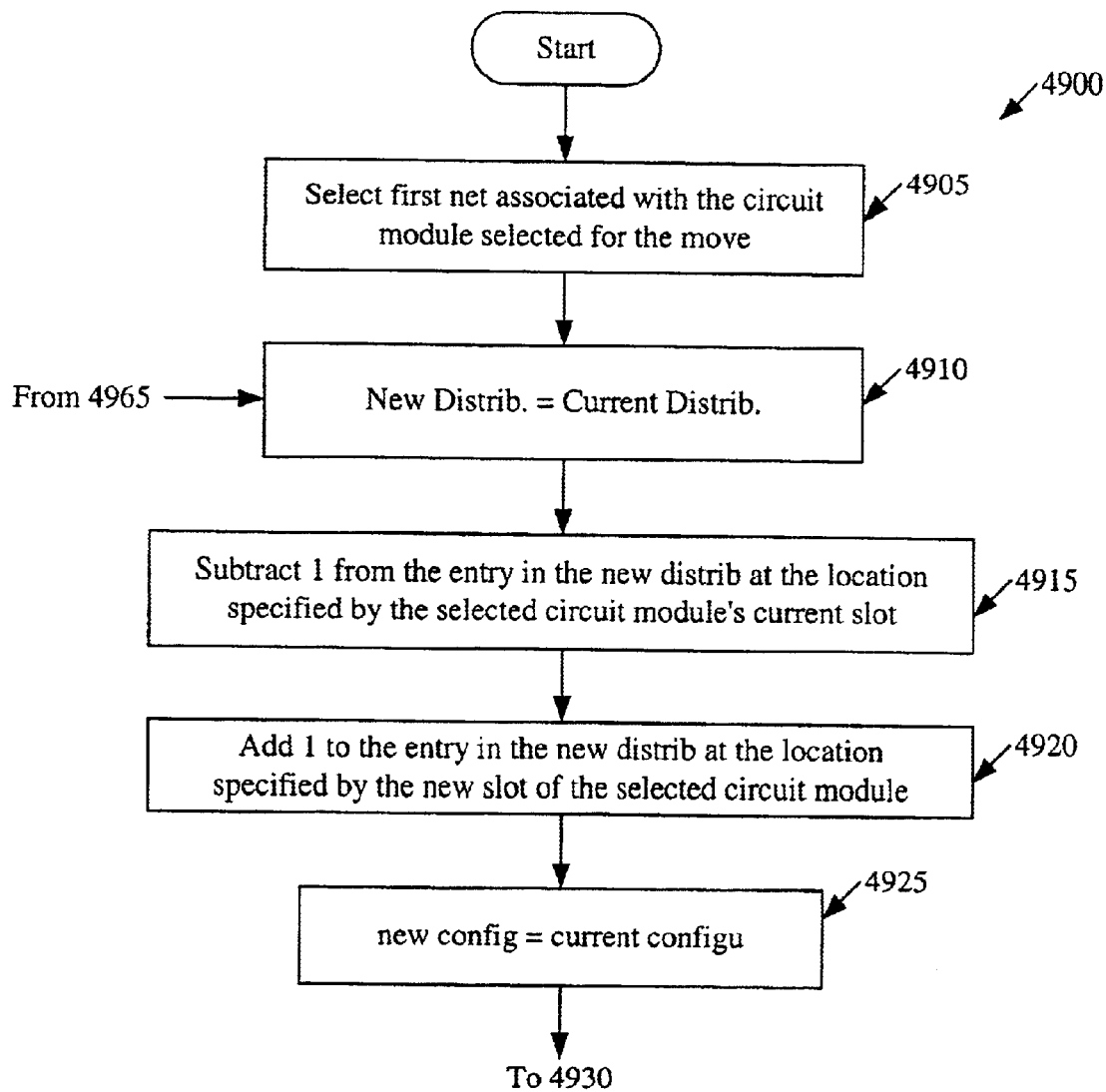
FIG. 49 illustrates a process that a mover performs.
Figure 49B:
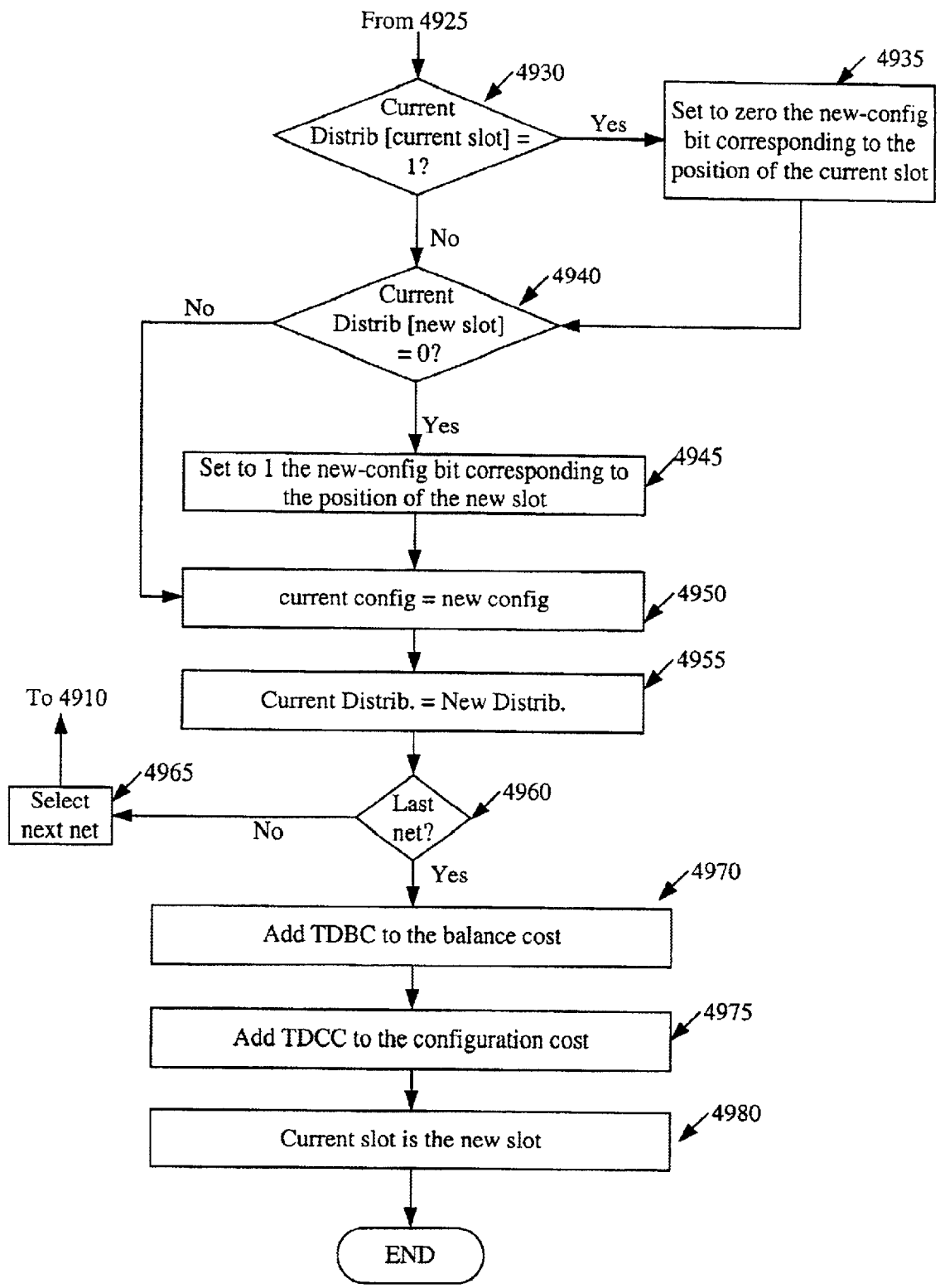

FIG. 49 illustrates a process 4900 that the mover 3435 performs when the optimizer 3425 calls it at 4725. The mover 3435 modifies the net configurations within the current slot in accordance with a selected move, if the optimizer determines that the total delta cost computed by the cost estimator is less than 0 or is an tolerable penalty cost.

The process 4900 initially selects (at 4905) a first net associated with the circuit module that the process 4700 selected at 4710. The process identifies this net through one of the reference fields 3815 in the data structure 3800 of the selected circuit module. The process then defines (at 4910) a new distribution array equal to the current distribution array of the net selected at 4905.

Next, the process adjusts the values in the new distribution array based on the selected move. Specifically, at 4915, the process subtracts 1 from the entry in the distribution array that corresponds to the child slot that currently contains the selected circuit module. The process identifies the selected circuit module's current child slot through the current-slot field 3820 of the circuit-module data structure 3800. The process then adds (at 4920) 1 to the entry in the distribution array that corresponds to the child slot that will contain the selected circuit module after the move is made. The process identifies this child slot through the coordinates of the randomly-selected move.

The process then defines (at 4925) a new configuration code to be equal to the current configuration code of the net. Next, the process adjusts the values in the new configuration code based on the selected move. Specifically, at 4930, the process determines whether the current child slot contains only the selected circuit module. The process makes this determination by deciding whether the entry in the current distribution array that corresponds to the current child slot equals 1. If not, the process transitions to 4940, which will be described below. If so, the process sets (at 4935) to zero the new-configuration-code bit that corresponds to the position of the module's current child slot, and then transitions to 4940.

At 4940, the process determines whether the child slot that will contain the selected circuit module after the move has any circuit modules. The process makes this determination by deciding whether the entry in the current distribution array that corresponds to the new child slot equals 0. If not, the process transitions to 4950, which will be described below. If so, the process sets (at 4945) to 1 the new-configuration-code bit that corresponds to the position of the new child slot, and then transitions to 4950.

At 4950, the process sets the selected net's current configuration code to the computed new configuration code. The process then sets (at 4955) the selected net's distribution array to the computed new distribution array. Next, the process determines (at 4960) whether it has examined all the nets on which the selected circuit module resides. If not, the process selects (at 4965) another net that connects to the circuit module, and repeats operations 4910–60 to change the newly-selected net's configuration code and distribution array.

When the process 4900 determines (at 4960) that it has examined all the nets for the selected circuit module, the process adds (at 4970) the total delta balance cost (TDBC) computed at 4875 to the current balance cost. The process then adds (at 4975) the total delta configuration cost (TDCC) computed by process 4800 to the current configuration cost.

When the configuration cost is completely or partially computed based on path-usage values, the process 4900 not only has to modify the total configuration cost but also has to modify the global path-usage data structure 4300. In some embodiments, the process 4900 does this between 4945 and 4950 by (1) retrieving path-usage values for the current and new configuration codes, (2) subtracting the path-usage values for the current configuration code from the corresponding path-usage values in the global data structure, and (3) adding the path-usage values for the new configuration code to the corresponding path-usage values in the global data structure 4300.

After 4975, the process then stores (at 4980) the identity of the new slot that contains the selected circuit module after the move, in the circuit module's field 3805. The process then ends.

V. The Computer System

Figure 50:
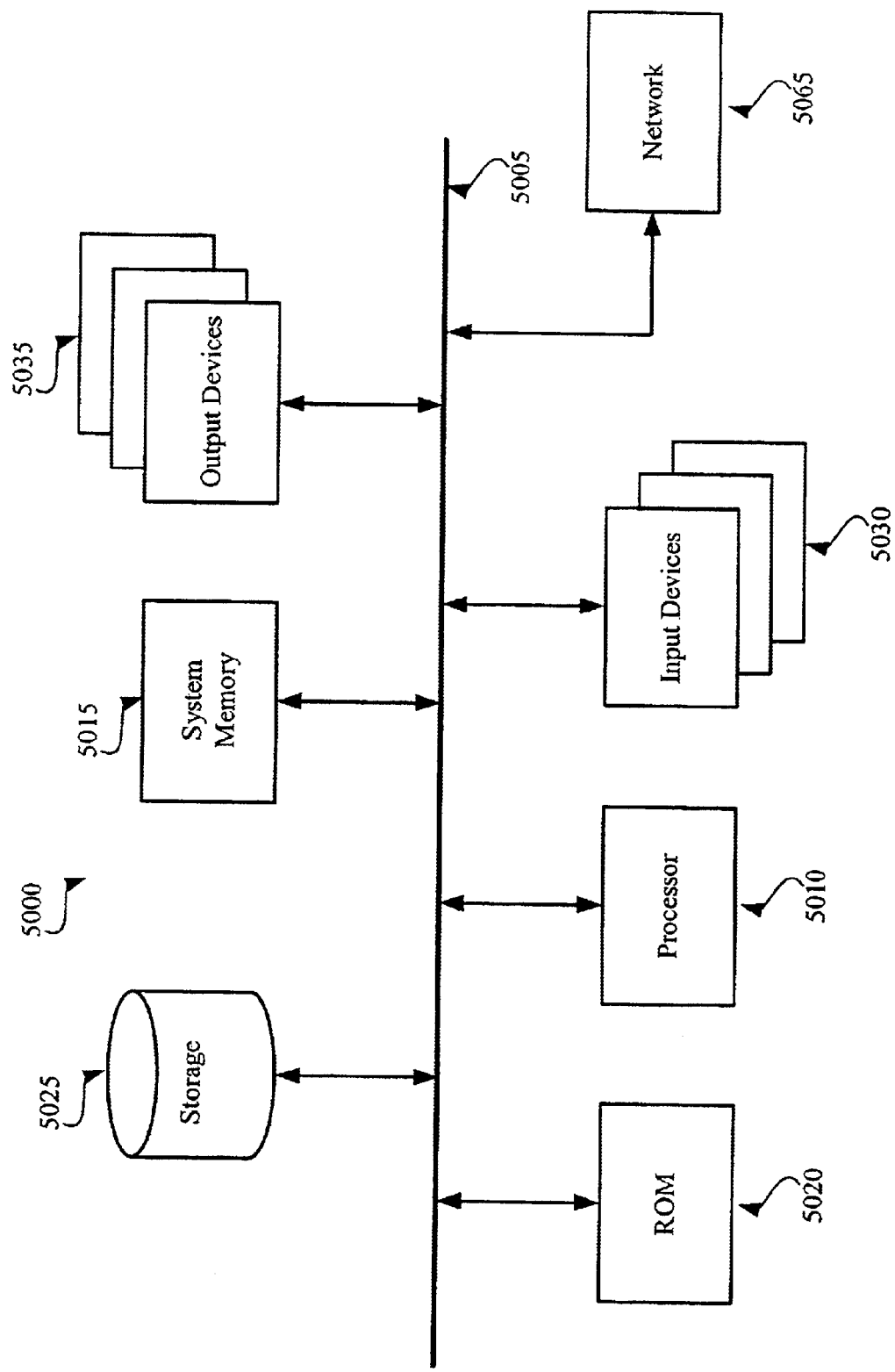
FIG. 50 illustrates a computer system used by some embodiments of the invention.

FIG. 50 presents a computer system with which one embodiment of the present invention is implemented. Computer system 5000 includes a bus 5005, a processor 5010, a system memory 5015, a read-only memory 5020, a permanent storage device 5025, input devices 5030, and output devices 5035.

The bus 5005 collectively represents all system, peripheral, and chipset buses that communicatively connect the numerous internal devices of the computer system 5000. For instance, the bus 5005 communicatively connects the processor 5010 with the read-only memory 5020, the system memory 5015, and the permanent storage device 5025.

From these various memory units, the processor 5010 retrieves instructions to execute and data to process in order to execute the processes of the invention. The read-only-memory (ROM) 5020 stores static data and instructions that are needed by the processor 5010 and other modules of the computer system. The permanent storage device 5025, on the other hand, is read-and-write memory device. This device is a non-volatile memory unit that stores instruction and data even when the computer system 5000 is off. Some embodiments of the invention use a mass-storage device (such as a magnetic or optical disk and its corresponding disk drive) as the permanent storage device 5025. Other embodiments use a removable storage device (such as a floppy disk or zip® disk, and its corresponding disk drive) as the permanent storage device.

Like the permanent storage device 5025, the system memory 5015 is a read-and-write memory device. However, unlike storage device 5025, the system memory is a volatile read-and-write memory, such as a random access memory. The system memory stores some of the instructions and data that the processor needs at runtime. In some embodiments, the invention's processes are stored in the system memory 5015, the permanent storage device 5025, and/or the read-only memory 5020.

The bus 105 also connects to the input and output devices 5030 and 5035. The input devices enable the user to communicate information and select commands to the computer system. The input devices 5030 include alphanumeric keyboards and cursor-controllers.

The output devices 5035 display images generated by the computer system. For instance, these devices display IC design layouts. The output devices include printers and display devices, such as cathode ray tubes (CRT) or liquid crystal displays (LCD).

Finally, as shown in FIG. 50, bus 5005 also couples computer 5000 to a network 5065 through a network adapter (not shown). In this manner, the computer can be a part of a network of computers (such as a local area network ("LAN"), a wide area network ("WAN"), or an Intranet) or a network of networks (such as the Internet).

Any or all of the components of computer system 5000 may be used in conjunction with the invention. However, one of ordinary skill in the art would appreciate that any other system configuration may also be used in conjunction with the present invention.

VI. Advantages.

The embodiments of the invention that factor diagonal, horizontal, and vertical wiring during placement, result in the better distribution of the nets when such wiring is used to route the nets. When the router uses diagonal, horizontal, and vertical wiring but the placer is optimized only for Manhattan wiring, the placer poorly positions the nets in the IC layout. Specifically, in these situations, the placer has a tendency to ignore diagonal positions, since it is inclined to place all circuit elements related to a particular circuit element directly above or below, or directly to the right or left, of the particular circuit element.

On the other hand, when a placer is optimized for diagonal, horizontal, and vertical wiring, such a placer is less inclined to ignore diagonal positions. Hence, such a placer places related circuit elements in horizontal, vertical, or diagonal positions with respect to each other. This, in turn, provides for a more uniform distribution of related circuit elements.

In other words, a placer that is optimized for horizontal, vertical, and diagonal wiring can position the circuit modules in more locations that cost the same. This ability, in turn, opens up more positions to place the circuit modules, and thereby reduces wirelength.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. For an electronic-design-automation placer that uses a set of partitioning lines, that define a plurality of slots, to partition an integrated-circuit ("IC") layout region into a plurality of sub-regions corresponding to said slots, a method of pre-computing placement costs for multiple wiring models, the method comprising:

a) for each combination of said slots, identifying at least one connection graph that is based on a first wiring model and that represents the topology of interconnect lines necessary for connecting the combination of said slots according to the first wiring model;

b) for each combination of said slots, identifying at least one connection graph that is based on a second wiring model and that represents the topology of interconnect lines necessary for connecting the combination of said slots according to the second wiring model;

c) computing an attribute of each identified connection graph; and d) storing the computed attributes in a storage structure.

2. The method of claim wherein the connection graphs are Steiner trees.

3. The method of claim 1, wherein the connection graphs are minimum spanning trees.

4. The method of claim 1, wherein computing said attribute comprises calculating the length of each graph.

5. The method of claim 1, wherein computing said attribute comprises calculating the number of bends in each graph.

6. The method of claim 5, wherein the bends are diagonal bends.

7. The method of claim 1, wherein a plurality of interconnect-line paths exist between said slots, wherein computing the attribute comprises identifying the interconnect line paths used by each connection graph.

8. The method of claim 7, wherein a first set of interconnect-line paths exist between said slots when the first wiring model is used, and a second set of interconnect-line paths exist between said slots when the second wiring model is used.

9. The method of claim 1, wherein a plurality of edges exist between said slots, wherein computing the attribute comprises identifying the edges intersected by each connection graph.

10. The method of claim 9, wherein a first set of edges exist between said slots when the first wiring model is used, and a second set of edges exist between said slots when the second wiring model is used.

11. A method of placing circuit modules in a region of an integrated circuit ("IC") layout, said IC layout having a plurality of circuit elements, wherein a plurality of nets represent interconnections between said circuit elements, each net defined to include a set of circuit elements, the method comprising:

a) selecting a first wiring model from a set of at least two wiring models, each wiring model providing a wiring direction for each layer of said IC layout, wherein the first wiring model includes a wiring direction that is not available on any layer of at least one other wiring model in the set of wiring model;

b) partitioning the IC region into several sub-regions;

c) selecting a net;

d) identifying the set of sub-regions containing the circuit elements of the selected net;

e) retrieving, from a storage structure, a pre-computed attribute of a set of one or more interconnect lines that are necessary for connecting the identified set of sub-regions, wherein said set of interconnect lines are based on the first wiring model.

12. The method of claim 11, wherein the retrieved attribute represents the placement cost of said net within said region.

13. The method of claim 11, further comprising computing the placement cost of said net from said retrieved attribute.

14. The method of claim 11, further comprising:

f) changing the position of a circuit element of the net from one sub-region to another;

g) identifying a new set of sub-regions that contain the circuit elements of the net;

h) retrieving, from the storage structure, a pre-computed attribute of a different set of interconnect lines necessary for connecting the identified new set of sub-regions, wherein said different set of interconnect lines are based on the first wiring model.

15. A method of placing circuit modules in a region of an integrated circuit ("IC") layout, said IC layout having a plurality of circuit elements, wherein a plurality of nets represent interconnections between said circuit elements, each net defined to include a set of circuit elements, the method comprising:

a) selecting a first wiring model from a set of at least two wiring models, each wiring model providing a wiring direction for each layer of said IC layout, wherein the first wiring model includes a wiring direction that is not available on any layer of at least one other wiring model in the set of wiring mode;

b) partitioning the IC-layout region into several sub-regions;

c) for each particular net, identifying the set of sub-regions containing the circuit elements of the particular net;

d) for each particular net, retrieving a pre-computed attribute of a connection graph that is based on the first wiring model, and that represents the topology of interconnect lines needed to connect the identified set of sub-regions of the particular net;

e) computing a placement cost for the IC layout within said region by using the retrieved attributes.

16. The method of claim 15 further comprising:

f) changing the position of a particular circuit element from one sub-region to another;

g) for each particular net that includes the particular circuit element, identifying a new set of sub-regions that contain the circuit elements of the particular net;

h) for each particular net that includes the particular circuit element, retrieving a pre-computed attribute of a new connection graph that is based on the first wiring model, and that represents the topology of interconnect lines necessary for connecting the identified new set of sub-regions for the particular net;

i) computing a delta placement cost based on the retrieved attributes of the new connection graphs.

17. The method of claim 15, wherein the connection graphs are Steiner trees.

18. The method of claim 15, wherein the connection graphs are minimum spanning trees.

* * * * *

UNITED STATES PATENT AND TRADEMARK OFFICE
CERTIFICATE OF CORRECTION

PATENT NO. : 6,910,198 B2
DATED : June 21, 2005
INVENTOR(S) : Steven Teig et al.

It is certified that error appears in the above-identified patent and that said Letters Patent is hereby corrected as shown below:

Column 40,
Line 32, "The method of claim wherein the connection graphs are" should read
-- The method of claim 1, wherein the connection graphs are --.

Column 41,
Line 2, "model in the set of wiring model;" should read -- model in the set of wiring models; --.

Column 42,
Line 3, "model in the set of wiring mode;" should read -- model in the set of wiring models; --.

Signed and Sealed this

Ninth Day of May, 2006

JON W. DUDAS
*Director of the United States Patent and Trademark Office*